United States Patent
Sullivan

(10) Patent No.: US 10,707,011 B2
(45) Date of Patent: *Jul. 7, 2020

(54) MULTILAYER CONDUCTORS WITH INTEGRATED CAPACITORS AND ASSOCIATED SYSTEMS AND METHODS

(71) Applicant: The Trustees of Dartmouth College, Hanover, NH (US)

(72) Inventor: Charles R. Sullivan, West Lebanon, NH (US)

(73) Assignee: THE TRUSTEES OF DARTMOUTH COLLEGE, Hanover, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/166,501

(22) Filed: Oct. 22, 2018

(65) Prior Publication Data
US 2019/0057806 A1    Feb. 21, 2019

Related U.S. Application Data

(63) Continuation of application No. 14/765,306, filed as application No. PCT/US2014/014203 on Jan. 31, 2014, now Pat. No. 10,109,413.
(Continued)

(51) Int. Cl.
*H01F 27/34* (2006.01)
*H02J 50/12* (2016.01)
(Continued)

(52) U.S. Cl.
CPC ......... *H01F 27/34* (2013.01); *H01F 17/0013* (2013.01); *H01F 27/16* (2013.01); *H01F 27/24* (2013.01); *H01F 27/2804* (2013.01);

*H01P 3/16* (2013.01); *H02J 50/12* (2016.02); *H01F 2017/0026* (2013.01); *H01F 2027/2809* (2013.01)

(58) Field of Classification Search
USPC ......................................................... 307/104
See application file for complete search history.

(56) References Cited

U.S. PATENT DOCUMENTS 3,302,082 A    1/1967 Preissinger
3,560,904 A    2/1971 Wilkes
(Continued)

FOREIGN PATENT DOCUMENTS

JP    2000351945 A    12/2000

OTHER PUBLICATIONS

PCT Application No. PCT/US2014/014203 International Search Report with Written Opinion dated May 20, 2014, 11 pages.

*Primary Examiner* — Michael R. Fin
(74) *Attorney, Agent, or Firm* — Lathrop GPM LLP

(57) ABSTRACT

A multilayer conductor includes at least one separation dielectric layer and a plurality of conductor layers stacked in an alternating manner. Each of the plurality of conductor layers includes a first conductor sublayer and a second conductor sublayer separated from the first conductor sublayer by a sublayer dielectric layer. The second conductor sublayer at least partially overlaps with the first conductor sublayer in each of the plurality of conductor layers. The multilayer conductor is included, for example, in a device including a magnetic core adjacent to at least part of the multilayer conductor.

19 Claims, 32 Drawing Sheets

Related U.S. Application Data

(60) Provisional application No. 61/759,830, filed on Feb. 1, 2013.

(51) Int. Cl.
| | | |
|---|---|---|
| *H01F 17/00* | (2006.01) | |
| *H01F 27/28* | (2006.01) | |
| *H01F 27/16* | (2006.01) | |
| *H01F 27/24* | (2006.01) | |
| *H01P 3/16* | (2006.01) | |

(56) References Cited

U.S. PATENT DOCUMENTS

| 5,898,562 | A | 4/1999 | Cain et al. |
| 5,997,800 | A | 12/1999 | Wimberger et al. |
| 9,165,715 | B2 * | 10/2015 | Yoon .................. H01G 4/30 |
| 10,109,413 | B2 * | 10/2018 | Sullivan ............. H01F 17/0013 |
| 2003/0075990 | A1 * | 4/2003 | Guitton ............... H01F 27/2804 307/139 |
| 2004/0108311 | A1 | 6/2004 | de Rooij et al. |
| 2004/0179326 | A1 | 9/2004 | Hattori |
| 2007/0063330 | A1 | 3/2007 | Park et al. |
| 2009/0002918 | A1 * | 1/2009 | Kawasaki ............ H01G 4/232 361/311 |
| 2012/0267142 | A1 | 10/2012 | Nordin et al. |
| 2013/0020877 | A1 | 1/2013 | Miller |
| 2013/0100576 | A1 | 4/2013 | Seo et al. |
| 2013/0104394 | A1 * | 5/2013 | Hardin ................. H01G 4/33 29/832 |
| 2013/0194712 | A1 * | 8/2013 | Lavene ................ H01G 4/32 361/274.1 |
| 2013/0229748 | A1 * | 9/2013 | Chung ................. H01G 4/005 361/301.4 |
| 2013/0307347 | A1 * | 11/2013 | Davila ................. H02J 5/005 307/104 |
| 2014/0160618 | A1 * | 6/2014 | Yoon .................... H01G 4/30 361/301.4 |

\* cited by examiner

MULTILAYER CONDUCTORS WITH INTEGRATED CAPACITORS AND ASSOCIATED SYSTEMS AND METHODS

CROSS-REFERENCE TO RELATED APPLICATIONS

This application is a continuation of U.S. patent application Ser. No. 14/765,306 with a § 371(c) date of Jul. 31, 2015, which is a 35 U.S.C. § 371 filing of International Application No. PCT/US2014/014203, filed Jan. 31, 2014, which claims priority to U.S. Provisional Patent Application Ser. No. 61/759,830, filed Feb. 1, 2013, each of which is incorporated herein by reference.

GOVERNMENT RIGHTS

This invention was made with government support under contract number 5U54CA151662-03 awarded by the National Institutes of Health. The government has certain rights in the invention.

BACKGROUND

There are many applications for electrical conductors capable of carrying high frequency alternating current (AC). For example, electrical conductors are required to carry high frequency AC between components in high frequency circuits, such as in power conversion circuits or in microwave circuits. As another example, electrical conductors in the form of windings are frequently used to carry high frequency AC in devices which generate an internal magnetic field, such as inductors and transformers, as well as in devices which generate an external magnetic field, such as resonant induction coils. External magnetic fields are used, for example, for induction heating, magnetic hyperthermia, and wireless power transfer.

It can be difficult to transmit high frequency AC through an electrical conductor without incurring significant resistive losses. In particular, a phenomenon known as the "skin effect" causes high frequency AC flowing through a conductor to flow predominately near the conductor's outer surface or "skin," potentially preventing the electrical conductor's cross-sectional area from being fully used. The skin effect increases with increasing frequency of AC flowing through the conductor, causing effective conductor resistance to increase with increasing frequency. Additionally, current flowing through a conductor will tend to flow along a path which minimizes circuit inductance, which is typically a path which minimizes circuit loop area. This inductive effect, which also increases with increasing frequency, may further constrain AC to a limited portion of a conductor's cross-sectional area. Consequently, a conductor will typically have a significantly higher effective resistance when carrying high frequency AC than when carrying low frequency AC, or when carrying direct current (DC).

FIG. 1 illustrates one example of the skin and inductive effects in a prior art parallel plate transmission line 100 having a first port, a second port, and parallel conductors 102, 104 joining the two ports. Current density through conductors 102 and 104 is approximated by dots on their respective ends 106 and 108. As illustrated, current density is uneven, and the greatest current density occurs near outer portions of conductors 102 and 104 that are facing each other.

One conventional technique for decreasing transmission line resistance is to electrically couple multiple conductors in parallel. At low frequency AC or at DC, effective resistance is approximately inversely proportional to the number of conductors electrically coupled in parallel, assuming that the conductors equally share current. For example, FIG. 2 illustrates a prior art transmission line 200 having a first port and second port. The ports are connected by a first set 202 and a second set 204 of conductor layers. First set 202 includes a number of conductor layers 206 electrically coupled in parallel, and second set 204 includes a number of conductor layers 208 electrically coupled in parallel.

At low frequency AC and at DC, conductor layers 206 of first set 202 have approximately equal effective impedance values and therefore share current substantially equally, and conductor layers 208 of second set 204 have approximately equal effective impedance values and therefore share current substantially equally. At high frequency AC, however, the constituent conductor layers of each set 202, 204 will have different effective impedance values and therefore not equally share current. Instead, current will flow through first set 202 predominately through conductor layers 206 closest to second set 204, and current will flow through second set 204 predominately through conductor layers 208 closest to first set 202. Indeed, if the thickness of conductor layers 206, 208 is small, and if separation between adjacent conductor layers in each set 202, 204 is minimal, transmission line 200 will have a current distribution similar to that of transmission line 100 (FIG. 1) when carrying high frequency AC. Thus, conventional parallel coupling of multiple conductors will typically not achieve low effective resistance when carrying high frequency AC.

High effective resistance may result in significant power loss because conductor power loss is proportional to effective resistance and to the square of current magnitude. Conductor power loss may be undesirable for a number of reasons, such as because conductor power loss impairs conductor power transmission efficiency and causes conductor heating.

As one example of an application which may be sensitive to conductor power loss, consider a system for generating a high-frequency magnetic field. Such a system typically includes an AC power source, such as an inverter, and an induction coil. The AC power source drives AC through the induction coil, thereby causing the coil to generate a time-varying magnetic field. A resonant capacitor is often electrically coupled in series or in parallel with the induction coil to obtain a desired resonant frequency, thereby facilitating driving of the coil. For example, FIG. 3 schematically illustrates a prior art system 300 for generating a high frequency magnetic field. System 300 includes a conventional induction coil 302 forming N winding turns 304 magnetically coupled by a magnetic core 306. Although FIG. 3 shows coil 302 including five winding turns 304 such that N is equal to five, N could be any positive integer greater than zero. A resonant capacitor 308 is electrically coupled in parallel with coil 302, and an AC electric power source 310 drives coil 302 and capacitor 308. Capacitor 308 could alternately be electrically coupled in series with coil 302 and AC electric power source 310.

Voltage (V) across induction coil 302 and capacitor 308 is approximately as follows, where X is a constant for a given coil size and magnetic field strength:

$$V = X \cdot N \qquad \text{EQN. 1}$$

On the other hand, current (I) through winding turns 304 and capacitor 308 is approximately as follows, where Y is a constant for a given coil size and magnetic field strength:

$$I = Y/N \qquad \text{EQN. 2}$$

EQNS. 1 and 2 also hold true in variations of system 300 where capacitor 308 is electrically coupled in series with coil 302, instead of in parallel with the coil.

As can be appreciated from EQNS. 1 and 2, it is not possible to achieve low values of both voltage V and current I in applications where constants X and Y are large. For example, consider magnetic hyperthermia applications, which require a high magnetic field strength. Applicant has conducted simulations to estimate the required root-mean-square (RMS) magnitude of current through a resonant induction coil, and voltage across the coil, to obtain a sufficiently high strength magnetic field in a representative magnetic hyperthermia application. The simulations show that constant X in EQN. 1 must be at least 1,230 volts, and that constant Y in EQN. 2 must be at least 4,380 amperes, to achieve a sufficiently large magnetic field. While the actual values of constants X and Y may vary among magnetic hyperthermia applications, it is anticipated that they will generally have the same order of magnitude as determined in the simulations. Thus, the required current magnitude is very large for a small number of winding turns, and the required voltage magnitude is very large for a large number of winding turns, as shown by EQNS. 1 and 2, assuming constants X and Y are 1,230 volts and 4,380 amperes, respectively.

Large current magnitude results in significant losses in induction coil 302 because it is difficult to achieve low resistance conductors at high frequencies using conventional techniques. For example, increasing cross-sectional area of winding turns 304 will generally not significantly reduce conductor resistance at high frequencies because of skin and inductive effects, as discussed above. Thus, induction coil 302 typically dissipates significant power at high current levels.

High induction coil losses, although undesirable, may be acceptable in some applications. For example, in conventional industrial induction heating systems, winding turns 304 are typically formed of copper tubing, where the tubing serves as both an electrical conductor and a cooling fluid channel. The cooling fluid is circulated through the copper tubing to prevent it from overheating. Although only a portion of the copper tubing conducts current at high frequencies due to skin effects, the tubing's resistance is still typically much lower than resistance of the object ("workpiece") being heated. Thus, significantly more heat is dissipated in the workpiece than in induction coil 302, potentially resulting in high efficiency, although significant power is lost in the induction coil.

On the other hand, high induction coil losses create significant difficulty in some other applications. For example, high current magnitude is required to achieve a sufficiently high strength magnetic field in magnetic hyperthermia applications when N is small. Such high current magnitude results in more power being dissipated in induction coil 302 than in magnetic nanoparticles used as the "workpiece" in magnetic hyperthermia, so that efficiency is low. In fact, so much power is dissipated in induction coil 302 in typical magnetic hyperthermia applications that the coil must be liquid cooled. A high capacity chiller (not shown), which is typically large, heavy, and expensive, is generally required to remove heat from the cooling liquid. Additionally, AC electric power source 310 must have a high power rating to compensate for coil 302 losses, causing the AC electric power source to also be large, expensive, and heavy. Furthermore, the high power rating of AC electric power source 310 usually requires high capacity electrical service, which is not readily available in most buildings. These factors limit the wide-scale feasibility of magnetic hyperthermia using conventional magnetic field generation technology.

As discussed above, magnitude of current through coil 302 and capacitor 308 can be decreased by increasing N. However, increasing N increases voltage across coil 302 and capacitor 308, which has its own drawbacks. For example, high voltage necessitates high dielectric insulation, which may increase system size, cost, and manufacturing complexity. High voltage also requires use of high voltage rated components, which are often relatively large, costly, and/or difficult to procure. Additionally, high voltage in system 300 may present a safety hazard.

U.S. Pat. No. 6,956,188 to de Rooij et al. proposes an induction heating coil including an integrated resonant capacitor electrically coupled in series or parallel with the resonant coil, thereby potentially eliminating the need for an external resonant capacitor and associated connections. However, de Rooij's coil requires very high voltage magnitude and/or very high current magnitude to generate a high strength magnetic field, in a manner similar to that discussed above with respect to FIG. 3. Additionally, certain embodiments of de Rooij's coil have a helical shape, which may be difficult to manufacture. Furthermore, de Rooij's coil turns may need to be spaced relatively far apart to minimize undesirable inter-turn capacitance, thereby causing the coil to occupy a large volume of space.

SUMMARY

In an embodiment, a multilayer conductor includes at least one separation dielectric layer and a plurality of conductor layers stacked in an alternating manner. Each of the plurality of conductor layers includes a first conductor sublayer and a second conductor sublayer separated from the first conductor sublayer by a sublayer dielectric layer. The second conductor sublayer at least partially overlaps with the first conductor sublayer in each of the plurality of conductor layers.

In an embodiment, a transmission line has thickness and includes first and second multilayer conductors. Each of the multilayer conductors includes at least one separation dielectric layer and a plurality of conductor layers stacked in an alternating manner in the thickness direction. The plurality of conductor layers are electrically coupled in parallel. Each of the plurality of conductor layers includes a first conductor sublayer and a second conductor sublayer separated from the first conductor sublayer by a sublayer dielectric layer in the thickness direction. The second conductor sublayer at least partially overlaps with the first conductor sublayer, as seen when viewed cross-sectionally in the thickness direction, in each of the plurality of conductor layers. The first multilayer conductor mirrors the second multilayer conductor across a center axis of the transmission line, and the center axis extends in a lengthwise direction that is orthogonal to the thickness direction.

In an embodiment, an assembly includes a multilayer conductor and a magnetic core adjacent to at least part of the multilayer conductor. The multilayer conductor includes at least one separation dielectric layer and a plurality of conductor layers stacked in an alternating manner. Each of the plurality of conductor layers includes a first conductor sublayer and a second conductor sublayer separated from the first conductor sublayer by a sublayer dielectric layer. The second conductor sublayer at least partially overlaps with the first conductor sublayer in each of the plurality of conductor layers.

In an embodiment, a device for generating a magnetic field includes a resonant induction coil and an alternating current electric power source electrically coupled to the resonant induction coil. The resonant induction coil includes M sections, where M is an integer greater than one. Each section includes N winding turns electrically coupled in series and a resonant capacitor electrically coupled to the N winding turns of the section, where N is an integer greater than zero.

DETAILED DESCRIPTION OF THE EMBODIMENTS

Applicant has developed multilayer conductors with integrated capacitors. Each conductor layer includes two or more conductor sublayers which at least partially overlap and are separated by a dielectric layer. Each pair of overlapping conductor sublayers, and the dielectric layer disposed therebetween, form a parallel plate capacitor integrated in the conductor layer. Thus, each conductor layer includes a respective integrated capacitor.

The integrated capacitors, for example, perform a ballasting function and thereby promote equal current sharing among conductor layers when carrying high frequency AC. For example, the integrated capacitors may be configured to have respective impedance values that are much larger than the difference in inductive impedance between conductor layers, such that impedance of the integrated capacitors "swamps out" the inductive impedance difference between the conductor layers, thereby causing the conductor layers to share high frequency AC substantially equally. As another example, the integrated capacitors may be configured to have respective capacitance values so that each conductor layer has a similar impedance, thereby causing the conductor layers to share high frequency AC substantially equally.

Alternately or additionally, the integrated capacitors may be used as resonant capacitors in resonant circuits. For example, in resonant transformer or resonant induction coil applications, the integrated capacitors may serve as resonant capacitors. The resonant capacitors could also serve as DC blocking capacitors in applications requiring DC blocking.

Figure 4:
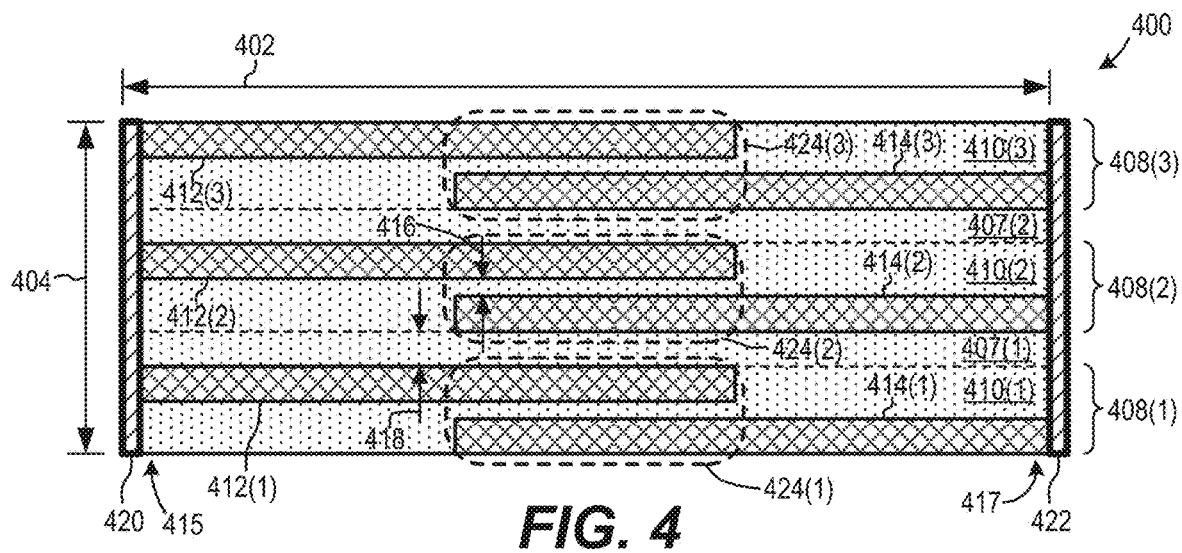
FIG. 4 is a side elevational view of a multilayer conductor with integrated capacitors, according to an embodiment.
Figure 5:
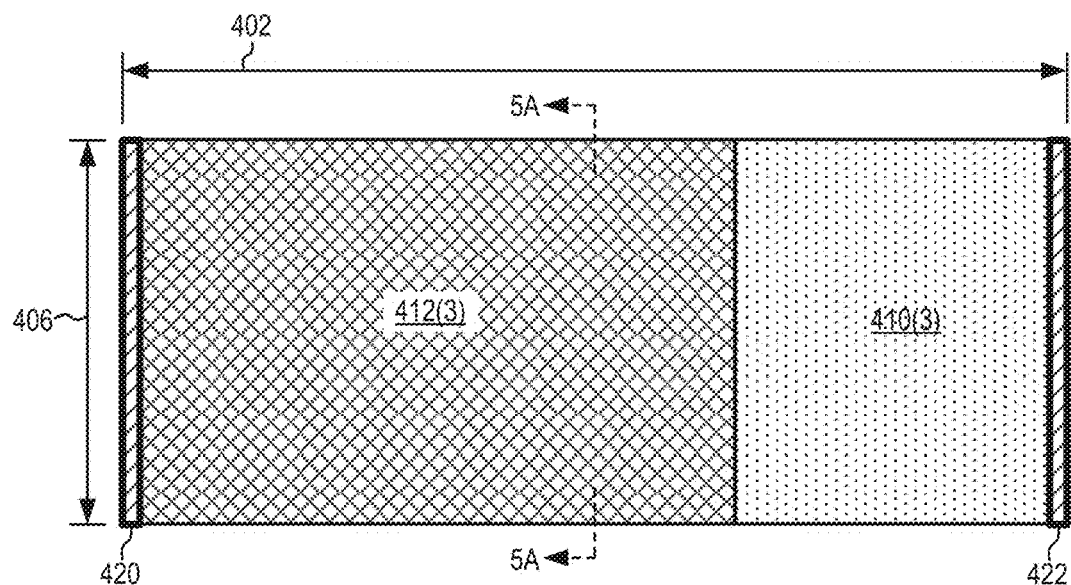
FIG. 5 is a top plan view of the FIG. 4 multilayer conductor.
Figure 6:
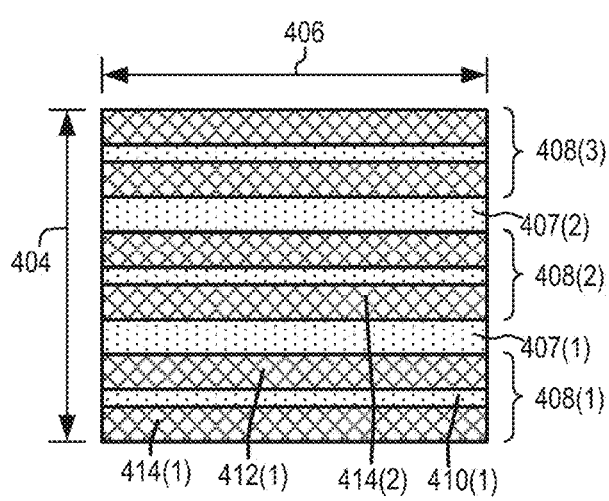
FIG. 6 is a cross-sectional view of the FIG. 4 multilayer conductor taken along line 5A-5A of FIG. 5.

FIG. 4 is a side elevational view of a multilayer conductor 400 with integrated capacitors. FIG. 5 is a top plan view of multilayer conductor 400, and FIG. 6 is a cross-sectional view of the multilayer conductor taken along line 5A-5A of FIG. 5. Multilayer conductor 400 has a length 402, a thickness 404, and a width 406. At least one separation dielectric layer 407 and plurality of conductor layers 408 are stacked in an alternating manner in the thickness 404 direction, so that adjacent conductor layers 408 are separated from each other in the thickness direction by a separation dielectric layer 407. In this document, specific instances of an item may be referred to by use of a numeral in parentheses (e.g., conductor layer 408(1)) while numerals without parentheses refer to any such item (e.g., conductor layers 408). Although multilayer conductor 400 is shown as including three conductor layers 408, the number of conductor layers 408 may be varied, as long as multilayer conductor 400 includes at least two conductor layers 408, without departing from the scope hereof.

Each conductor layer 408 includes a first conductor sublayer 412 and a second conductor sublayer 414 stacked in the thickness direction 404 so that the two sublayers at least partially overlap in the thickness direction 404, as seen when viewed cross-sectionally in the thickness 404 direction. In some embodiments, first and second conductor sublayers 412, 414 are formed of conductive foil or conductive film. The conductive foil or film typically has a thickness smaller than its skin depth at an intended operating frequency, thereby promoting efficient use of foil conductor sublayers 412, 414 and corresponding low power loss. A sublayer dielectric layer 410 separates first and second conductor sublayers 412, 414 so that the two sublayers do not contact each other. In some embodiments, a separation distance 416 between adjacent first and second conductor sublayers 412, 414 is significantly smaller than a separation distance 418 between adjacent conductor layers 408 to minimize electrostatic coupling of conductor layers. Although conductor sublayers 412, 414 are illustrated as overlapping along only part of length 402, in some alternate embodiments, the conductor sublayers overlap along the entire length 402. Ends 415 of first conductor sublayers 412 are electrically coupled together by a first terminal 420, and ends 417 of second conductor sublayers 414 are electrically coupled together by a second terminal 422. Consequently, conductor layers 408 are electrically coupled in parallel. In some alternate embodiments, though, first terminal 420 and/or second terminal 422 are omitted, so that first conductor sublayers 412 and/or second conductor sublayers 414 are electrically isolated from each other.

In each conductor layer 408, overlapping portions of conductor sublayers 412, 414, and a portion of sublayer dielectric layer 410 disposed therebetween, collectively form a parallel plate capacitor 424 integrated within the conductor layer. The capacitance value of each capacitor 424 is proportional to the area of overlap of conductor sublayers 412, 414, and the capacitance value is inversely proportional to the separation distance 416 of the overlapping sublayer portions. Accordingly, the capacitance value of each integrated capacitor 424 can be adjusted during the design and/or construction of multilayer conductor 400 by varying the overlap area of conductor sublayers 412, 414 and/or by varying separation distance 416 between adjacent conductor sublayers.

Separation dielectric layers 407 and sublayer dielectric layers 410 each include, for example, plastic, paper, glass, oil, adhesive, ceramic material, and/or air. In some embodiments, separation dielectric layers 407 and sublayer dielectric layers 410 are formed of the same material to simplify construction and to promote low cost. In some other embodiments, separation dielectric layers 407 are formed of different materials than sublayer dielectric layers 410.

Each conductor layer 408 has the same configuration, and each integrated capacitor 424 will therefore have essentially the same capacitance value, assuming separation distances 418 between adjacent conductor layers 408 are significantly greater than separation distances 416 between adjacent conductor sublayers 412, 414. It may be acceptable for integrated capacitors 424 to have equal capacitance values, for example, in ballasting applications where impedance associated with integrated capacitors 424 is much greater than inductive impedance differences between conductor layers 408.

In some alternate embodiments, two or more conductor layers 408 have different configurations, such that the respective integrated capacitors 424 of the two conductor layers have different capacitance values. It may be desirable to have different integrated capacitance values among conductor layers 408, for example, so that each conductor layer 408 has approximately the same total impedance, such as to help achieve substantially equal current sharing among conductor layers 408 when carrying high-frequency AC.

Figure 7:
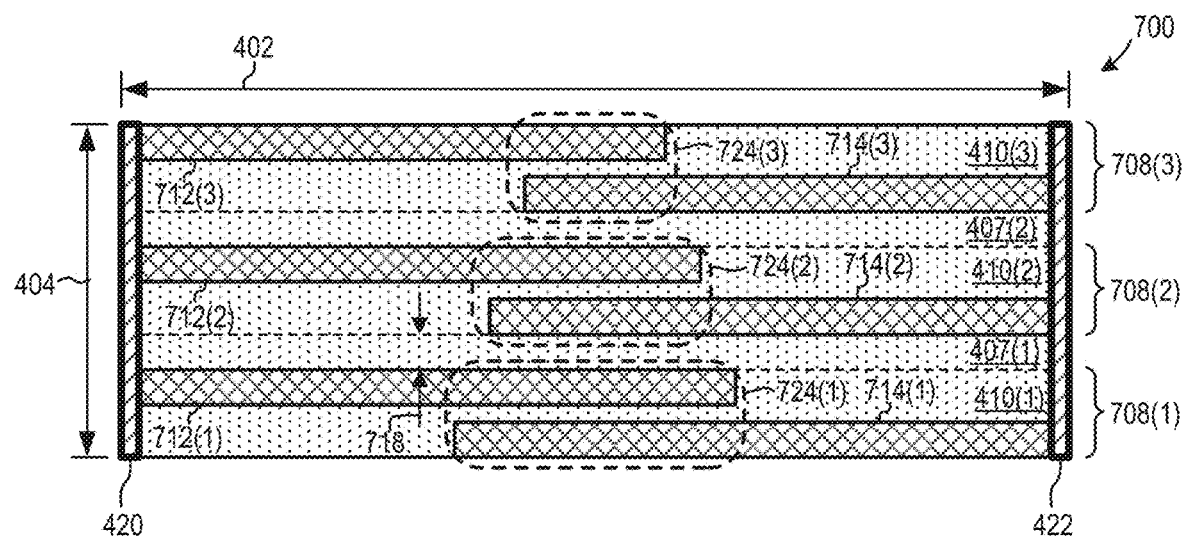
FIG. 7 is a side elevational view of another multilayer conductor with integrated capacitors, according to an embodiment.

FIG. 7 is a side elevational view of a multilayer conductor 700, which is similar to multilayer conductor 400, but where conductor layers 408 are replaced with conductor layers 708 having varying configurations. Multilayer conductor 700 has length 402, thickness 404, and width 406, like multilayer conductor 400. However, the size of the lengthwise 402 by widthwise 406 area of overlap of first and second conductor sublayers 712, 714, as seen when viewed cross-sectionally in the thickness 404 direction, progressively decreases when moving up the stack of conductor layers 708 from first conductor layer 708(1) to third conductor layer 708(3). Accordingly, conductor sublayers 712(1), 714(1) have a first area of overlap, conductor sublayers 712(2), 714(2) have a second area of overlap, and conductor sublayers 712(3), 714(3) have a third area of overlap, as seen when viewed cross-sectionally in the thickness 404 direction. A size of the first area of overlap is greater than a size of the second area of overlap, and a size of the second area of overlap is greater than a size of the third area of overlap. Consequentially, the capacitance value of integrated capacitors 724 progressively decreases when moving up the stack of conductor layers 708 from first conductor layer 708(1) to third conductor layer 708(3).

Although multilayer conductors 400 (FIG. 4) and 700 (FIG. 7) have rectangular shapes, multilayer conductors with integrated capacitors could have other shapes. For example, multilayer conductors similar to those of FIGS. 4 and 7 could be wound in a spiral shape, such as for use in an inductor or a transformer. As another example, multilayer conductors with integrated capacitors could have a tubular or cylindrical shape, such as discussed below with respect to FIG. 9, 12, or 22. As another example, multilayer conductors with integrated capacitors could have a "C" shape, such as discussed below with respect to FIG. 29, 38, or 41.

Some possible applications of multilayer conductors with integrated capacitors include, but are not limited to, the following: (1) high frequency transmission lines, such as for conducting power from a high-frequency power source to a high frequency load, (2) windings in inductors, transformers, resonant induction coils, and other magnetic components, (3) connections between components in high-frequency circuits, and (4) conductors for radio-frequency (RF) and microwave components, such as waveguides, resonators, circulators, etc.

Figure 8:
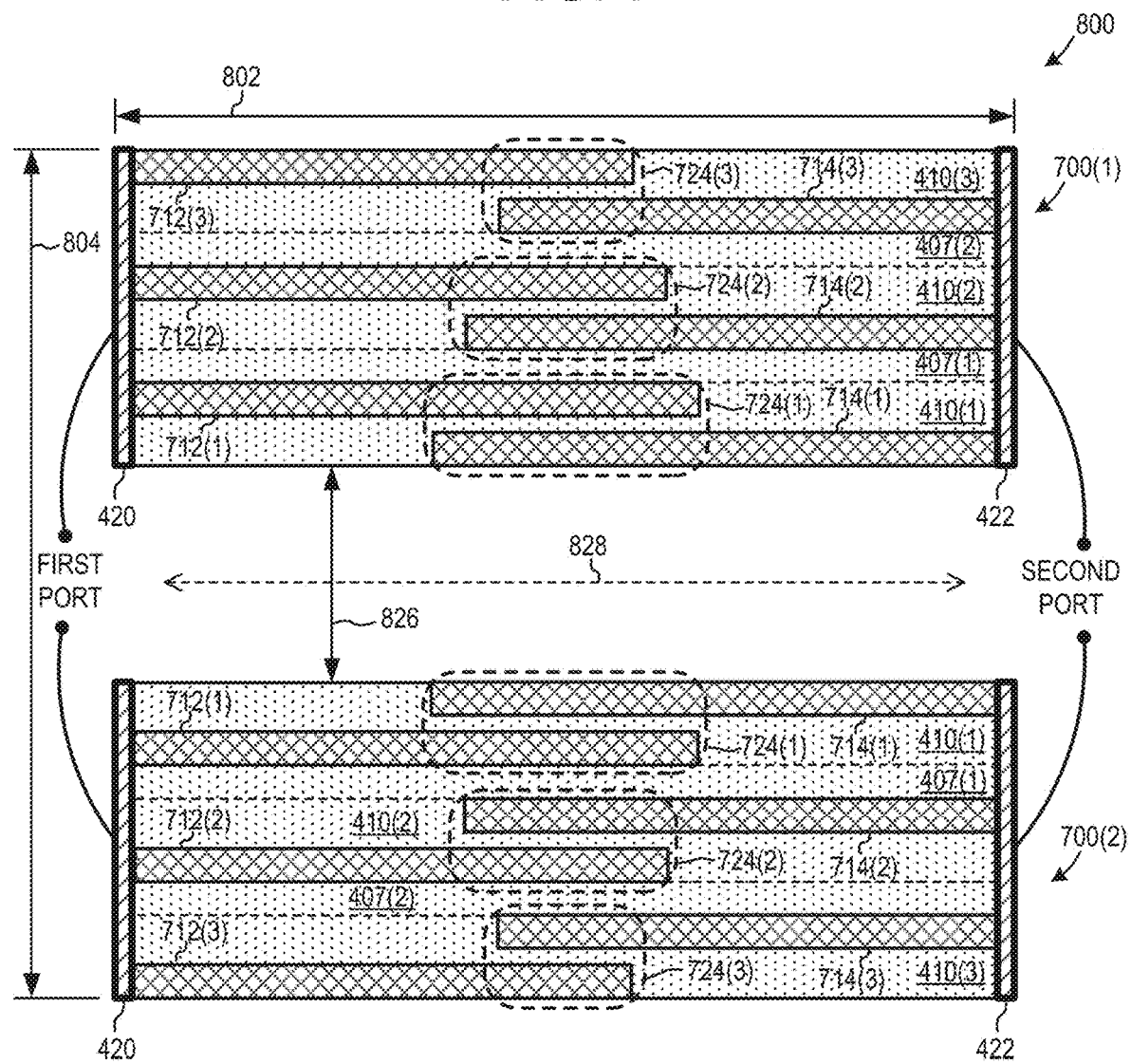
FIG. 8 is a side elevational view of a transmission line including two multilayer conductors with integrated capacitors, according to an embodiment.

FIG. 8 illustrates one example of multilayer conductors with integrated capacitors in a transmission line application. FIG. 8 is a side elevational view of a transmission line 800 including two instances of multilayer conductor 700 (FIG. 7) disposed approximately parallel to each other and separated from each other by a separation distance 826 along a lengthwise 802 direction of transmission line 800. First terminals 420 are electrically coupled to a first port of transmission line 800, and second terminals 422 are electrically coupled to a second port of transmission line 800. Accordingly, multilayer conductors 700 electrically couple the first port to the second port. Second multilayer conductor 700(2) is disposed such that it mirrors first multilayer conductor 700(1) across a center axis 828 extending in the lengthwise 802 direction, orthogonal to a thickness 804 of the transmission line, so that transmission line 800 has a symmetric configuration.

Applicant has discovered that capacitance values of integrated capacitors 724 can be tuned to cancel inductive impedance differences among conductor layers in transmission line 800, thereby promoting equal high frequency AC sharing among conductor layers 708. In particular, Applicant has discovered that each conductor layer 708 has approximately the same impedance in transmission line 800 when the following relationship holds true:

$$X_k = X_{k-1} - (M-k+1)X_{LH} \qquad \text{EQN. 3}$$

In EQN. 3, $X_k$ is capacitive reactance of conductor layer k, M is the total number of conductor layers 708, and $X_{LH}$ is the incremental inductive reactance of each conductor layer 708 of multilayer conductor 700. EQN. 3 assumes that conductor layer 708(1), which closest to center axis 828, corresponds to k=1, conductor layer 708(2), which is second closest to center axis 828, corresponds to k=2, and so on. Accordingly, integrated capacitor 724(1) of conductor layer 708(1) has a capacitive reactance $X_1$, integrated capacitor 724(2) of conductor layer 708(2) has a capacitive reactance $X_2$, and so on.

Incremental inductive reactance $X_{LH}$ can be approximated as follows:

$$X_{LH} = 2\pi f \cdot \mu_0 \cdot h \cdot \frac{\text{conductor length}}{\text{conductor width}} \qquad \text{EQN. 4}$$

In EQN. 4, f is frequency, $\mu_o$ is permeability of free space, h is spacing 718 between adjacent conductor layers 708 (see FIG. 7), "conductor length" is length 402 of each conductor layer 708, and "conductor width" is width 406 of each conductor layer (see FIG. 5). The capacitance value $C_k$ of an integrated capacitor 724 having a capacitive reactance $X_k$ can be determined as follows, where f is frequency:

$$C_k = \frac{-1}{2\pi f X_k} \qquad \text{EQN. 5}$$

EQN. 3 can be applied iteratively to find the necessary capacitive reactances of integrated capacitors 724 so that each conductor layer 708 has substantially the same high-frequency impedance in transmission line 800. For example, assume that multilayer conductor 700 has three conductor layers 708, as illustrated, and that integrated capacitor 724(1) of conductor layer 708(1) has a capacitive reactance $X_1$ of $-5X_{LH}$. EQN. 3 can be evaluated with M equal to 3, k equal to 2, and $X_1$ equal to $-5X_{LH}$ to determine the capacitive reactance $X_2$ of integrated capacitor 724(2), as follows in EQN. 6:

$$X_2 = -5X_{LH} - (3-2+1)X_{LH} = -7X_{LH} \qquad \text{EQN. 6}$$

Similarly, EQN. 3 can be evaluated with M equal to 3, k equal to 3, and $X_2$ equal to $-7X_{LH}$ to determine the capacitive reactance $X_3$ of integrated capacitor 724(3), as follows in EQN. 7

$$X_3 = -7X_{LH} - (3-3+1)X_{LH} = -8X_{LH} \qquad \text{EQN. 7}$$

EQN. 5 can then evaluated for each of $X_1$, $X_2$, and $X_3$, to determine $C_1$, $C_2$, and $C_3$, respectively, as shown below:

$$C_1 = \frac{-1}{2\pi f X_1} = \frac{-1}{2\pi(-5X_{LH})} = \frac{1}{10\pi X_{LH}} \qquad \text{EQN. 8}$$

$$C_2 = \frac{-1}{2\pi f X_2} = \frac{-1}{2\pi(-7X_{LH})} = \frac{1}{14\pi X_{LH}} \qquad \text{EQN. 9}$$

$$C_3 = \frac{-1}{2\pi f X_3} = \frac{-1}{2\pi(-8X_{LH})} = \frac{1}{16\pi X_{LH}} \qquad \text{EQN. 10}$$

$C_1$, $C_2$, and $C_3$ are the capacitance values of integrated capacitors 724(1), 724(2), and 724(3), respectively, assuming EQN. 3 holds true and integrated capacitor 724(1) has a capacitive reactance of $-5X_{LH}$. Each of EQNS. 8-10 can then be evaluated with the value of $X_{LH}$ determined from EQN. 4 to determine the actual values of $C_1$, $C_2$, and $C_3$, respectively.

Once the values $C_1$, $C_2$, and $C_3$ have been determined, conductor layers 708(1), 708(2), and 708(3) can be configured to achieve these respective capacitance values, thereby causing each conductor layer 708 to have approximately the same high frequency impedance in transmission line 800. For example, area of overlap of conductor sublayers 712(2), 714(2) can be tuned to achieve capacitance value $C_2$, area of overlap of conductor sublayers 712(3), 714(3) can be tuned to achieve capacitance value $C_3$, and so on.

The values of integrated capacitors 724 are, for example, chosen to achieve a desired objective will still adhering to EQN. 3. For example, if minimum capacitance values are desired, capacitive reactances $X_k$ can be chosen to be as large as possible, without interfering with proper circuit operation, to minimize capacitance values. As another example, if maximum use of readily available capacitance is desired, capacitive reactances $X_k$ can be chosen based on complete overlap of conductor sublayers 712(1) and 714(1) in conductor layer 708(1).

In an alternate embodiment (not shown) of transmission line 800, multilayer conductors 700 are replaced with multilayer conductors 400 (FIG. 4). In this embodiment, it may be desirable for the values of integrated capacitors 424 to be substantially larger than the inductive impedance difference between conductor layers 408, to promote equal current among conductor layers 408.

Figure 9:
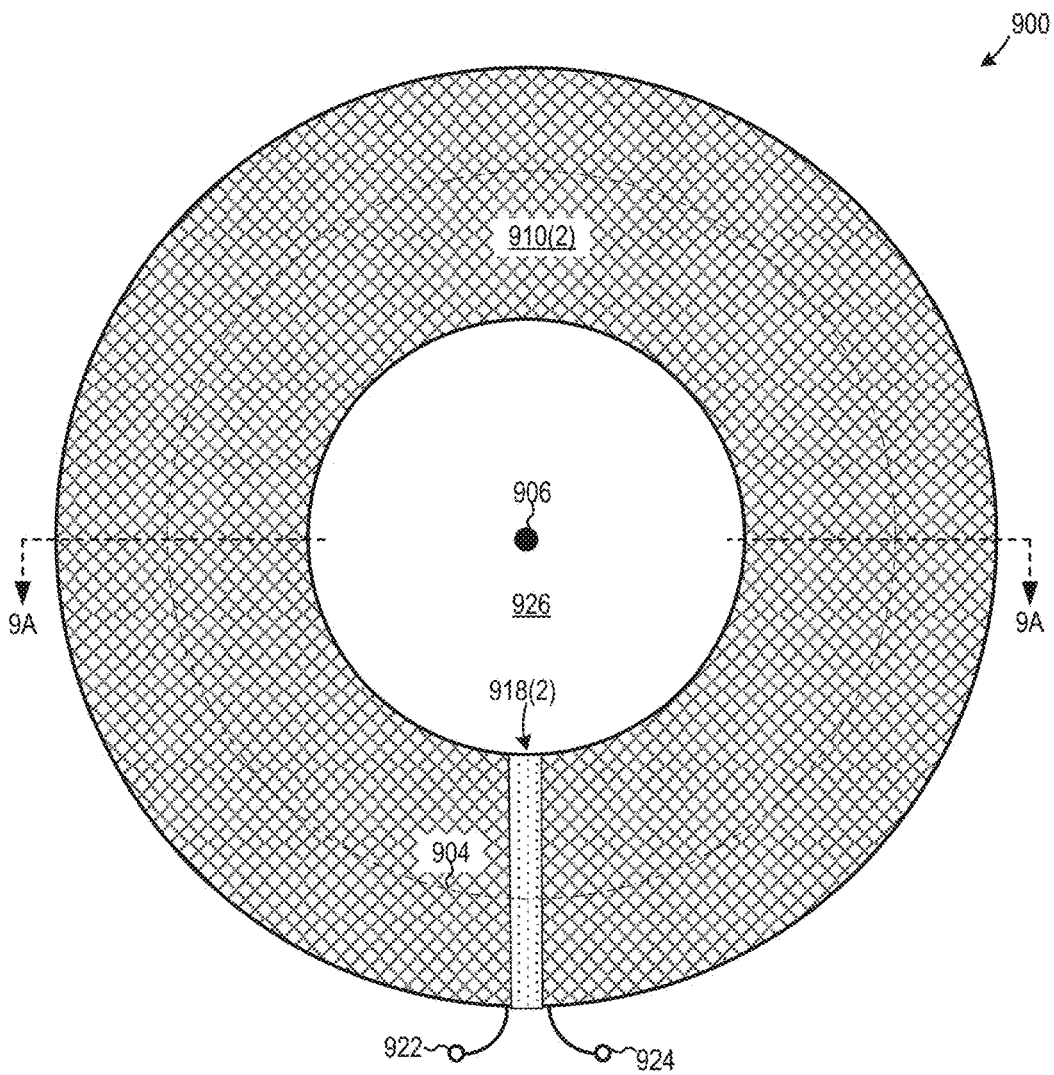
FIG. 9 is a top plan view of a multilayer conductor with integrated capacitors including a plurality of concentric tubular conductor layers, according to an embodiment.
Figure 10:
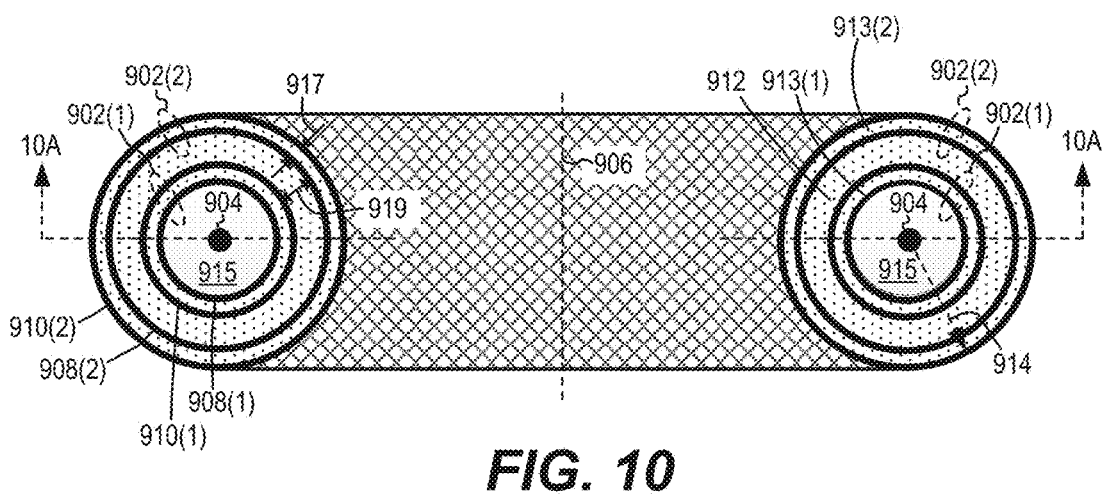
FIG. 10 is a cross-sectional view of the FIG. 9 multilayer conductor taken along line 9A-9A of FIG. 9.
Figure 11:
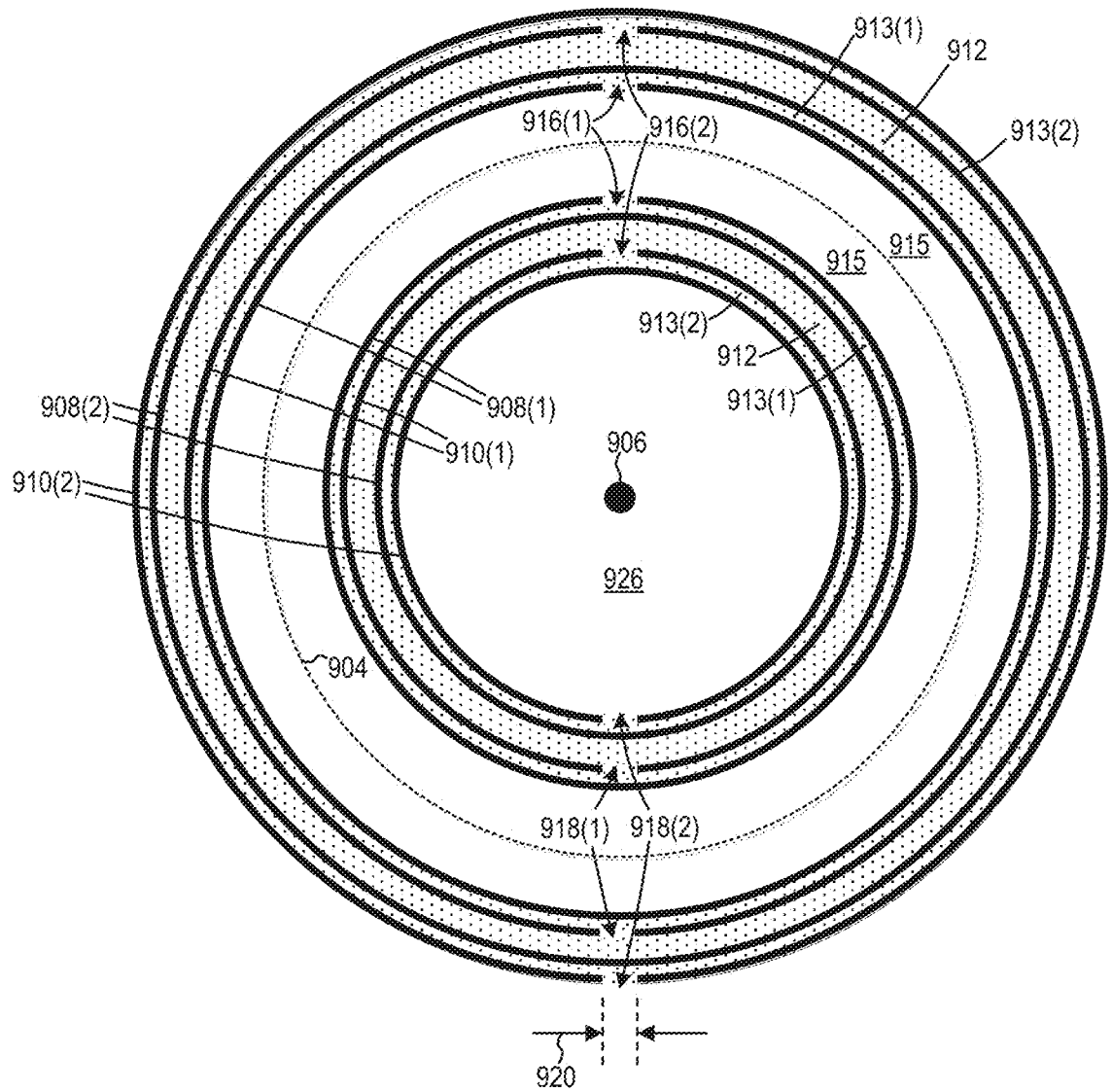
FIG. 11 is a cross-sectional view of the FIG. 9 multilayer conductor taken along line 10A-10A of FIG. 10.

FIG. 9 is a top plan view of a multilayer conductor 900 with integrated capacitors including a plurality of concentric tubular conductor layers. FIG. 10 is a cross-sectional view of multilayer conductor 900 taken along line 9A-9A of FIG. 9, and FIG. 11 is a cross-sectional view of multilayer conductor 900 taken along line 10A-10A of FIG. 10. Multilayer conductor 900 includes a plurality of tubular conductor layers 902 concentrically stacked around a common axis 904. Although multilayer conductor 900 is illustrated as including two tubular conductor layers 902, multilayer conductor 900 could include additional tubular conductor layers 902 without departing from the scope hereof. Common axis 904 forms a loop around a center axis 906 of multilayer conductor 900.

Each tubular conductor layer 902 includes a first tubular conductor sublayer 908 and a second tubular conductor sublayer 910 concentrically stacked around common axis 904. In some embodiments, first and second tubular conductor sublayers 908, 910 are formed of conductive foil or conductive film. The conductive foil or film typically has a thickness smaller than its skin depth at an intended operating frequency, thereby promoting efficient use of foil conductor sublayers 908, 910 and corresponding low power loss. In some embodiments, thickness of the foil or conductive film is inversely proportional to the square root of the number of tubular conductor layers 902, such that thickness decreases as the number of tubular conductor layers increases. A separation dielectric layer 912 separates each pair of adjacent tubular conductor layers 902 in a radial 914 direction extending from common axis 904. Consequentially, tubular conductor layers 902 and separation dielectric layers 912 are concentrically stacked in an alternating manner. A sublayer dielectric layer 913 separates adjacent first and second tubular conductor sublayers 908, 910 in the radial 914 direction within each tubular conductor layer. In some embodiments, a radial separation distance 917 between adjacent first and second conductor sublayers 908, 910 is significantly smaller than a radial separation distance 919 between adjacent conductor layers 902 to minimize electrostatic coupling of conductor layers. Separation dielectric layers 912 and sublayer dielectric layers 913 each include, for example, plastic, paper, glass, oil, adhesive, ceramic material, and/or air. Separation dielectric layers 912 and sublayer dielectric layers 913 may be formed of the same material to simplify construction and to promote low cost. Alternately, separation dielectric layers 912 and sublayer dielectric layers 913 may be formed of different materials. In some embodiments, an area 915 in the center of tubular conductor layers 902 includes a substrate, such as a dielectric substrate, while in other embodiments, area 915 is filled with air or another gas.

First and second tubular conductor sublayers 908, 910 of each tubular conductor layer 902 overlap with each other along part of common axis 904. Such overlap of tubular conductive sublayers 908, 910 within each tubular conductor layer 902 forms a capacitor integrated within the tubular conductor layer. Each first tubular conductor sublayer 908 forms a first discontinuity 916, and each second tubular conductor sublayer 910 forms a second discontinuity 918, in the toroidal direction, so that conductor sublayers 908, 910 do not completely encircle center axis 906, as illustrated in FIG. 11. Although not required, first discontinuities 916 of first tubular conductor sublayers 908 are typically angularly displaced from second discontinuities 918 of second tubular conductor sublayers 910 around center axis 906. For example, first discontinuities 916 are angularly displaced from second discontinuities 918 by 180 degrees in some embodiments, such as illustrated in FIG. 11.

The capacitance value of the respective capacitor of each tubular conductor layer 902 is proportional to the area of overlap of the layer's constituent first and second tubular conductor sublayers 908, 910. Accordingly, capacitance values can be adjusted during the design of multilayer conductor 900 by varying the respective widths 920 of first and second discontinuities in the toroidal direction. (See FIG. 11). For instance, if smaller capacitance values are desired, widths 920 of first and second discontinuities 916, 918 can be made larger. Although it is anticipated that each first and second discontinuity 916, 918 will have the same width 920, it is possible for discontinuity width to vary among tubular conductor sublayer instances without departing from the scope hereof. The capacitance value of the respective capacitor of each tubular conductor layer 902 is also inversely proportional to radial separation 917 of the layer's constituent first and second tubular conductor sublayers 908, 910, and capacitance can therefore be adjusted during multilayer conductor 900 design by varying the radial separation of the tubular conductor sublayers.

In the embodiment of FIGS. 9-11, common axis 904 forms a circle around center axis 906 such that common axis 904 forms a closed loop, as illustrated in FIGS. 9 and 11, and each tubular conductor sublayer 908, 910 has a circular cross-section perpendicular to common axis 904, such that multilayer conductor 900 has a toroidal shape. However, the shape of the loop formed by common axis 904 and/or the cross-sectional shape of tubular conductor sublayers 908, 910 could be varied without departing from the scope hereof. For example, in one alternate embodiment, common axis 904 forms a non-planar closed loop The fact that first and second tubular conductor sublayers 908, 910 do not completely encircle center axis 906 causes current to flow through multilayer conductor 900 in the direction of common axis 904, or in other words, causes current to flow in the toroidal direction. Multilayer conductor 900 optionally includes electrical terminals 922, 924 electrically coupled to opposing ends of second tubular conductor sublayer 910(2), as illustrated in FIG. 9, to provide electrical access to multilayer conductor 900. A magnetic field generated by current flowing through second tubular conductor sublayer 910(2) induces current through the remaining first and second tubular conductor sublayers 908, 910, and it therefore may be unnecessary to couple the other tubular conductor sublayers to electrical terminals. However, alternate or additional tubular conductor sublayers could be electrically coupled to electrical terminals without departing from the scope hereof.

One possible application of multilayer conductor 900 is to form a resonant inductive-capacitive device, such as a resonant inductor, for use in electrical circuits. For example, the inductance and capacitance of multilayer conductor 900 could be tuned to form a resonant device of a desired frequency. A magnetic core (not shown) is optionally disposed partially or completely around multilayer conductor 900 to achieve a desired reluctance and/or to help contain the magnetic field, in these device applications. For instance, in some embodiments, a cylindrical magnetic core is disposed in center 926 of multilayer conductor 900.

Another possible application of multilayer conductor 900 is to form a resonant induction coil for generating an external magnetic field, such as for induction heating, magnetic hyperthermia, or wireless power transfer. In these applications, an AC power source (not shown), for example, is electrically coupled to electrical terminals 922, 924 to power multilayer conductor 900. The toroidal shape of multilayer conductor 900 causes its magnetic field to be concentrated in center 926 of the multilayer conductor. Accordingly, it is anticipated that the magnetic field would be accessed in center 926 of multilayer conductor 900 in resonant induction coil applications. For example, in applications where multilayer conductor 900 forms a resonant induction coil for induction heating, it is expected that the workpiece would be disposed in center 926 to realize maximum magnetic field strength at the workpiece location. The magnetic field also extends along center axis 906, decreasing in magnitude with distance above multilayer conductor 900. In some resonant induction coil applications, the magnetic field in the region above the multilayer conductor is used, for example, for wireless power transfer or for magnetic hyperthermia.

Figure 12:
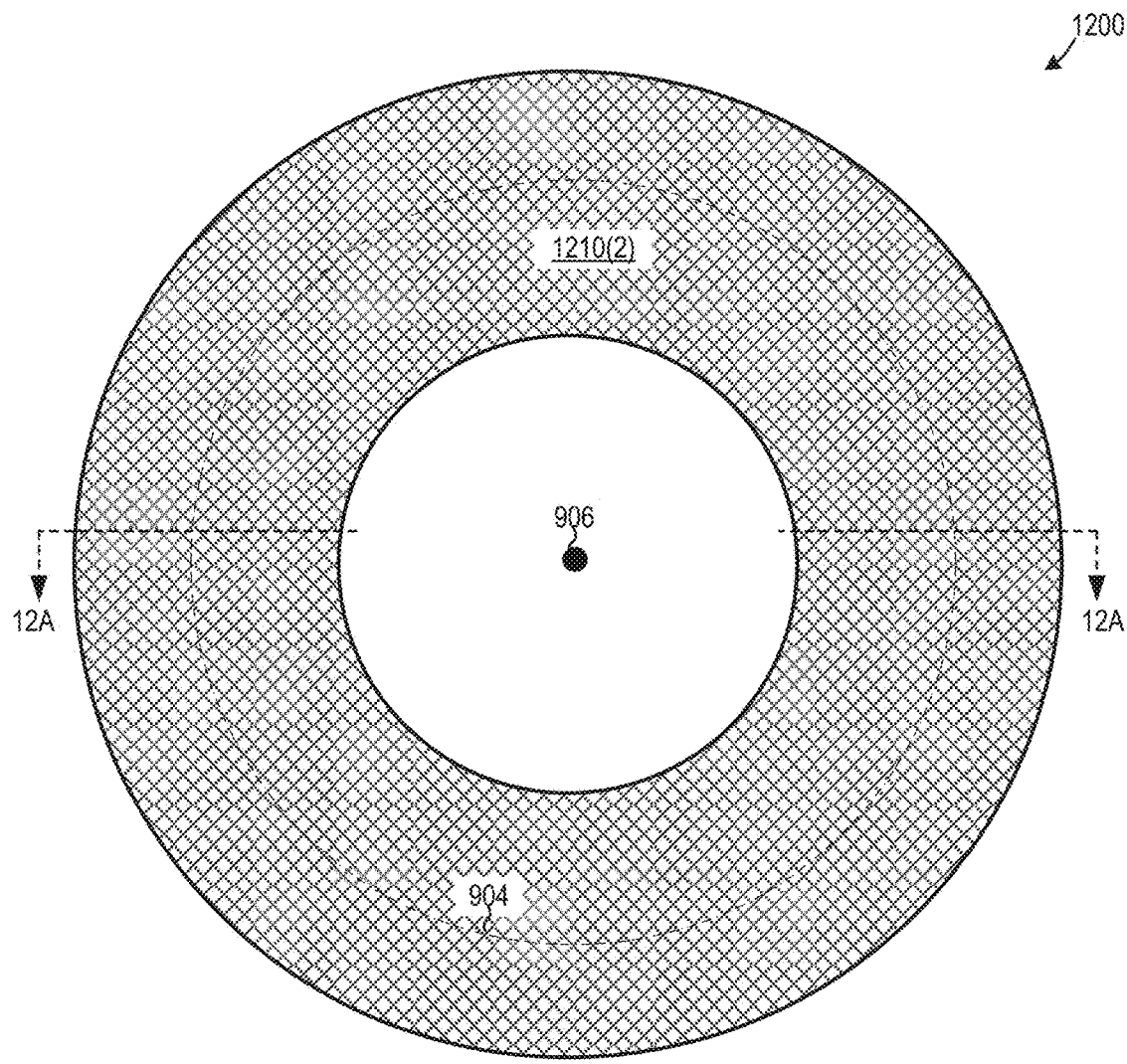
FIG. 12 is a top plan view of another multilayer conductor with integrated capacitors including a plurality of concentric tubular conductor layers, according to an embodiment.
Figure 13:
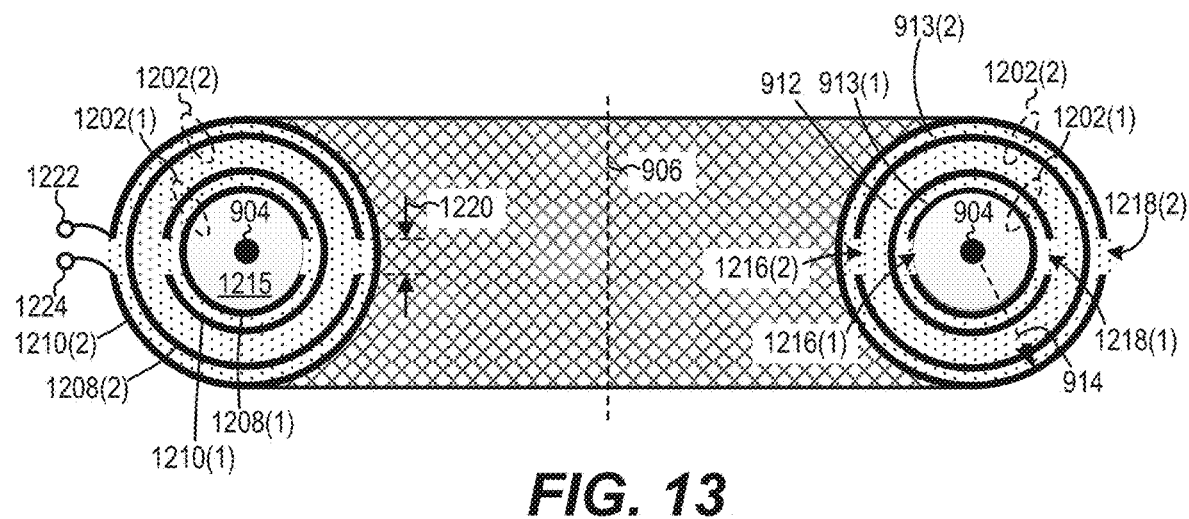
FIG. 13 is a cross-sectional view of the FIG. 12 multilayer conductor taken along line 12A-12A of FIG. 12.

FIG. 12 is a top plan view of a multilayer conductor 1200 with integrated capacitors including a plurality of concentric tubular conductor layers, and FIG. 13 is a cross-sectional view of multilayer conductor 1200 taken along line 12A-12A of FIG. 12. Multilayer conductor 1200 is similar to multilayer conductor 900 of FIGS. 9-11, but with tubular conductor layers 902 replaced with tubular conductor layers 1202. As discussed below, tubular conductor sublayer discontinuities of multilayer conductor 1200 are formed along poloidal axes such that each tubular conductor sublayer does not completely encircle common axis 904, so that the current flow and magnetic field paths of multilayer conductor 1200 differ from those of multilayer conductor 900.

Each tubular conductor layer 1202 includes a first tubular conductor sublayer 1208 and a second tubular conductor sublayer 1210 concentrically stacked around common axis 904. In some embodiments, first and second tubular conductor sublayers 1208, 1210 are formed of conductive foil or conductive film. The conductive foil or film typically has a thickness smaller than its skin depth at an intended operating frequency, thereby promoting efficient use of foil conductor sublayers 1208, 1210 and corresponding low power loss. In some embodiments, thickness of the foil or conductive film is inversely proportional to the square root of the number of tubular conductor layers 1202, such that thickness decreases as the number of tubular conductor layers increases. A separation dielectric layer 912 separates each pair of adjacent tubular conductor layers 1202, and a sublayer dielectric layer 913 separates first and second tubular conductor sublayers 1208, 1210 within each tubular conductor layer. First and second tubular conductor sublayers 1208, 1210 of each tubular conductor layer 1202 overlap with each other in radial direction 914 extending from common axis 904, along part of the length of common axis 904. Such overlap of tubular conductive sublayers 1208, 1210 within each tubular conductor layer 1202 forms a capacitor integrated within the tubular conductor layer. Each first tubular conductor sublayer 1208 forms a first notch or discontinuity 1216, and each second tubular conductor sublayer 1210 forms a second notch or discontinuity 1218, so that each tubular conductor sublayer 1208, 1210 does not completely encircle common axis 904, as illustrated in FIG. 13. Although not required, first discontinuities 1216 are typically angularly displaced from second discontinuities 1218 around common axis 904. For example, first discontinuities 1216 are angularly displaced from second discontinuities 1218 by 180 degrees in some embodiments, such as illustrated in FIG. 13.

Capacitance values can be adjusted during the design of multilayer conductor 1200 by varying the respective widths 1220 of first and second discontinuities in the poloidal direction, in a manner similar to that discussed above with respect to multilayer conductor 900. Additionally, capacitance can be adjusted during multilayer conductor 1200 design by varying the radial 914 separation of the tubular conductor sublayers, similar to as discussed above with respect to multilayer conductor 900.

The fact that first and second discontinuities 1216, 1218 do not completely encircle common axis 904 causes current to flow through multilayer conductor 900 around common axis 904, or in other words, causes current to flow in the poloidal direction. The magnetic field, in turn, is directed along common axis 904, or in other words, in the toroidal direction, within a center portion 1215 of concentric tubular conductor layers 1202. Multilayer conductor 900 optionally includes electrical terminals 1222, 1224 electrically coupled to opposing ends of second tubular conductor sublayer 1210(2), as illustrated in FIG. 13, to provide electrical access to the multilayer conductor 1200. A magnetic field generated by current flowing through second tubular conductor sublayer 1210(2) induces current through the remaining first and second tubular conductor sublayers 1208, 1210, and it therefore may be unnecessary to couple the other tubular conductor sublayers to electrical terminals. However, alternate or additional tubular conductor sublayers could be electrically coupled to electrical terminals without departing from the scope hereof.

One possible application of multilayer conductor 1200 is to form a magnetic device with integrated capacitance, such as a resonant inductor, for use in electrical circuits. For example, the inductance and capacitance of multilayer conductor 1200 could be tuned to form a resonant circuit of a desired frequency. A magnetic core (not shown) is optionally disposed within center 1215 of tubular conductor layers 1202 to achieve a desired reluctance.

Figure 14:
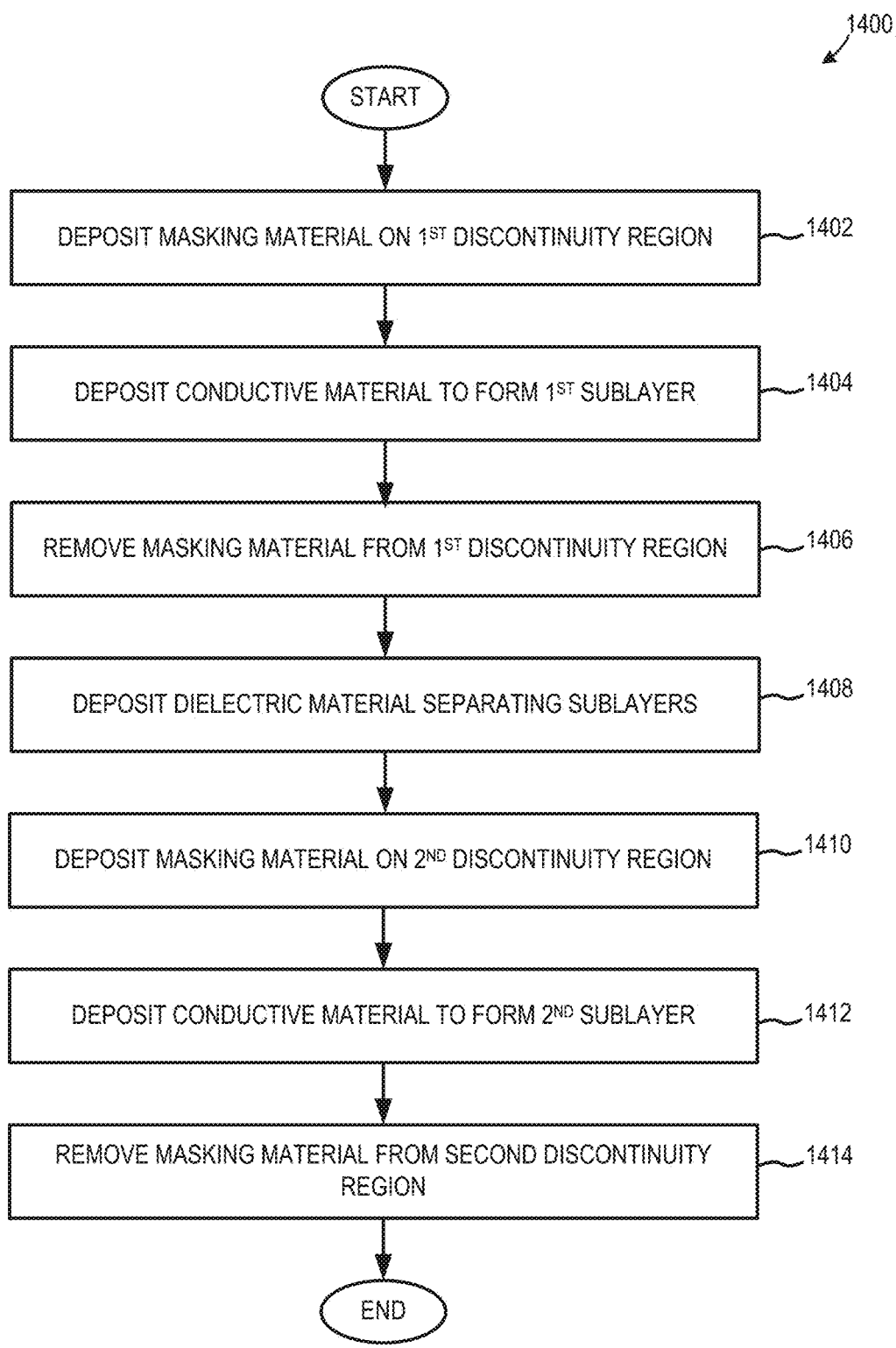
FIG. 14 illustrates a method for forming a multilayer conductor including concentric tubular conductor layers, according to an embodiment.

Certain embodiments of multilayer conductors including concentric tubular conductive layers can be formed, for example, by depositing alternating layers of conductive and dielectric material on a three-dimensional substrate formed of a low-loss dielectric material, such as a ceramic or polymer material. For example, FIG. 14 illustrates a method 1400, which is one possible method of forming a multilayer conductor including concentric tubular conductor layers. FIGS. 15-21 are top plan views illustrating one example of using method 1400 to form tubular conductor layer 902(1) of multilayer conductor 900. It should be understood, though, that multilayer conductor 900 could be formed by a method other than method 1400. Additionally, method 1400 could be used to form other multilayer conductors including concentric tubular conductive layers, such as multilayer conductor 1200.

Figure 15:
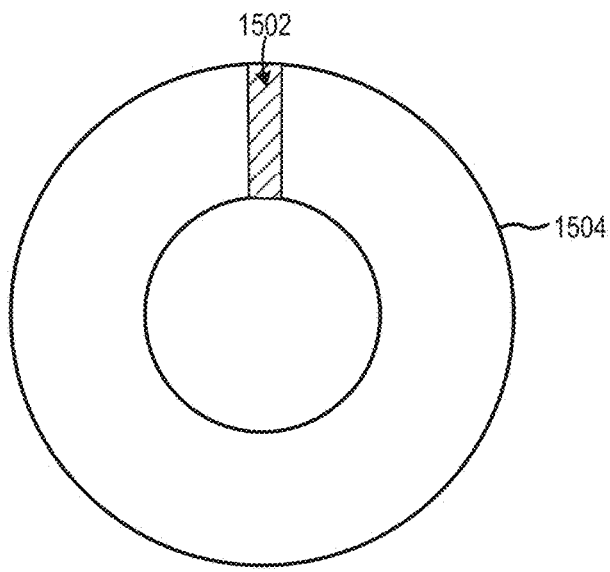
FIG. 15 is a top plan view of a toroidal-shaped substrate including a masked first discontinuity region.
Figure 16:
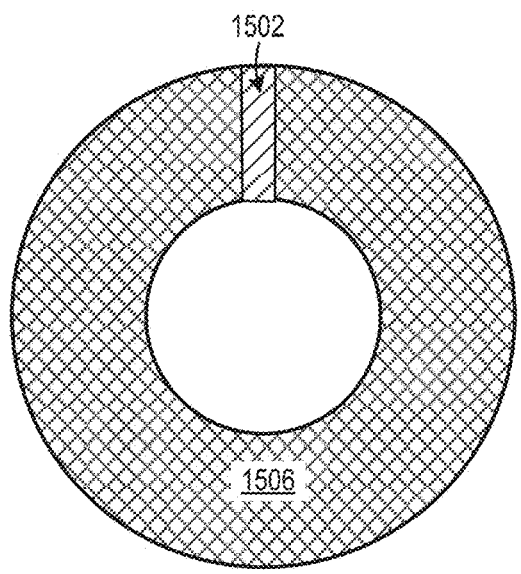
FIG. 16 is a top plan view illustrating the FIG. 15 device after deposition of a conductive material layer.

Method 1400 begins with step 1402 of depositing masking material on a first discontinuity region of a three-dimensional dielectric substrate. One example of step 1402 is depositing masking material on a first discontinuity region 1502 of a toroidal-shaped substrate 1504 formed of a ceramic or a polymer material, as illustrated in FIG. 15. First discontinuity region 1502 corresponds to discontinuity 916(1) of multilayer conductor 900. In step 1404, a thin layer of conductive material, such as copper, silver, gold, or aluminum film, is deposited over an entire outer surface of the substrate, except in the discontinuity region masked in step 1402, to form a first tubular conductor sublayer. One example of step 1404 is depositing conductive material layer 1506 over the entire outer surface of substrate 1504, except in first discontinuity region 1502, as illustrated in FIG. 16. Conductive material layer 1506 corresponds to first tubular conductor layer 908(1) of multilayer conductor 900.

Figure 17:
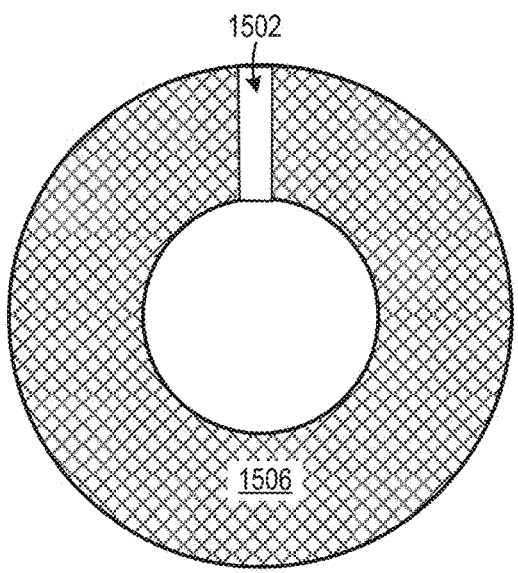
FIG. 17 is a top plan view illustrating the FIG. 16 device after removal of masking material from the first discontinuity region.
Figure 18:
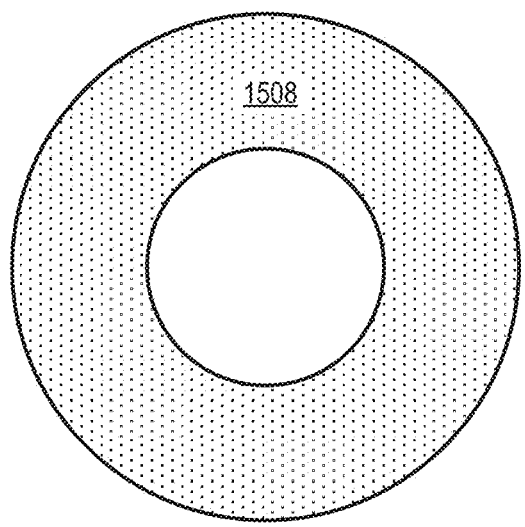
FIG. 18 is a top plan view illustrating the FIG. 17 device after deposition of a dielectric layer.
Figure 19:
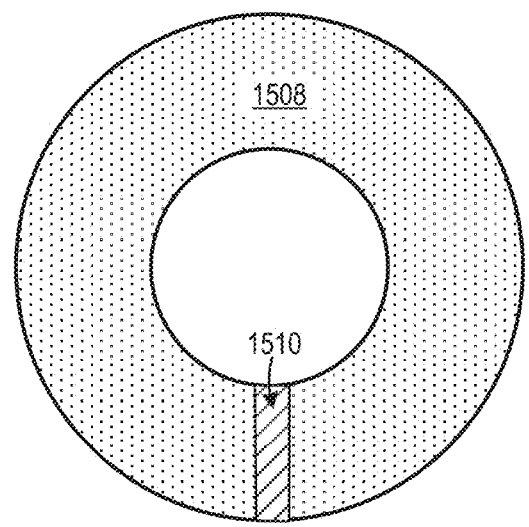
FIG. 19 is a top plan view illustrating the FIG. 18 device after deposition of masking material in a second discontinuity region.

In step 1406, the masking material deposited in the first discontinuity region is removed. In one example of step 1406, masking material is removed from first discontinuity region 1502, as illustrated in FIG. 17. Dielectric material is deposited over the resulting device's entire outer surface in step 1408, to separate adjacent tubular conductor sublayers. FIG. 18 illustrates one example of this step where a dielectric material layer 1508 is disposed over the entire outer surface of the resulting device after masking material has been removed from first discontinuity region 1502. Dielectric material layer 1508 corresponds to sublayer dielectric layer 913(1) separating first tubular conductor sublayer 908(1) from second tubular conductor sublayer 910(1) in multilayer conductor 900. In step 1410, masking material is deposited on a second discontinuity region of the device, which is, for example, opposite of the first discontinuity region. One example of step 1410 is depositing masking material on a second discontinuity region 1510 of the device after depositing dielectric material layer 1508, as illustrated in FIG. 19, where the second discontinuity region corresponds to second discontinuity 918(1) of multilayer conductor 900.

Figure 20:
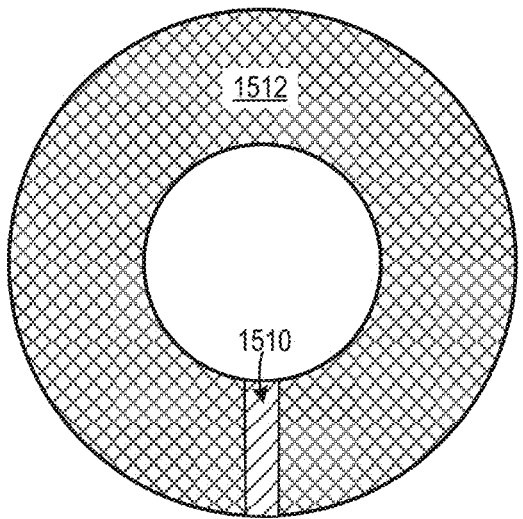
FIG. 20 is a top plan view illustrating the FIG. 19 device after deposition of another conductive layer.
Figure 21:
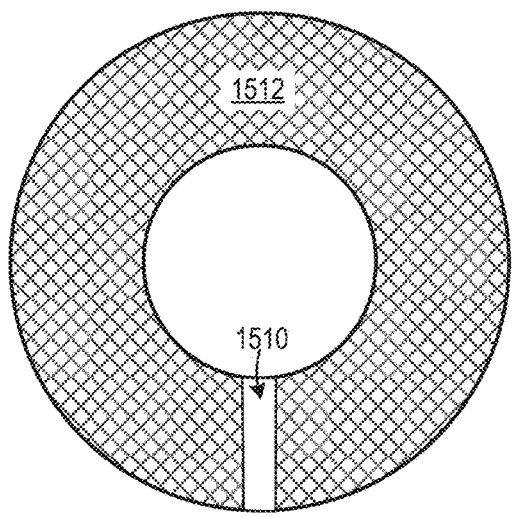
FIG. 21 is a top plan view illustrating the FIG. 20 device after removal of masking material from the second discontinuity region.

In step 1412, conductive material is applied over the resulting device's entire outer surface, except in the second discontinuity region where masking material was applied in step 1410. One example of step 1412 is depositing conductive material layer 1512 over the device's entire outer surface, except in second discontinuity region 1510, to form a second tubular conductor sublayer, as illustrated in FIG. 20. Conductive material layer 1512 corresponds to second tubular conductor sublayer 910(1) of multilayer conductor 900. The masking material deposited in step 1410 is then removed in step 1414. In one example of step 1414, masking material is removed from second discontinuity region 1510, as illustrated in FIG. 21.

Thus, steps 1402-1414 collectively form a tubular conductor layer including two tubular conductor sublayers separated by a dielectric layer. Additional conductor layers can be deposited, if desired, by repeating steps 1402-1414 for each additional conductor layer, where each repetition of steps 1402-1414 is separated by an additional step of depositing dielectric material over the device's entire outer surface to form a separation dielectric layer.

Figure 22:
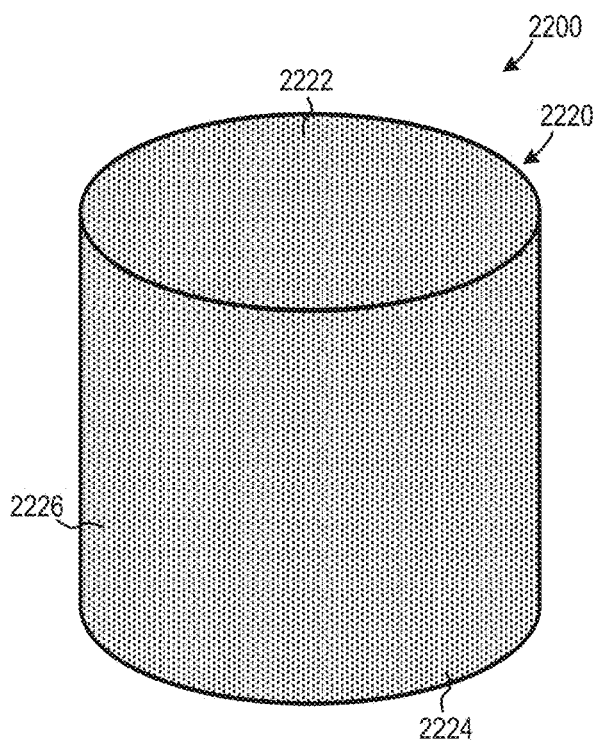
FIG. 22 is a perspective view of a device including yet another multilayer conductor with integrated capacitors, according to an embodiment.
Figure 23:
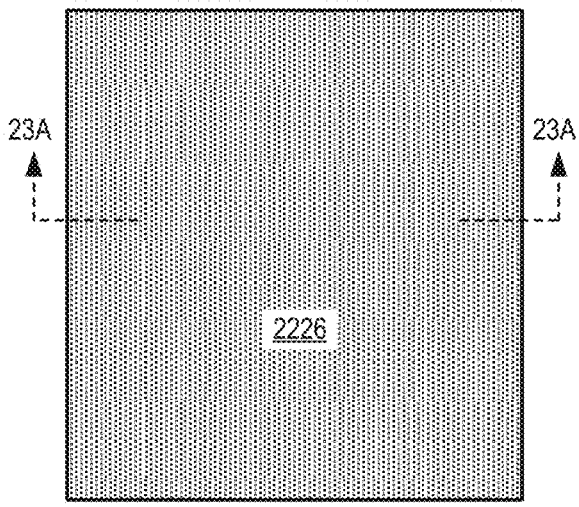
FIG. 23 is a side elevational view of the FIG. 22 device.
Figure 24:
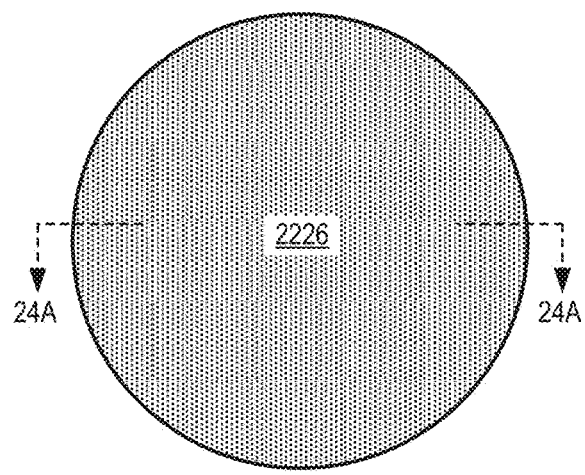
FIG. 24 is a top plan view of the FIG. 22 device.
Figure 25:
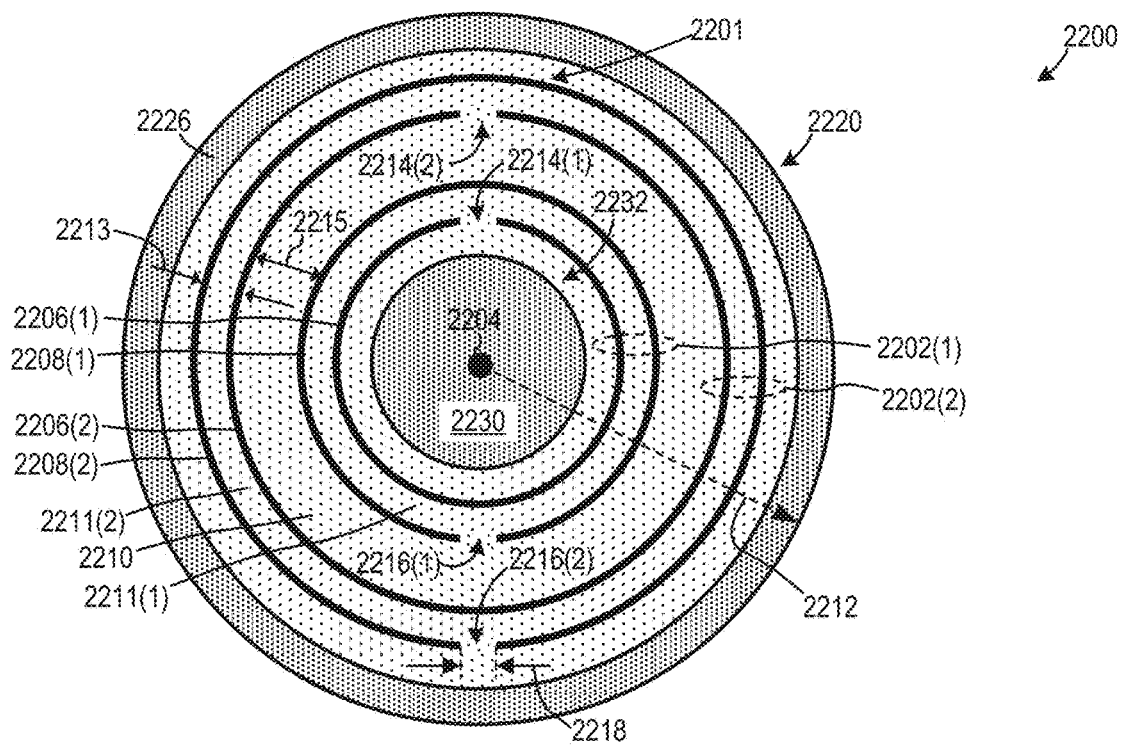
FIG. 25 is a cross-sectional view of the FIG. 22 device taken along line 23A-23A of FIG. 23.
Figure 26:
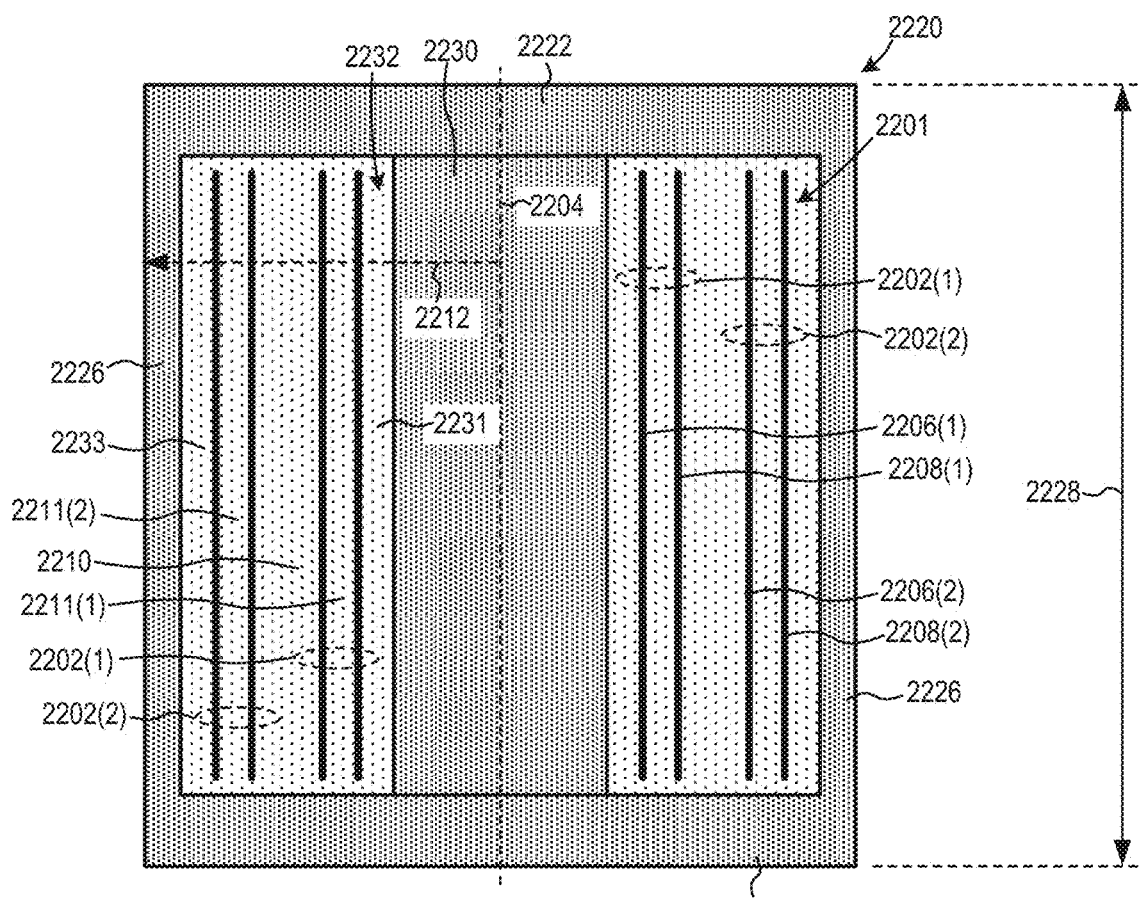
FIG. 26 is a cross-sectional view of the FIG. 22 device taken along line 24A-24A of FIG. 24.

FIGS. 22-26 illustrate a device 2200 including a multilayer conductor 2201, where multilayer conductor 2201 is another embodiment of a multilayer conductor with integrated capacitors and including a plurality of concentric tubular conductor layers. FIG. 22 is a perspective view of device 2200, FIG. 23 is a side elevational view of device 2200, and FIG. 24 is a top plan view of device 2200. FIG. 25 is a cross-sectional view of device 2200 taken along line 23A-23A of FIG. 23, and FIG. 26 is a cross-sectional view of the device along line 24A-24A of FIG. 24.

Multilayer conductor 2201 includes a plurality of tubular conductor layers 2202 concentrically stacked around a common or center axis 2204, as illustrated in FIGS. 25 and 26. Although multilayer conductor 2201 is illustrated as including two tubular conductor layers 2202, multilayer conductor 2201 could include additional tubular conductor layers 2202 without departing from the scope hereof. Each tubular conductor layer 2202 includes a first tubular conductor sublayer 2206 and a second tubular conductor sublayer 2208 concentrically stacked around center axis 2204. In some embodiments, first and second tubular conductor sublayers 2206, 2208 are formed of conductive foil or conductive film. The conductive foil or film typically has a thickness smaller than its skin depth at an intended operating frequency, thereby promoting efficient use of foil conductor sublayers 2206, 2208 and corresponding low power loss. In some embodiments, thickness of the foil or conductive film is inversely proportional to the square root of the number of tubular conductor layers 2202, such that thickness decreases as the number of tubular conductor layers increases.

A separation dielectric layer 2210 separates each pair of adjacent tubular conductor layers 2202. Consequentially, tubular conductor layers 2202 and separation dielectric layers 2210 are concentrically stacked around center axis 2204. A sublayer dielectric layer 2211 separates adjacent first and second tubular conductor sublayers 2206, 2208 within each tubular conductor layer. In some embodiments, a radial 2912 separation distance 2213 between adjacent first and second conductor sublayers 2206, 2208 is significantly smaller than a radial 2912 separation distance 2215 between adjacent conductor layers 2202 to minimize electrostatic coupling of conductor layers. Separation dielectric layers 2210 and sublayer dielectric layers 2211 each include, for example, plastic, paper, glass, oil, adhesive, ceramic material, and/or air. Separation dielectric layers 2210 and sublayer dielectric layers 2211 may be formed of the same material to simplify construction and to promote low cost. Alternately, separation dielectric layers 2210 and sublayer dielectric layers 2211 may be formed of different materials.

First and second tubular conductor sublayers 2206, 2208 of each tubular conductor layer 2202 at least partially overlap with each other. Such overlap of tubular conductive sublayers 2206, 2208 within each tubular conductor layer 2202 forms a capacitor integrated within the tubular conductor layer. Each first tubular conductor sublayer 2206 forms a first notch or discontinuity 2214, such that the first tubular conductor sublayer does not completely encircle center axis 2204, as illustrated in FIG. 25. Similarly, each second tubular conductor sublayer 2208 forms a second notch or discontinuity 2216, such that the second tubular conductor sublayer does not completely encircle center axis 2204, as also illustrated in FIG. 25. Although not required, first discontinuities 1214 are typically angularly displaced from second discontinuities 1216 around center axis 2204. For example, first discontinuities 2214 are angularly displaced from second discontinuities 2216 by 180 degrees in some embodiments, such as illustrated in FIG. 25. Although each discontinuity 1214, 1216 is illustrated as having a rectangular shape, the shape of the discontinuities could vary without departing from the scope hereof.

Capacitance values can be adjusted during the design of multilayer conductor 2201 by varying the respective widths 2218 of first and second discontinuities 2214, 2216, in a manner similar to that discussed above with respect to multilayer conductor 900. Additionally, capacitance can be adjusted during multilayer conductor's 2201 design by varying radial separation distance 2213 of the tubular conductor sublayers, similar to as discussed above with respect to multilayer conductor 900.

Although not required, device 2200 typically includes a magnetic core 2220 enclosing tubular conductor layers 2202 to help achieve desired reluctance, to help contain a magnetic field generated by current flowing through tubular conductor layers 2202, and/or to influence the shape of the magnetic field lines in the region of tubular conductor layers 2202 to be substantially parallel to the layers. For example, in some embodiments, magnetic core 2220 has a hollow cylindrical shape and is centered with respect to center axis 2204, as illustrated in FIGS. 25 and 26. In these embodiments, magnetic core 2220 includes a first end magnetic element 2222, a second end magnetic element 2224, and an outer ring 2226. First end magnetic element 2222 opposes second end magnetic element 2224 in a lengthwise 2228 direction parallel to center axis 2204. Outer ring 2226 is centered with respect to center axis 2204, and outer ring 2226 also joins first and second end magnetic elements 2222, 2224 in the lengthwise 2228 direction. Accordingly, multilayer conductor 2201 is disposed between first and second end magnetic elements 2222, 2224 and within outer ring 2226.

A magnetic center post 2230 is disposed in a center 2232 of tubular conductor layers 2202 along center axis 2204. Magnetic center post 2230 at least partially joins first and second end magnetic elements 2222, 2224 in the lengthwise 2228 direction. Magnetic flux generated by current flowing through tubular conductor layers 2202 flows in a loop through magnetic center post 2230, first end magnetic element 2222, outer ring 2226, and second end magnetic element 2224. Although not required, additional dielectric material 2231, 2233 typically separates tubular conductor layers 2202 from magnetic center post 2230 and outer ring 2226, respectively. Although FIG. 26 delineates magnetic center post 2230 from first end magnetic element 2222 and second end magnetic element 2224 to help the viewer distinguish the magnetic center post from the end magnetic elements, the magnetic center post could be joined with one or more of the end magnetic elements without departing from the scope hereof. Additionally, although outer ring 2226 and end magnetic elements 2222, 2224 are illustrated as being part of a single-piece magnetic core, magnetic core 2220 could be formed from two or more magnetic pieces that are joined together.

Magnetic center post 2230 could have the same composition as magnetic core 2220 to simplify construction. Alternately, magnetic center post 2230 could have a different composition from magnetic core 2220, such as to help achieve a desired reluctance. For example, in some embodiments, magnetic core 2220 is formed of a high permeability ferrite material, and magnetic center post 2230 is formed of a lower permeability material including magnetic materials disposed in a non-magnetic binder, such that the magnetic center post has a distributed non-magnetic "gap." In these embodiments, a desired reluctance is achieved, for example, by adjusting the ratio of magnetic material and non-magnetic binder forming magnetic center post 2230.

Figure 27:
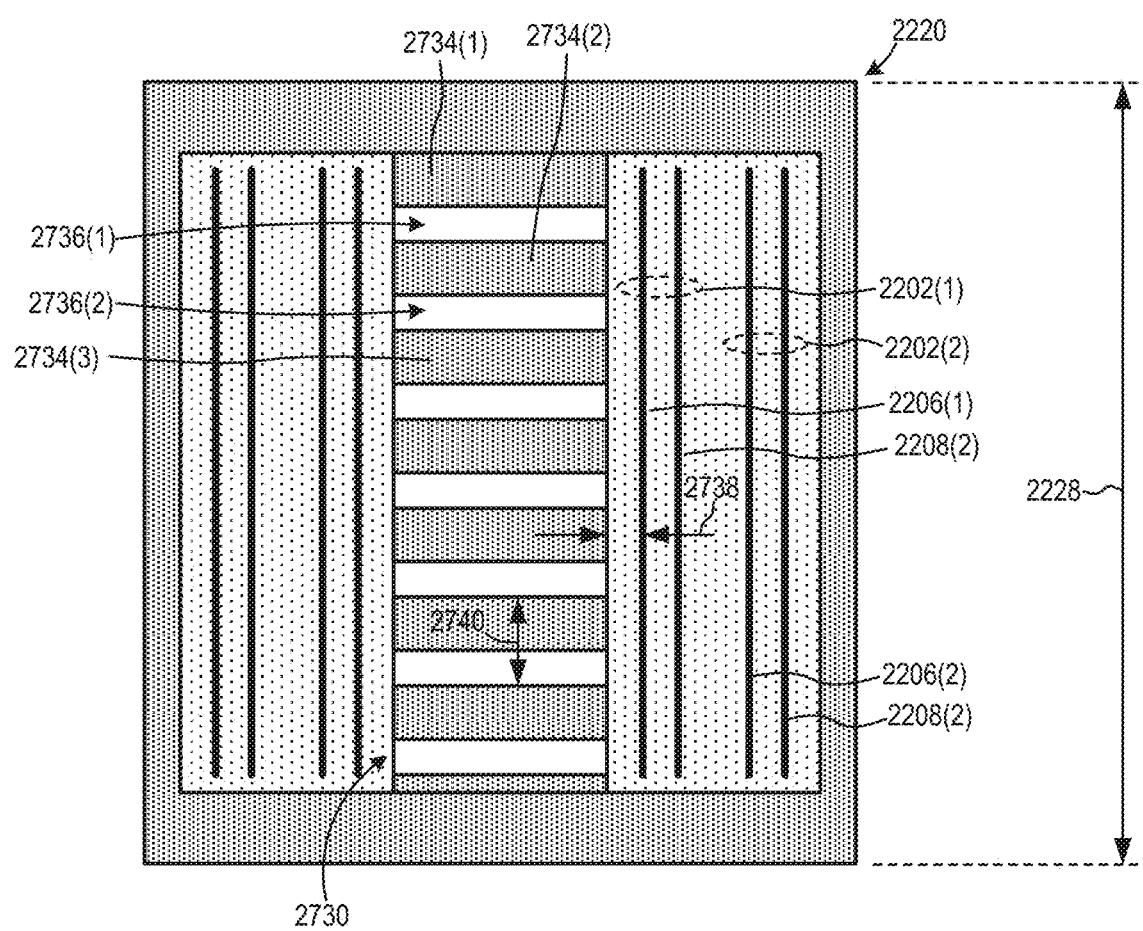
FIG. 27 illustrates a cross-sectional view of an alternate embodiment of the FIG. 22 device where a magnetic center post is replaced with a magnetic center post forming a quasi-distributed gap.

Magnetic center post 2230 could also form a discrete gap (not shown) filled with non-magnetic material, or with material having a lower magnetic permeability than the remainder of the magnetic center post, to help achieve a desired reluctance. However, a single gap may cause magnetic field lines, which generally flow in the lengthwise 2228 direction through magnetic center post 2230, to curve in the vicinity of the gap, such that the magnetic field lines induce eddy current losses in tubular conductor layers 2202. Such eddy-current losses can be reduced by forming a quasi-distributed gap from multiple small gaps, instead of a single large gap, in magnetic center post 2230. For example, FIG. 27 illustrates a cross-sectional view, analogous to the cross-sectional view of FIG. 26, of an alternate embodiment where magnetic center post 2230 is replaced with a magnetic center post 2730 formed of a plurality of discrete magnetic elements 2734 separated from each other in the lengthwise direction 2228. Lengthwise 2228 gaps 2736 between adjacent discrete magnetic elements 2734 collectively form a quasi-distributed gap of magnetic center post 2730. Only some of discrete magnetic elements 2734 and gaps 2736 are labeled in FIG. 27 to promote illustrative clarity. Induced eddy current losses are minimized when separation distance 2738 between magnetic center post 2230 and tubular conductor sublayer 2206(1) is at least four times a lengthwise pitch 2740 of gaps 2736.

In another alternate embodiment of device 2200, first and second end magnetic elements 2222, 2224 are each formed of a high permeability magnetic material, and outer ring 2226 and magnetic center post 2230 are each formed of a low permeability magnetic material. The low permeability magnetic material in this embodiment includes, for example, a low permeability homogenous magnetic material, a low permeability composite magnetic material, a high permeability magnetic material including multiple gaps forming a quasi-distributed gap, or air.

Figure 28:
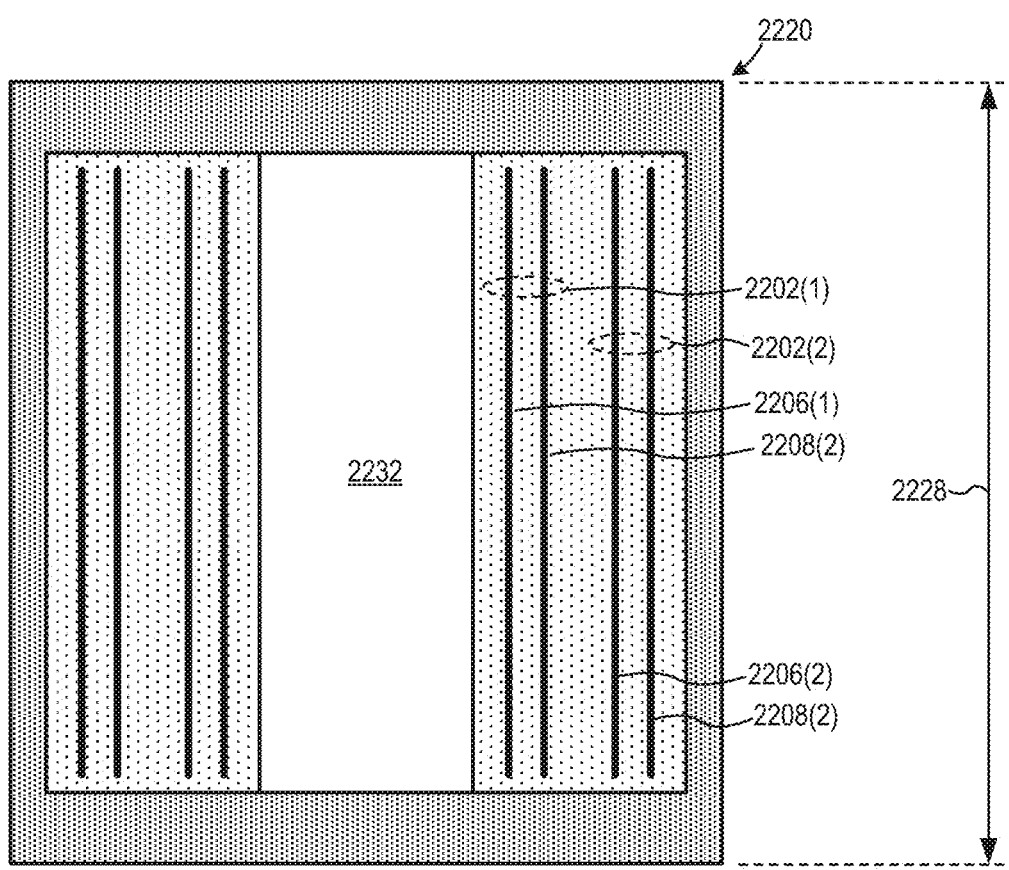
FIG. 28 illustrates a cross-sectional view of an alternate embodiment of the FIG. 22 device where a magnetic center post is omitted.

Magnetic center post 2230 could even be completely omitted. For example, FIG. 28 illustrates a cross-sectional view, analogous to the cross-section view of FIG. 26, of an alternate embodiment where magnetic center post 2230 is omitted.

Device 2200 optionally includes electrical terminals (not shown) electrically coupled to opposing ends of one or more tubular conductor sublayers 2206, 2208, to provide electrical access to the multilayer conductor 2201. A magnetic field generated by current flowing through one tubular conductor sublayer 2206 or 2208 induces current through the remaining first and second tubular conductor sublayers 2206, 2208.

Therefore, it may be unnecessary to couple all other tubular conductor sublayers to electrical terminals.

One possible application of device 2200 is to form a resonant inductive-capacitive device, such as a resonant inductor, for use in electrical circuits. Another possible application of device 2200 is to form a resonant induction coil for generating a magnetic field, such as for induction heating, magnetic hyperthermia, or wireless power transfer. In these applications, an AC power source (not shown), for example, is electrically coupled to opposing ends of at least one conductor sublayer to power multilayer conductor 2201. While not required, it is anticipated that the magnetic field would be accessed in center 2232 of device 2200 in induction coil applications. For example, in applications where device 2200 forms a resonant induction coil for induction heating, it is expected that the workpiece would be disposed in center 2232 to realize maximum magnetic field strength. In such embodiments, magnetic center post 2230 is omitted to enable placement of the workpiece in center 2232, or the workpiece is disposed in a gap of magnetic center post 2230.

Although device 2200 is shown as being cylindrical, it could alternately have a different shape without departing from the scope hereof. For example, tubular conductor layers 2202 could alternately have an oval or rectangular cross-section, instead of a circular cross-section, as seen when viewed cross-sectionally along line 23A-23A of FIG. 23. Additionally, although magnetic center post 2230 is illustrated as having a cylindrical shape, it could also have a different shape without departing from the scope hereof.

Figure 29:
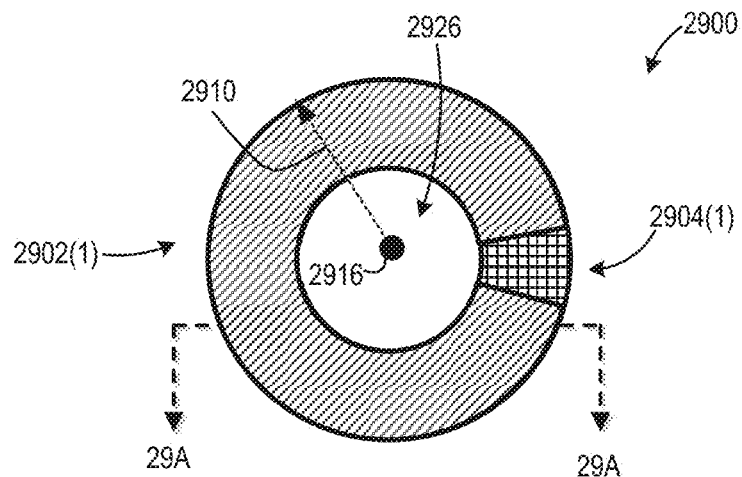
FIG. 29 shows a top plan view of a multilayer conductor with integrated capacitors including a stack of C-shaped foil conductors, according to an embodiment.
Figure 30:
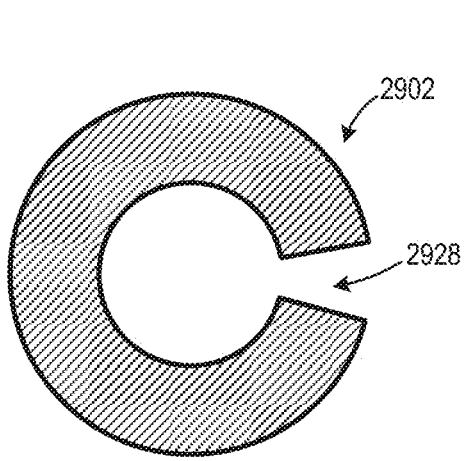
FIGS. 30 and 31 show top plan views of first and second foil conductor sublayers, respectively, of the FIG. 29 multilayer conductor.
Figure 31:
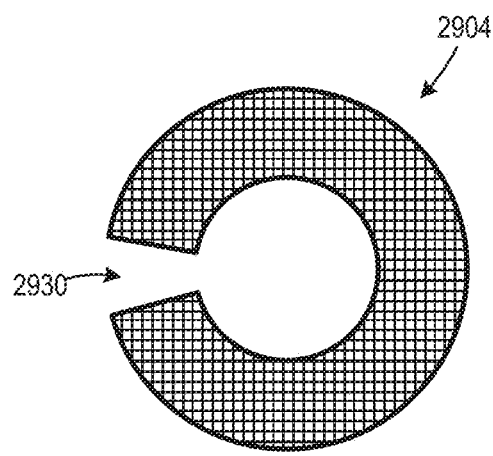
Figure 32:
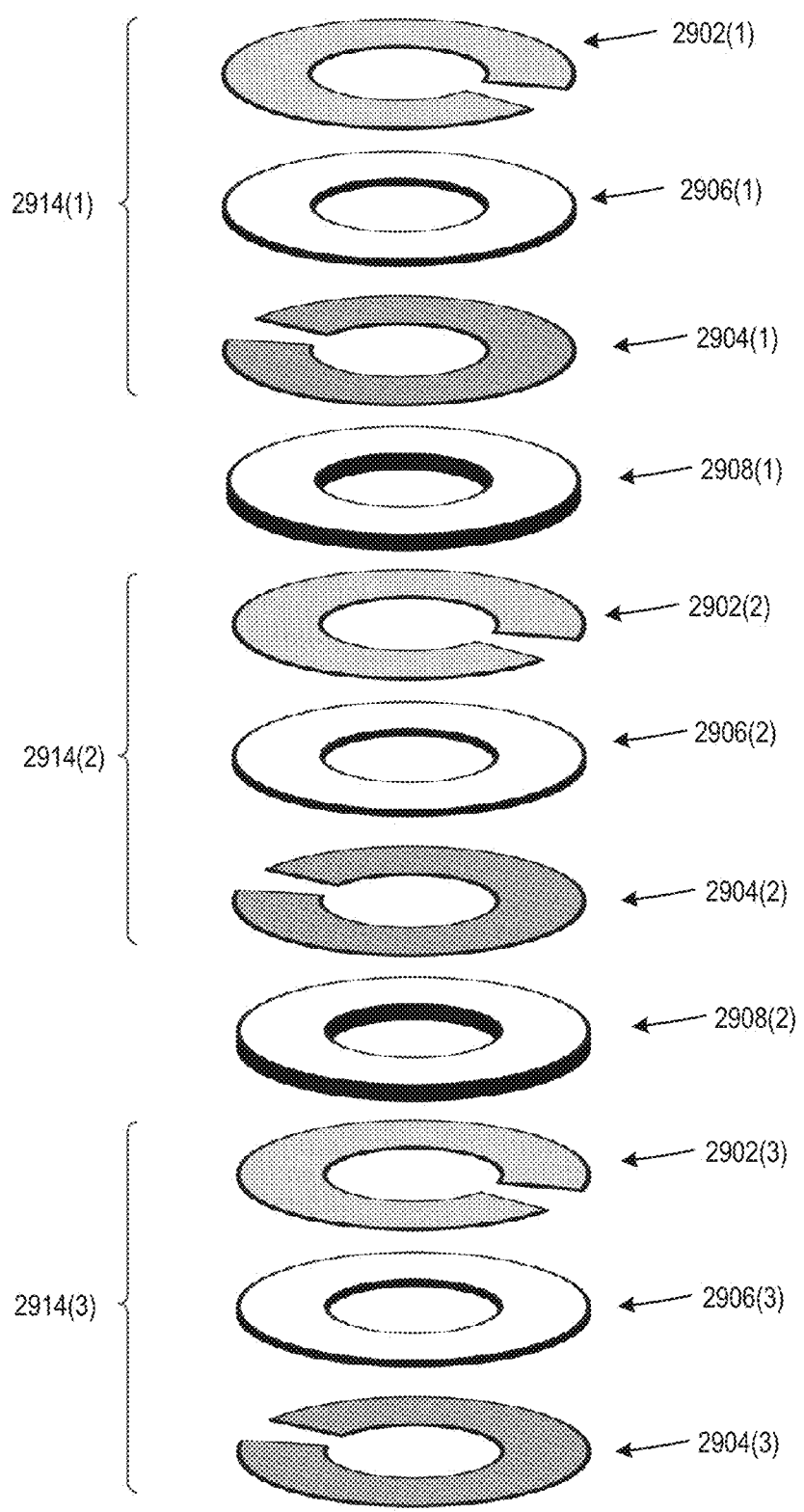
FIG. 32 shows an exploded perspective view of the FIG. 29 multilayer conductor.
Figure 33:
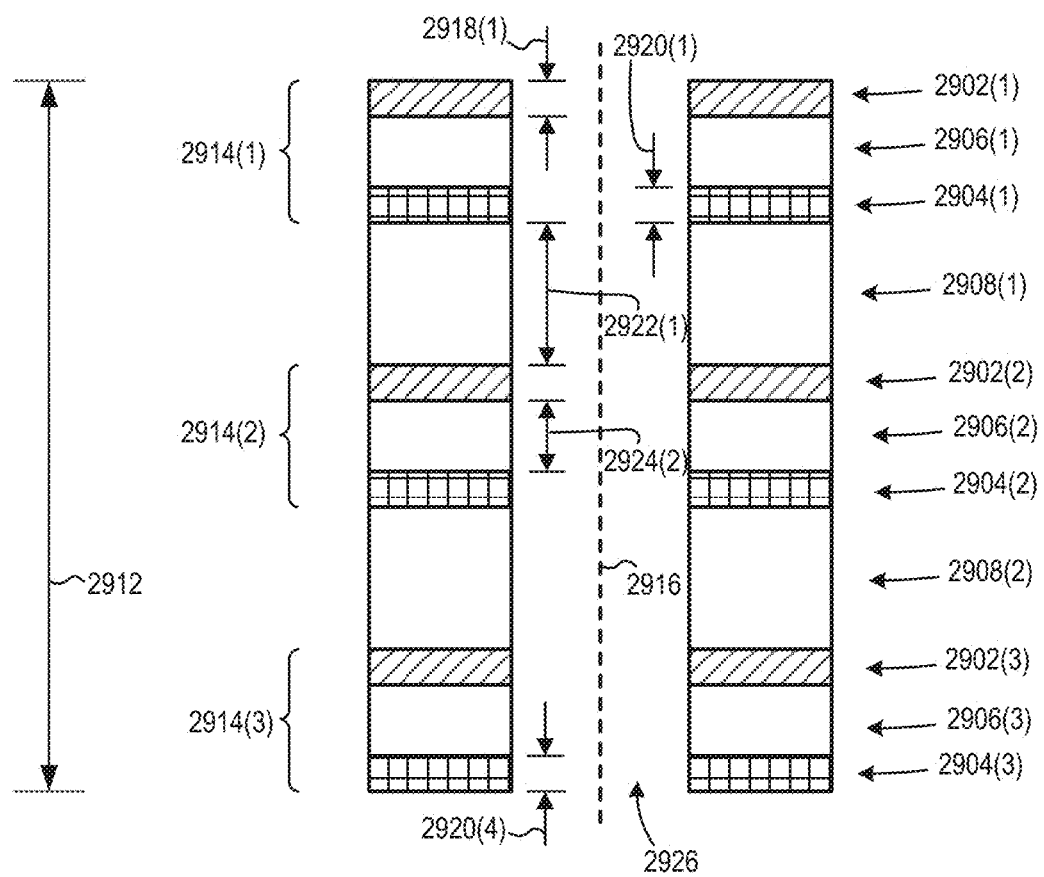
FIG. 33 shows a cross-sectional view of the FIG. 29 multilayer conductor.

Applicant has also developed multilayer conductors with integrated capacitors including a stack of C-shaped foil conductors. For example, FIG. 29 shows a top plan view of a multilayer conductor 2900 including integrated capacitors. Multilayer conductor 2900 includes a stack of alternating electrically conductive first and second foil conductor sublayers 2902, 2904. FIG. 30 shows a top plan view of one first foil conductor sublayer 2902 instance, and FIG. 31 shows a top plan view of one second foil conductor sublayer 2904 instance. FIG. 32 shows an exploded perspective view of multilayer conductor 2900, and FIG. 33 shows a cross-sectional view of the multilayer conductor taken along line 29A-29A of FIG. 29. Multilayer conductor 2900 has a radius 2910 and a thickness 2912. It is anticipated that the dielectric layers 2906, 2908 will typically extend slightly, such as one to five millimeters, beyond the edges of foil conductor sublayers 2902, 2904 to minimize the likelihood of arcing between the edges of adjacent conductor sublayers.

First and second foil conductor sublayers 2902, 2904 have at least substantially similar notched toroidal shapes. However, second foil conductor sublayers 2904 are angularly displaced from first coil conductor sublayers by about 180 degrees around a center axis 2916, such that first foil conductor sublayers 2902 form a C-shape, and second foil conductor sublayers 2904 form an inverted or "backwards" C-shape, when viewed cross-sectionally in the thickness 2912 direction. In some other embodiments, though, first foil conductor sublayers 2902 are angularly displaced from second foil conductor sublayers 2904 by an angle of other than 180 degrees. Dielectric layers 2906, 2908 may have a toroidal shape, as shown. However, since dielectric layers 2906, 2908 need only separate adjacent foil conductor sublayers, in some alternate embodiments, dielectric layers 2906, 2908 have a notched toroidal shape similar to that of foil conductor sublayers 2902, 2904, where the dielectric layer notch is generally aligned with the notch of an adjacent foil conductor sublayer 2902, 2904.

Multilayer conductor 2900 includes a plurality of unit cells or foil conductor layers 2914 stacked in the thickness 2912 direction. Each foil conductor layer 2914 includes a respective first foil conductor sublayer 2902, sublayer dielectric layer 2906, and second foil conductor sublayer 2904, stacked in the thickness 2912 direction. Adjacent foil conductor layers 2914 are separated in the thickness 2912 direction by a separation dielectric layer 2908. Accordingly, foil conductor layers 2914 and separation dielectric layers 2908 are stacked in an alternating manner in the thickness 2912 direction, and foil conductor sublayers 2902, 2904 are electrically isolated from each other by sublayer dielectric layers 2906, 2908. Foil conductor sublayers 2902, 2904 and dielectric layers 2906, 2908 are concentrically disposed around common center axis 2916 extending in the thickness 2912 direction. Each first foil conductor sublayer 2902 forms a first discontinuity or notch 2928 such that the first foil conductor sublayer does not completely encircle center axis 2916, and each second foil conductor sublayer 2904 forms a second discontinuity or notch 2930 such that the second foil conductor sublayer does not completely encircle center axis 2916. Foil conductor sublayers 2902 are angularly displaced from foil conductor sublayers 2904 by about 180 degrees around axis 2916. Thus, notches 2928, 2930 of first and second foil conductor sublayers 2902, 2904, respectively, are angularly displaced from each other by about 180 degrees, such that notches of immediately adjacent conductors in the thickness 2912 direction are angularly displaced from each other by 180 degrees. Although FIGS. 32 and 33 show multilayer conductor 2900 including three foil conductor layers 2914, multilayer conductor 2900 could be modified to have any number of foil conductor layers greater than one. Additionally, multilayer conductor 2900 could be modified to have one or more incomplete foil conductor layers 2914, such as an incomplete foil conductor layer including first foil conductor sublayer 2902 and sublayer dielectric layer 2906 instances, but no second foil conductor sublayer 2904 instance.

In some embodiments, foil conductor layer sublayers 2902, 2904 are formed of copper or aluminum, and dielectric layers 2906, 2908 are formed of a polymer material, such as polyimide. In certain embodiments, multilayer conductor 2900 is formed of laminated polyimide materials. Higher performance is potentially achieved, however, using an insulating material with a lower dielectric loss than polyimide. Some examples of possible insulating materials with low dielectric loss include polytetrafluoroethylene (PTFE), perfluoroalkoxy (PFA), ethylene tetrafluoroethylene (ETFE), fluorinated ethylene propylene (FEP), polypropylene, polyethylene, polystyrene, glass, and ceramic. PTFE and PFA may be well suited for extremely demanding applications because these materials have particularly low dielectric loss. Polypropylene may be well suited for cost sensitive applications since this material has both a low dielectric loss and relatively low cost.

Foil conductor sublayers 2902, 2904 have respective thicknesses 2918, 2920 (see FIG. 33) that are typically smaller than their skin depths at an intended operating frequency, thereby promoting efficient use of foil conductor sublayers 2902, 2904 and corresponding low power loss. In embodiments including a large number of foil conductor layers 2914, it is anticipated that thicknesses 2918, 2920 will be much smaller than skin depths at an intended operating frequency, to minimize losses. For example, in some embodiments, each thickness 2918, 2920 has an optimal value (t), which substantially minimizes losses, given by EQN. 11 below:

$$t_{opt} = \frac{3^{0.25}\delta}{\sqrt{M}}\left(\frac{K_1}{K}\right)^{0.25} \qquad \text{EQN. 11}$$

In EQN. 11, M is a number of foil conductor layers, δ is skin depth, and $K_1$ and $K_2$ are respectively defined by EQNS. 12 and 13 below, where θ is angle of overlap, discussed below with respect to FIG. 35:

$$K_1 = 1 - \frac{\theta}{3\pi} \qquad \text{EQN. 12}$$

$$K_2 = 1 + \frac{\theta}{\pi} \qquad \text{EQN. 13}$$

Although each foil conductor sublayer 2902, 2904 instance is shown as having the same thickness 2918, 2920, thickness could vary among conductor sublayer instances, or even within a given conductor sublayer. In some embodiments, thicknesses 2922 of separation dielectric layers 2908 are greater than thicknesses 2924 of sublayer dielectric layers 2906, such as to minimize electrostatic coupling between foil conductor layers 2914. However, separation dielectric layers 2908 could alternately have the same thickness as sublayer dielectric layers 2906, such to allow use of a common dielectric material for both sublayer and separation dielectric layers and/or to achieve high effective capacitance values. For example, in certain embodiments, each foil conductor sublayer 2902, 2904 has a respective thickness 2918, 2920 of 18 microns, and each dielectric layer 2906, 2908 has a respective thickness 2924, 2922 of 20 microns. Furthermore, separation dielectric layers 2908 could even be thinner than sublayer dielectric layers 2906. Also, while it is anticipated that thickness 2924 will typically be the same for each sublayer dielectric layer instance, thickness 2924 could vary among sublayer layer 2906 instances without departing from the scope hereof. Similarly, separation dielectric layer 2908 thickness 2922 could either be the same or vary among layer 2908 instances. Only some instances of thicknesses 2918, 2920, 2922, 2924 are labeled in FIG. 33 to promote illustrative clarity.

Multilayer conductor 2902 forms a center aperture 2926, such that foil conductor sublayers 2902, 2904 are wound around the aperture and center axis 2916. It is anticipated that in many embodiments, a magnetic core (not shown) will extend through the aperture, to help direct the magnetic field produced by multilayer conductor 2900 to where it is needed and to help prevent stray magnetic flux. Use of a magnetic core potentially also helps shape the magnetic field in the region of multilayer conductor 2900 such that the magnetic flux above, below, and within multilayer conductor 2900 travels approximately parallel to foil conductor sublayers 2902, 2904, thereby promoting even conductor current distribution and low eddy current losses in the conductors. A magnetic core can also be used to help achieve a desired reluctance in applications requiring a particular reluctance value, such as in applications where multilayer conductor forms an inductive-capacitive resonant device. One possible material for use in a magnetic core is manganese zinc power ferrite material, which has low losses at any frequency below about one megahertz, at flux densities up to about 200 millitesla. Some examples of possible magnetic cores are discussed below with respect to FIGS. 44-47. However, use of a magnetic core is not required. Additionally, in some alternate embodiments, such as in embodiments intended for use without a core, dielectric layers 2906, 2908 are solid disc shaped as opposed to toroidal shaped, such that multilayer conductor 2900 does not form an aperture that extends along the entirety of thickness 2912.

Figure 34:
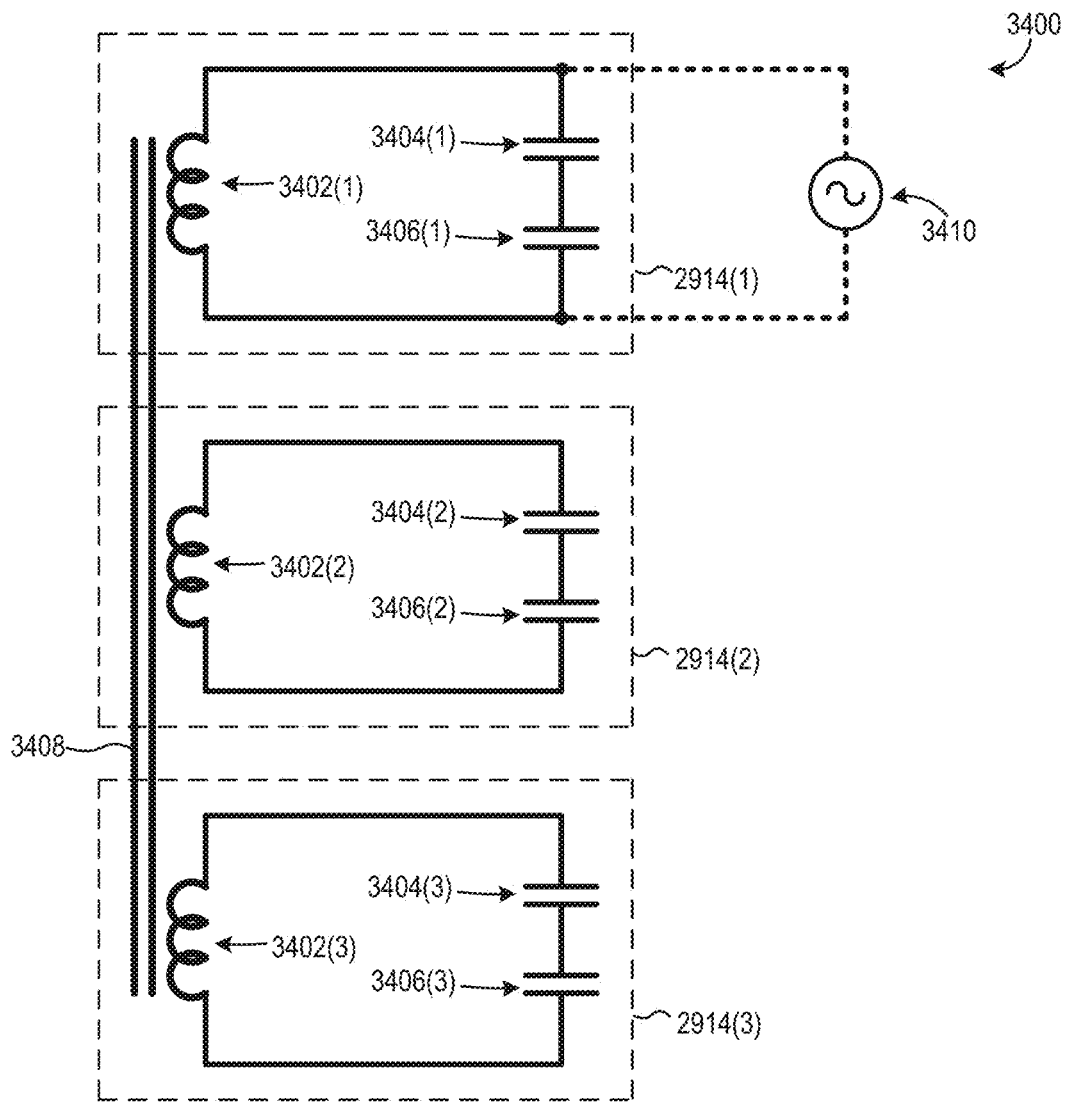
FIG. 34 shows one electrical model of the FIG. 29 multilayer conductor.

FIG. 34 shows one electrical model 3400 of multilayer conductor 2900. Model 3400 assumes that foil conductor layers 2914 are electrostatically decoupled from each other, which is a good approximation in embodiments where separation dielectric layers 2908 are significantly thicker than sublayer dielectric layers 2906. Each foil conductor layer 2914 has an inductance and capacitance, modeled by a winding turn 3402 electrically coupled in parallel with two series coupled capacitors 3404, 3406. Winding turns 3402 are magnetically coupled, as symbolically represented by a core 3408. Core 3408 is a magnetic core in embodiments where multilayer conductor 2900 includes a magnetic core. On the other hand, in embodiments where multilayer conductor 2900 does not include a magnetic core, core 3408 represents coupling without use of a magnetic core, such that core 3408 is an "air core." Electrical model 3400 also approximately represents embodiments of multilayer conductor 900 (FIG. 9), 1200 (FIG. 12), and 2201 (FIG. 25) where separation distances between adjacent conductor layers are significantly greater than separation distances between adjacent conductor sublayers.

Figure 35:
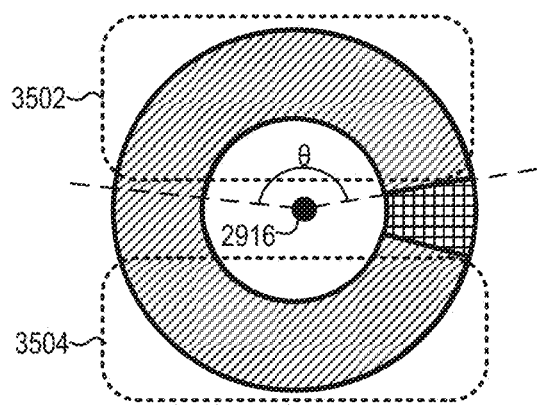
FIG. 35 shows a top plan view of the FIG. 29 multilayer conductor, including dashed lines approximately delineating top and bottom portions of the multilayer conductor.

FIG. 35 shows a top plan view of multilayer conductor 2900 of FIG. 29, with top and bottom portions 3502, 3504 of multilayer conductor 2900 approximately delineated by dashed lines. Top and bottom portions are separated by notches 2928, 2930 in foil conductor sublayers 2902, 2904 (see FIGS. 30 and 31). Capacitor 3404(1) represents capacitance between conductor sublayers 2902(1), 2904(1) in top portion 3502, capacitor 3404(2) represents capacitance between conductor sublayers 2902(2), 2904(2) in top portion 3502, and capacitor 3404(3) represents capacitance between conductor sublayers 2902(3), 2904(3) in top portion 3502. Similarly, capacitor 3406(1) represents capacitance between conductor sublayers 2902(1), 2904(1) in bottom portion 3504, capacitor 3406(2) represents capacitance between conductor sublayers 2902(2), 2904(2) in bottom portion 3504, and capacitor 3406(3) represents capacitance between conductor sublayers 2902(3), 2904(3) in bottom portion 3504. The capacitance values of capacitors 3404, 3406 can be adjusted during the design of multilayer conductor 2900, such as to achieve a desired resonance. For example, capacitance can be increased by decreasing sublayer dielectric layer 2906 thickness 2924 and/or by increasing surface area of foil conductor sublayers 2902, 2904. Assuming symmetrical construction, the capacitance values of conductor sublayers 2902, 2904 are essentially identical in each foil conductor layer 2914, assuming negligible electrostatic coupling between foil conductor layers 2914.

FIG. 35 also illustrates an angle of overlap (θ) of foil conductor sublayers 2902, 2904, with respect to center axis 2916. The angle of overlap defines to what extent foil conductor sublayers 2902, 2904 overlap each other in each of top portion 3502 and bottom portion 3504. As illustrated, θ is almost 180 degrees, indicating that foil conductor sublayers 2902, 2904 almost completely overlap each other in each of top portion 3502 and bottom portion 3504.

An AC electric power source 3410 is optionally electrically coupled to multilayer conductor 2900 to drive the multilayer conductor, such that power source 3410 and multilayer conductor 2900 collectively form a system for generating a magnetic field. AC electric power source 3410 is typically electrically coupled in parallel with one foil conductor sublayer 2902, 2904, such that source is effectively electrically coupled in parallel with one winding turn 3402. For example, AC electric power source 3410 may be electrically coupled in parallel with foil conductor sublayer 2902(1), such that source 3410 is effectively electrically coupled in parallel with winding turn 3402(1), as shown. Although only one winding turn 3402 is directly connected to AC electric power source 3410, the remaining winding turns 3402 are also effectively coupled in parallel with source 3410 in the FIG. 34 example, due to magnetic coupling of winding turns 3402. Each winding turn 3402's capacitors 3404, 3406, for example, collectively serve as a resonant capacitor electrically coupled in parallel with the winding turn.

Although FIG. 34 shows AC electric power source 3410 electrically coupled in parallel with winding turn 3402(1), source 3410 could alternately be electrically coupled to a different foil conductor sublayer 2902, 2904, such that source 3410 is electrically coupled in parallel with a different winding turn 3402. Furthermore, AC electric power source 3410 could even be electrically coupled in parallel and/or in series with two of more foil conductors 2902, 2904, without departing from the scope hereof.

Figure 36:
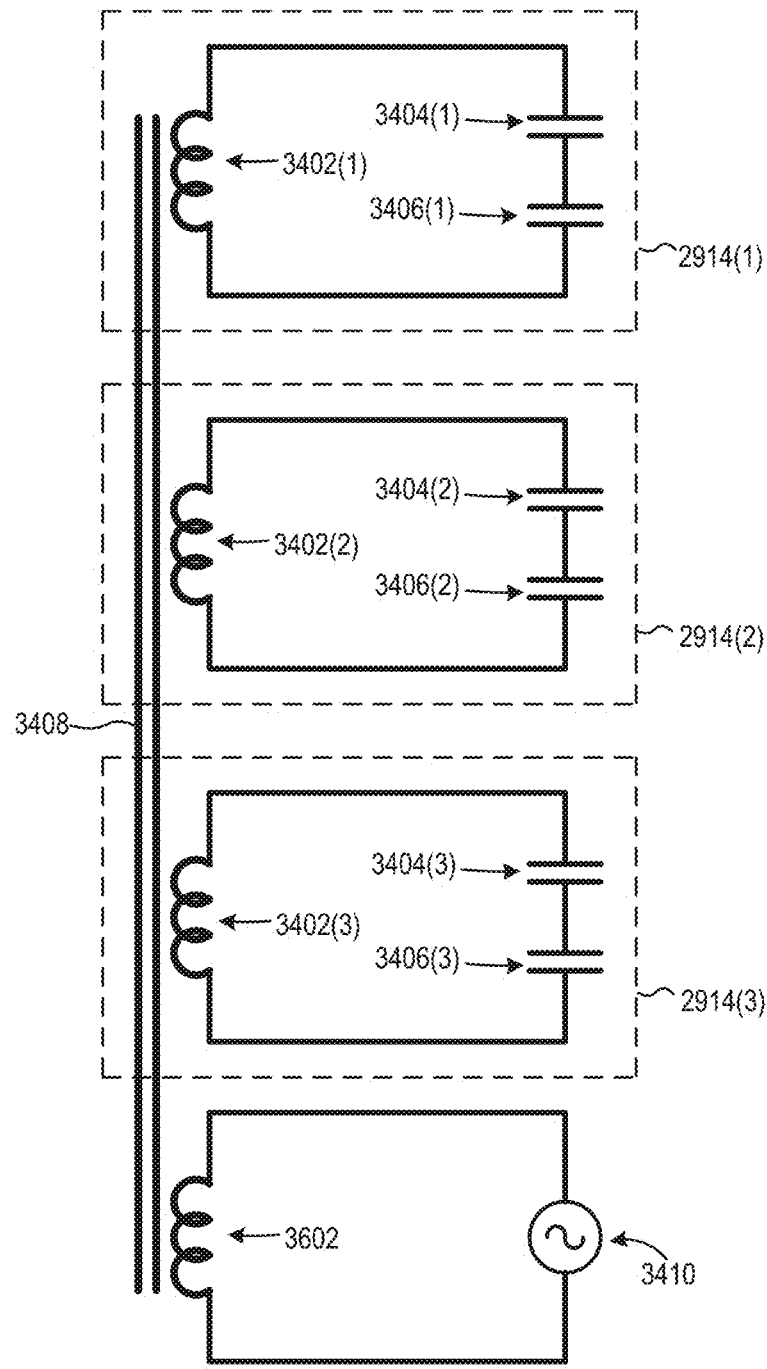
FIG. 36 shows a model like that shown in FIG. 34, but further including a primary coil electrically coupled to the AC electric power source, according to an embodiment.

Moreover, the system modeled in FIG. 34 could be modified such that AC electric power source 3410 is electrically coupled to a primary winding, instead of to one or more foil conductor layers 2914. For example, FIG. 36 shows a model like that of FIG. 34, but further including a primary winding 3602 galvanically isolated from foil conductor layers 2914. Primary winding 3602 is magnetically coupled to winding turns 3402, such that AC electric power source 3410 drives primary winding 3602, and primary winding 3602 drives foil conductor layers 2914 via magnetic coupling of winding turns 3402. Primary winding 3602 is formed, for example, of foil or litz wire that is galvanically isolated from foil conductor layers 2914. Primary winding 3602 could also be formed, for example, from a metallic plate disposed at the top or bottom of multilayer conductor 2900, where the metallic plate serves as a heat sink in addition to an electrical winding.

Figure 37:
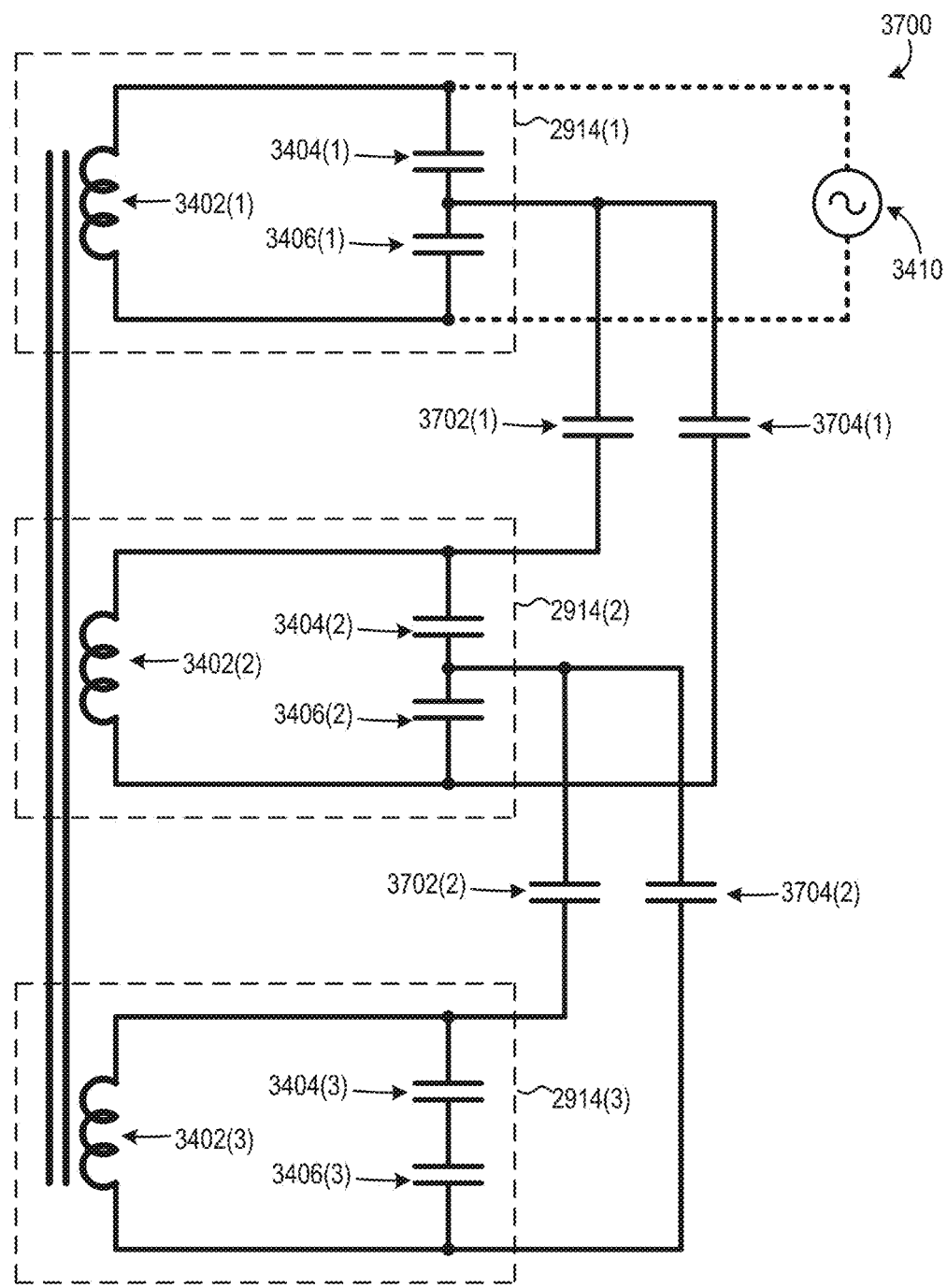
FIG. 37 shows another electrical model of the FIG. 29 multilayer conductor.

In some alternate embodiments, thicknesses of separation dielectric layers 2908 may be similar to or less than thicknesses of sublayer dielectric layers 2906, as discussed above. In such embodiments, there may be significant electrostatic coupling between foil conductor layers 2914, and model 3400 therefore may not be sufficiently accurate. FIG. 37 shows an electrical model 3700 of multilayer conductor 2900, which accounts for capacitance between adjacent foil conductor layers 2914. It may be desirable to use model 3700 in place of model 3400 in situations where capacitance between multilayer conductors 2914 is significant, and/or in situations where high modeling accuracy is required.

Model 3700 is similar to model 3400 of FIG. 34, but further includes capacitors 3702, 3704 representing capacitance between immediately adjacent foil conductor layers 2914. Capacitor 3702(1) represents capacitance between foil conductor sublayers 2904(1), 2902(2) in top portion 3502 of multilayer conductor 2900, and capacitor 3704(1) represents capacitance between foil conductor sublayers 2904(1), 2902(2) in bottom portion 3504 of the multilayer conductor. Capacitor 3702(2) represents capacitance between foil conductor sublayers 2904(2), 2902(3) in top portion 3502 of multilayer conductor 2900, and capacitor 3704(2) represents capacitance between foil conductor sublayers 2904(2), 2902(3) in bottom portion 3504 of multilayer conductor 2900. In symmetrical embodiments of multilayer conductor 2900, each capacitor 3404, 3406, 3702, 3704 will have approximately the same capacitance value. In these embodiments, though, inner foil conductor layer 2914(2) will have greater effective capacitance than outer foil conductor layers 2914(1), 2914(3). In applications where it is desired that each foil conductor layer 2914 have essentially the same effective capacitance, inner foil conductor layers 2914 can be configured differently than outer foil conductor layers 2914 such that each foil conductor layer has essentially the same effective capacitance. For example, sublayer dielectric layer 2906(2) of inner foil conductor layer 2914(2) could be made thicker than sublayer dielectric layers 2906(1), 2906(3) of outer foil conductor layers 2914(1), 2914(3), such that inner foil conductor layer 2914(2) has approximately the same effective capacitance as each outer foil conductor layer 2914(1), 2914(3). Electrical model 3700 also approximately represents embodiments of multilayer conductor 900 (FIG. 9), 1200 (FIG. 12), and 2201 (FIG. 25) where separation distances between adjacent conductor layers are comparable to, or less than, separation distances between adjacent conductor sublayers.

Figure 38:
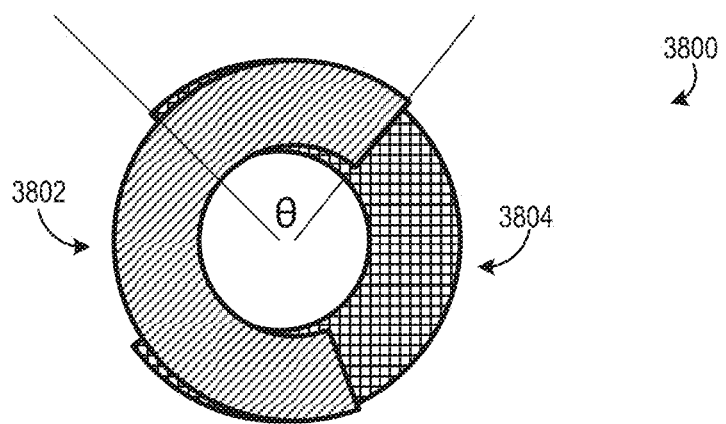
FIG. 38 shows a top plan view of a multilayer conductor like that of FIG. 29, but with a smaller angle of foil conductor sublayer overlap, according to an embodiment.
Figure 39:
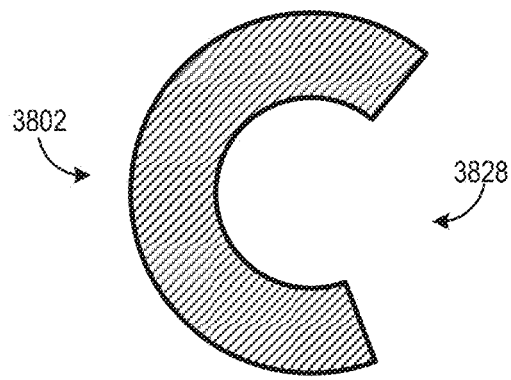
FIGS. 39 and 40 show top plan views of first and second foil conductor sublayers, respectively, of the FIG. 38 multilayer conductor.
Figure 40:
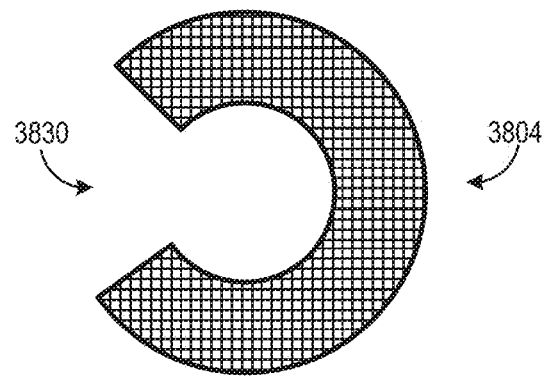

As discussed above, the capacitance value of a capacitor integrated in a given conductor layer is proportional to area of overlap of the conductor's constituent sublayers. The angle of overlap of foil conductor sublayer 2902 and foil conductor sublayer 2904 is almost 180 degrees, as discussed above with respect to FIG. 35. However, multilayer conductor 2900 can be modified to that there is less overlap between immediately adjacent first and second foil conductor sublayers 2902, 2904, such as to tune capacitance values during design of multilayer conductor 2900. For example, FIG. 38 shows a top plan view of a multilayer conductor 3800, which is similar to multilayer conductor 2900, but with an angle of overlap (θ) of foil conductor sublayers 3802, 3804, with respect to a center axis of the coil, of only about 90 degrees. FIG. 39 shows a top plan view of an instance of first foil conductor sublayer 3802, and FIG. 40 shows a top plan view of an instance of second foil conductor sublayer 3804. Foil conductor sublayers 3802, 3804 each have a notched toroidal shape such that conductor sublayers 3802, 3804 have a C-shape and inverted C-shape, respectively. However, conductor sublayers 3802, 3804 form wider discontinuities or notches 3828, 3830, than those of foil conductor sublayers 2902, 2904. In other words, notches 3828, 3830 of conductor sublayers 3802, 3804 occupy a greater portion of the conductor length than notches 2928, 2930 of conductor sublayers 2902, 2904.

Capacitance values are roughly proportional to angle of overlap. Thus, capacitance may be reduced, for example, during multilayer conductor design by reducing angle of overlap. It may be desirable to reduce capacitance by reducing angle of overlap, instead of by increasing dielectric layer thickness, because increasing dielectric layer thickness increases overall conductor thickness and impedes conductor cooling. Additionally, reducing angle of overlap decreases conductor surface area, thereby reducing potential for proximity losses in the conductors.

Notches 3828, 3830 of foil conductor sublayers 3802, 3804 cause there to be wide gaps between conductors in the thickness direction, along portions of the multilayer conductor's length occupied by the notches. These gaps inhibit thermal conduction in the thickness direction, since the foil conductor sublayers are typically better thermal conductors than dielectric or other material disposed between conductor sublayers. Although the gaps could be filled with a high thermal conductivity material, such as a high thermal conductivity ceramic material, use of such material may increase cost and manufacturing complexity.

Figure 41:
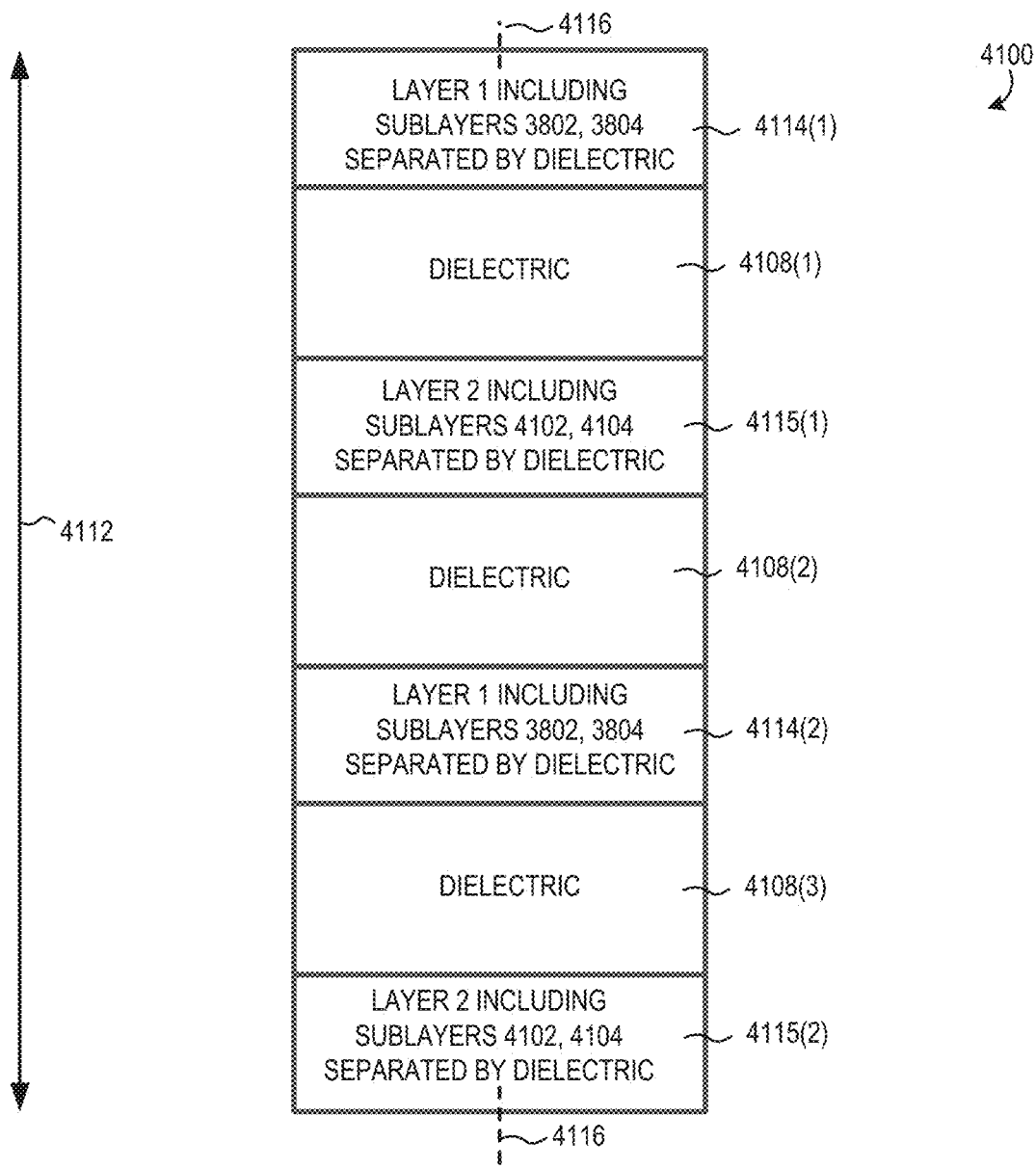
FIG. 41 schematically illustrates a multilayer conductor including alternating first and second foil conductor layers stacked in a height direction, such that notches of adjacent foil conductor layers do not align, according to an embodiment.
Figure 42:
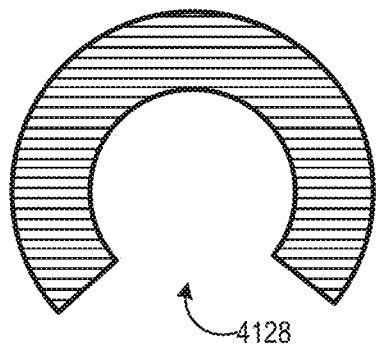
FIGS. 42 and 43 show top plan views of first and second foil conductor sublayers, respectively, included in the FIG. 41 multilayer conductor.
Figure 43:
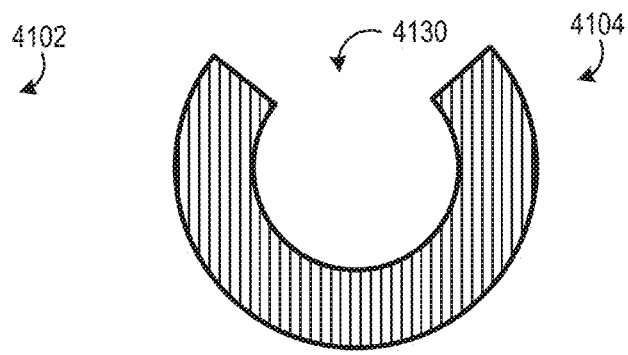

Alternatively, gaps in foil conductor sublayers in the thickness direction may be minimized by offsetting foil conductor sublayer notches along the multilayer conductor, such that foil conductor sublayer notches of immediately adjacent foil conductor layers do not align. For example, FIG. 41 schematically illustrates one multilayer conductor 4100 including alternating first and second conductor layers 4114, 4115 stacked in a thickness direction 4112, where adjacent conductor layers are separated by a separation dielectric layer 4108. Each first conductor layer 4114 includes respective first and second foil conductor sublayers 3802, 3804 separated by a respective sublayer dielectric layer, in a manner similar to that shown in FIGS. 32 and 33. Each second conductor layer 4115, in contrast, includes respective first and second conductor sublayers 4102, 4104 separated by a respective sublayer dielectric layer, in a manner similar to that shown in FIGS. 32 and 33. FIGS. 42 and 43 show top plan views of notched toroidal-shaped foil conductor sublayers 4102, 4104, respectively. First foil conductor sublayer 4102 is angularly displaced from first foil conductor sublayer 3802 by about 90 degrees, and second foil conductor sublayer 4104 is angularly displaced from second foil conductor sublayer 3804 by about 90 degrees, and first and second foil conductor sublayers 4102, 4104 are angularly displaced from each other by about 180 degrees. Thus, adjacent conductor layers 4114, 4115 are angularly offset from each other by about 90 degrees around a center axis 4116. Accordingly, the foil conductor sublayer notches 3828, 3830 of each first conductor layer 4114 are displaced from foil conductor sublayer notches 4128, 4130 of each second conductor layer 4115, thereby minimizing gaps in foil conductor sublayers along the thickness 4112 direction. In some embodiments, thicknesses of separation dielectric layers 4108 are greater than thicknesses of sublayer dielectric layers separating conductors in conductor layers 4114, 4115, to minimize potentially undesirable electrostatic coupling between angularly offset first and second conductor layers 4114, 4115, where such thicknesses are in the thickness 4112 direction.

One possible application of each of multilayer conductor 2900, 3800, and 4100 is to form a resonant inductive-capacitive device, such as a resonant inductor, for use in electrical circuits. For example, the inductance and capacitance of the multilayer conductor could be tuned to form a resonant device of a desired frequency. Another possible application is to form a resonant induction coil for generating an external magnetic field, such as for induction heating, magnetic hyperthermia, or wireless power transfer. Current will flow in the toroidal direction within the foil conductor sublayers, causing the magnetic field to flow in the poloidal direction around the multilayer conductor. It is anticipated that multilayer conductors 2900, 3800, and 4100 will operate in the frequency range of 40 kHz to 250 kHz in typical magnetic hyperthermia applications, although significantly higher operating frequencies, such as between 1 MHz and 50 MHz, might be desirable in some wireless power transfer applications. Multilayer conductors 2900, 3800, and 4100, however, are not limited to operating at such frequencies.

Figure 44:
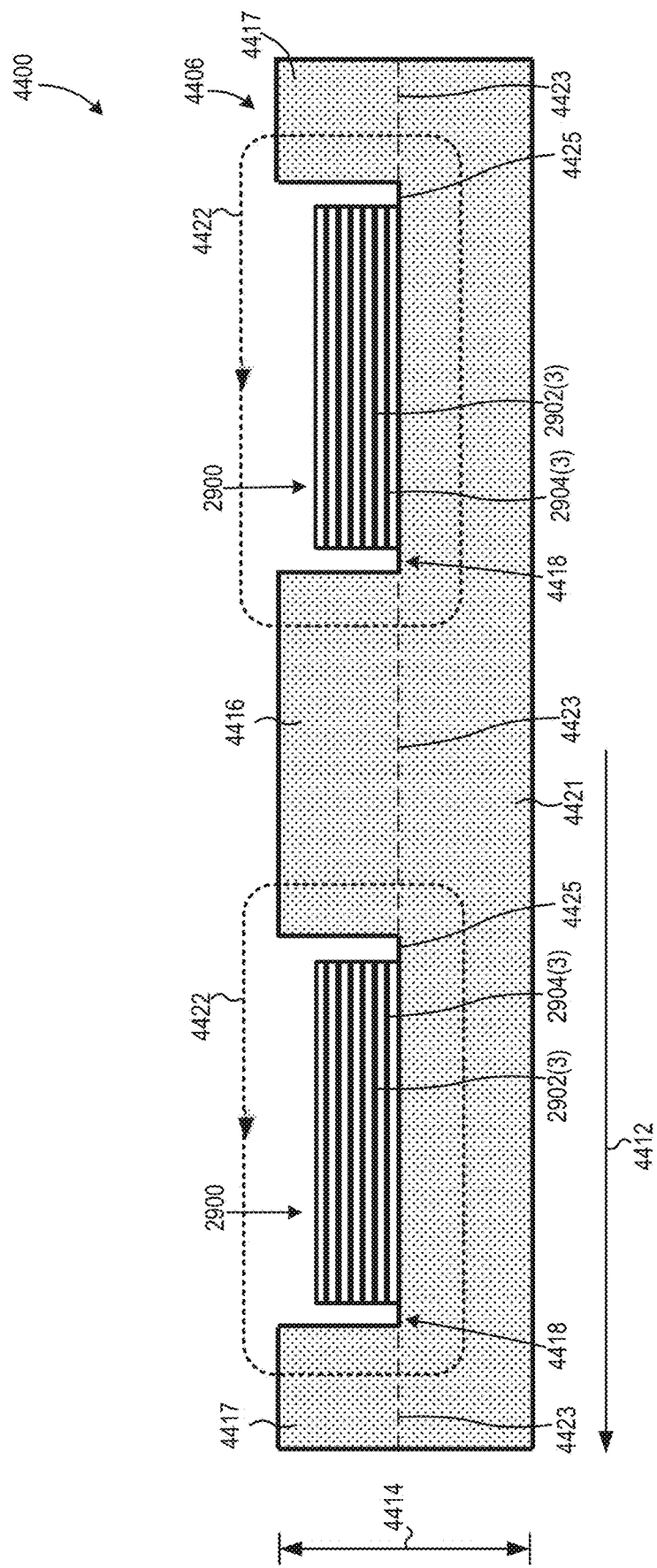
FIG. 44 shows a cross-sectional view of an assembly including an instance of the FIG. 29 multilayer conductor and a round magnetic core, according to an embodiment.

As discussed above, multilayer conductors 2900, 3800, and 4100 optionally can be used with a magnetic core. For example, FIG. 44 shows a cross-sectional view of an assembly 4400 including an instance of multilayer conductor 2900 (FIG. 29) and a round magnetic core 4406 having a radius 4412 and a thickness 4414. Assembly 4400 may be used, for example, as a resonant induction coil. Magnetic core 4406 includes a center post 4416 and an outer ring 4417 disposed on a base 4421 in the thickness 4414 direction, to form a recess 4418 disposed around center post 4416. Although FIG. 44 includes dashed lines 4423 delineating center post 4416 and outer ring 4417 from base 4421, the dashed lines are included solely to help the viewer distinguish the various elements of core 4406, and dashed lines 4423 do not necessarily represent discontinuities in core 4406. Recess 4418 is at least partially free of magnetic material. Base 4421 forms a bottom surface 4425 of recess 4418 such that recess 4418 only extends partially through thickness 4414 of core 4406. Multilayer conductor 2900 is disposed in recess 4418, such that each foil conductor sublayer 2902, 2904 is concentrically disposed around center post 4416, and foil conductor layers 2914 are stacked in the thickness 4414 direction on recess bottom surface 4425. Dielectric layers 2906, 2908 are not labeled, and only some foil conductor sublayers 2902, 2904 are labeled, to promote illustrative clarity.

Dashed lines 4422 symbolically illustrate the approximate flow of magnetic flux when current flows through foil conductors 2902, 2904 in the counter-clockwise direction. Base 4421, center post 4416, and outer ring 4417 provide a low reluctance path for magnetic flux around channel 4418, and the magnetic field near the bottom surface 4425 of recess 4418 is therefore relatively small. Accordingly, foil conductor sublayers located near bottom surface 4425, such as lower conductors 2902(3), 2904(3) of multilayer conductor 2900, can potentially be thicker than their skin depth, without incurring excessive skin depth related losses. Although assembly 4400 is shown as including multilayer conductor 2900, assembly 4400 could be modified to include a different one of the foil multilayer conductors disclosed herein, such as multilayer conductor 3800 (FIG. 38) or multilayer conductor 4100 (FIG. 41).

In some embodiments, magnetic core 4406 forms one or more gaps to achieve a desired reluctance. Magnetic core 4406 could be either a homogenous or heterogeneous magnetic core. In a particular embodiment, center post 4416 and outer ring 4417 are formed of a high permeability magnetic material, such as a ferrite material, and base 4421 is formed of a lower permeability magnetic material, such a material including magnetic particles within a non-magnetic binder. The reluctance of multilayer conductor 2900 is adjusted in this embodiment, for example, by varying the ratio of magnetic particles and non-magnetic binder in base 4421. In some other embodiments, base 4421 is formed of a plurality of discrete magnetic elements that are separated from each other to form a quasi-distributed gap, such as similar to the quasi-distributed gap shown in FIG. 27.

Figure 45:
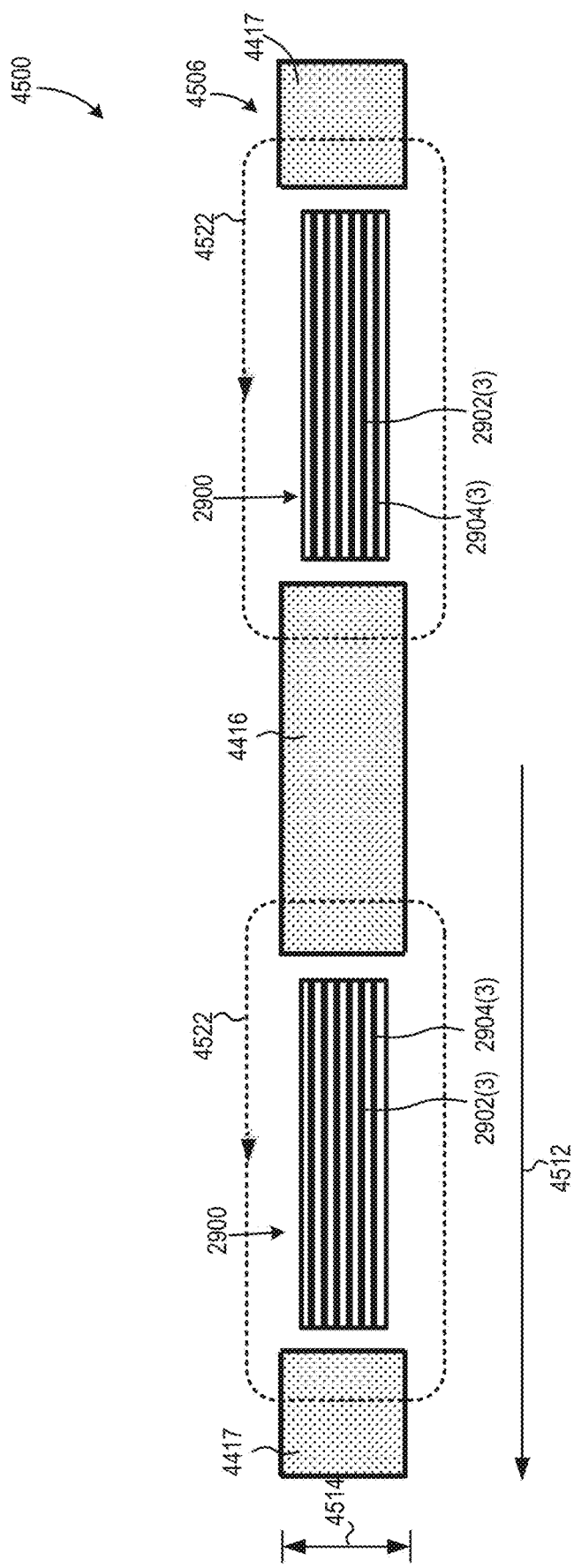
FIG. 45 shows a cross-sectional view of an alternate embodiment of the FIG. 44 assembly, where the magnetic core does not include a base.

Variations of magnetic core 4406 are contemplated. For example, FIG. 45 illustrates a cross-sectional view of an assembly 4500 having a radius 4512 and a thickness 4514. Assembly 4500 is similar to assembly 4400 of FIG. 44, but assembly 4500 includes a round magnetic core 4506 in place of round magnetic core 4406. Magnetic core 4506 includes center post 4416 and outer ring 4417, but magnetic core 4506 does not include a base. Accordingly, magnetic flux, which is symbolically illustrated by dashed lines 4522 in FIG. 45, will flow above and below assembly 4500 in the radial 4512 direction.

Figure 46:
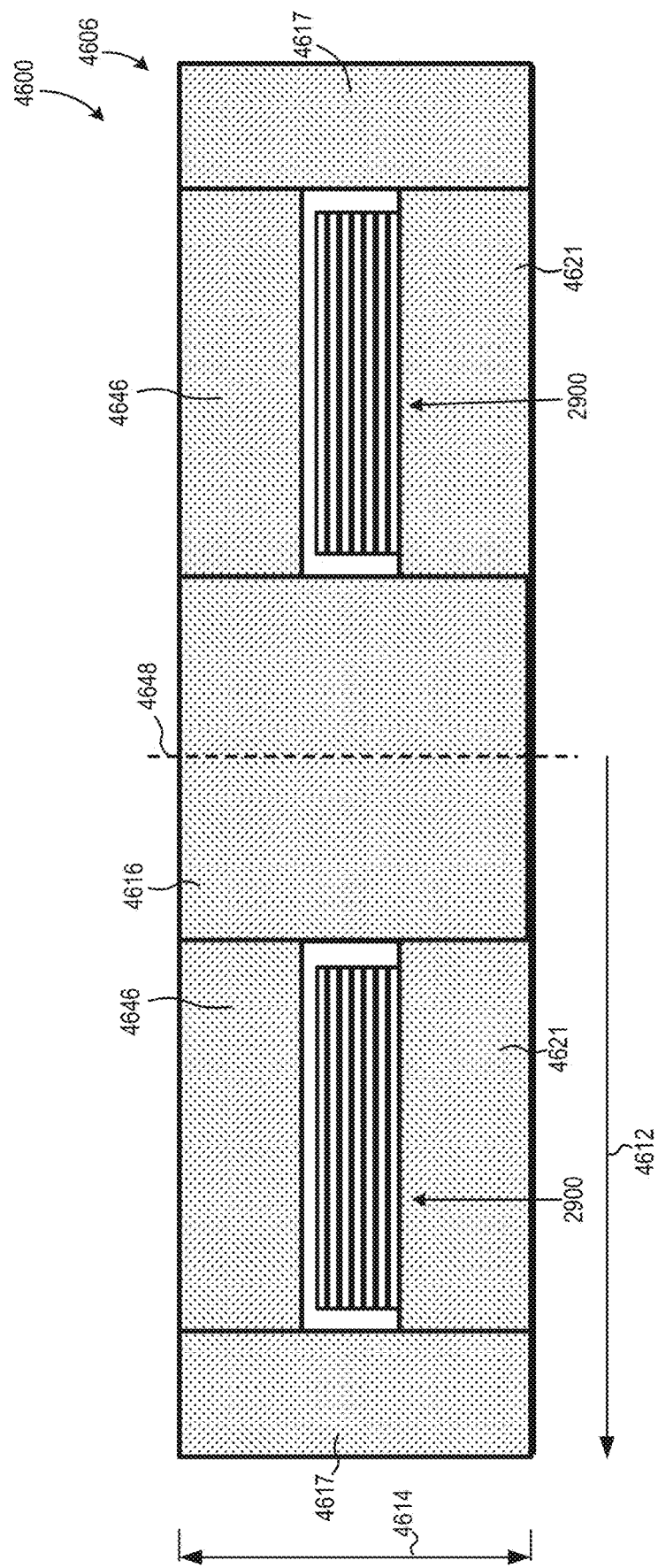
FIG. 46 shows a cross-sectional view of an alternate embodiment of the FIG. 44 assembly, where the magnetic core further includes a top element.

As another example, FIG. 46 illustrates a cross-sectional view of an assembly 4600 having a cylindrical shape with a radius 4612 and a thickness 4614. Assembly 4600 is similar to assembly 4400 of FIG. 44, but assembly 4600 includes a round magnetic core 4606 in place of round magnetic core 4406. Magnetic core 4606 includes center post 4616, an outer ring 4617, a base ring 4621, and a top ring 4646, each concentrically disposed around a center axis 4648 of assembly 4600. Top ring 4646 opposes base ring 4621 in the thickness 4614 direction, and each of center post 4616 and outer ring 4617 join base ring 4621 and top ring 4646. In one embodiment, base ring 4621 and top ring 4646 are each formed of low permeability magnetic material, and center post 4616 and outer ring 4617 are each formed of high permeability magnetic material.

The stacked foil conductor sublayer configurations disclosed herein promote low loss operation and ease of cooling. For example, the fact that the conductors have a foil configuration promotes current conduction by the entire conductor cross-section at high operating frequencies, thereby helping to minimize losses due to skin effects. Additionally, the fact that the foil conductors are electrostatically coupled results in capacitive coupling, which promotes equal current sharing among conductors. If foil conductors were instead parallel coupled without interconductor capacitance, current would flow predominately in an outer conductor. Furthermore, the fact that the coils have integrated capacitance for each winding turn potentially reduces the magnitude of current and/or voltage that must be supplied to the coils, thereby helping minimize losses due to high current and/or voltage magnitude. Moreover, the stacked foil conductor configuration promotes transfer of heat out from the coils in the vertical direction.

Figure 47:
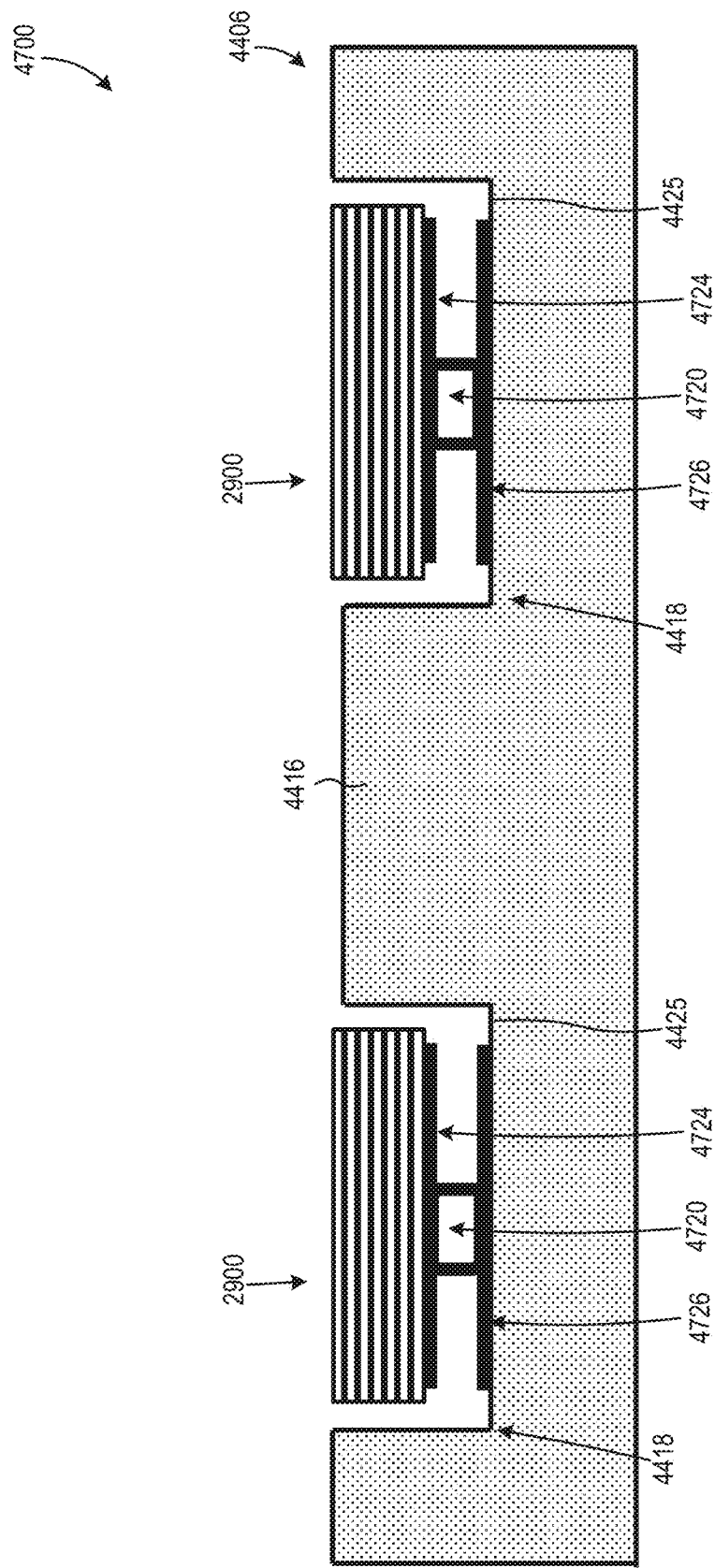
FIG. 47 shows a cross-sectional view of an assembly similar to that of FIG. 44, but further including a cooling channel, according to an embodiment.

Nevertheless, liquid cooling may still be required in some applications, particular in applications requiring a high strength magnetic field, such as magnetic hyperthermia applications. FIG. 47 shows a cross-sectional view of an assembly 4700 including an instance of multilayer conductor 2900. Assembly 4700 is similar to assembly 4400 of FIG. 44, with the exception that multilayer conductor 2900 is liquid cooled by a cooling channel 4720 disposed between a heat sink plate 4724 and a base 4726. Base 4726 is disposed on recess bottom surface 4425. A cooling liquid, such as chilled water, is circulated through channel 4720. Multilayer conductor 2900 is disposed on heat sink plate 4724, such that heat sink plate 4724 transfers heat from coil 2900 to fluid circulating through cooling channel 4720, thereby cooling multilayer conductor 2900. Due to the fact that core 4406 provides a low reluctance magnetic path around recess 4418, as discussed above, the magnetic field in the vicinity of cooling channel 4720, heat sink plate 4724, and base 4726 is relatively small, which helps minimize eddy current-induced losses in these components.

Certain embodiments of the multilayer conductors discussed above have a particularly high quality factor (Q), which may be advantageous when used as resonant induction coils in wireless power transfer systems, since system efficiency generally increases with increasing Q. Thus, use of a high Q coil promotes high efficiency at a given transmission distance, and use of a high Q coil promotes high transmission distance at a given efficiency. Accordingly, use of certain embodiments of the multilayer conductors discussed above as resonant induction coils may allow a wireless power transmission system to achieve greater efficiency and/or transmission distance, relative to an otherwise similar system using conventional coils.

Additionally, Applicant has developed resonant induction coils and associated methods which may at least partially overcome one or more problems associated with conventional resonant induction coils. For example, certain embodiments of the resonant induction coils disclosed herein are capable of operating at both low current and low voltage, when generating a high strength magnetic field. As another example, certain embodiments are capable of generating a given magnetic field strength with significantly lower power loss than conventional resonant inductions coils.

Figure 48:
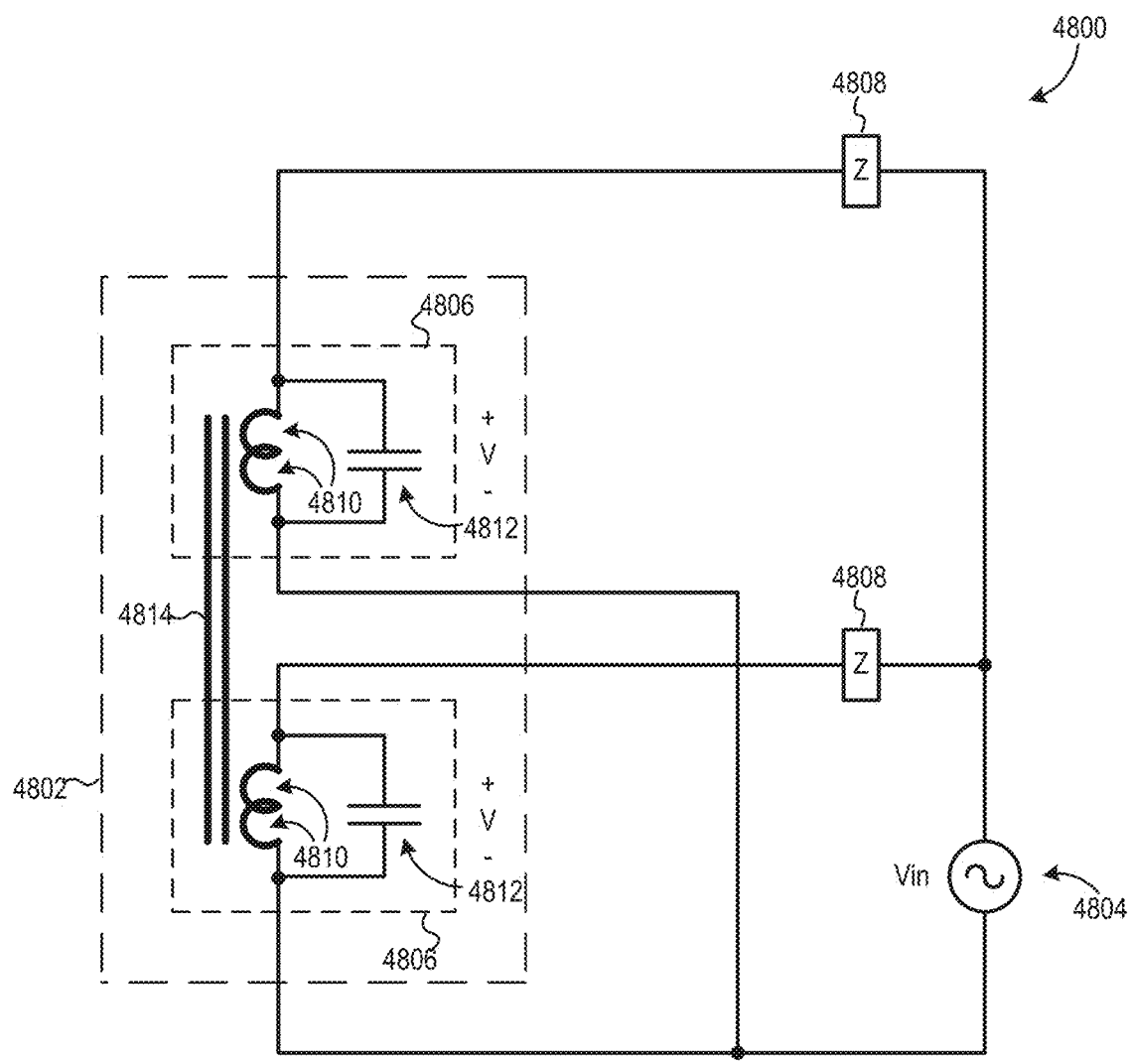
FIG. 48 schematically illustrates a system for generating a high frequency magnetic field including multiple winding sections electrically coupled in parallel, where each winding section includes a parallel resonant capacitor, according to an embodiment.

Applicant has discovered that the high voltage and/or high current requirements of conventional systems for generating high frequency magnetic fields can be at least partially overcome by forming an induction coil with two or more winding turn sections, where each section includes a respective resonant capacitor. For example, FIG. 48 schematically illustrates a system 4800 for generating a high frequency magnetic field. System 4800 includes a resonant induction coil 4802 electrically coupled to an AC electric power source 4804. Coil 4802 includes winding turn sections 4806 electrically coupled in parallel to AC power source 4804 via respective impedance elements 4808. Impedance elements 4808 promote equal current sharing between sections 4806, and each element 4808 includes, for example, an inductor or a capacitor.

Each winding turn section 4806 includes respective winding turns 4810 electrically coupled in series. Each section 4806 further includes a respective resonant capacitor 4812 electrically coupled in parallel with its respective winding turns 4810, such that the winding turns and capacitor of the section collectively form a parallel resonant circuit. Although induction coil 4802 is shown as including two sections 4806, the number of sections could be increased, without departing from the scope hereof. Thus, coil 4802 could be more generally described as including M sections 4806 electrically coupled in parallel, where M is an integer greater than one. Additionally, although each section 4806 is shown as including two winding turns 4810, the number of windings turns per section could be varied without departing from the scope hereof. Thus, each section 4806 could be more generally described as including N winding turns 4810 electrically coupled in series, where N is an integer greater than zero.

While winding turns 4810 are shown as being magnetically coupled by a magnetic core 4814 to control magnetic flux flow, core 4814 could be omitted without departing from the scope hereof. Capacitors 4812 should be disposed outside of the magnetic flux path linking winding turns 4810 to prevent eddy current losses in the capacitors. Although capacitors 4812 are symbolically shown as discrete elements, one of more capacitors 4812 could include distributed capacitance and/or represent two or more electrically coupled capacitors.

The fact that each section 4806 includes a respective resonant capacitor 4812 may enable coil 4802 current and voltage to both be relatively low while generating a high strength magnetic field. In particular, voltage (V) per section is approximately as follows, where X is the constant described above with respect to EQN. 1:

$$V = X \cdot N \qquad \text{EQN. 14}$$

On the other hand, current (I) through winding turns 4810 and capacitors 4812 is approximately as follows, where Y is the constant discussed above with respect to EQN. 2:

$$I = Y/(N \cdot M) \qquad \text{EQN. 15}$$

Figure 1:
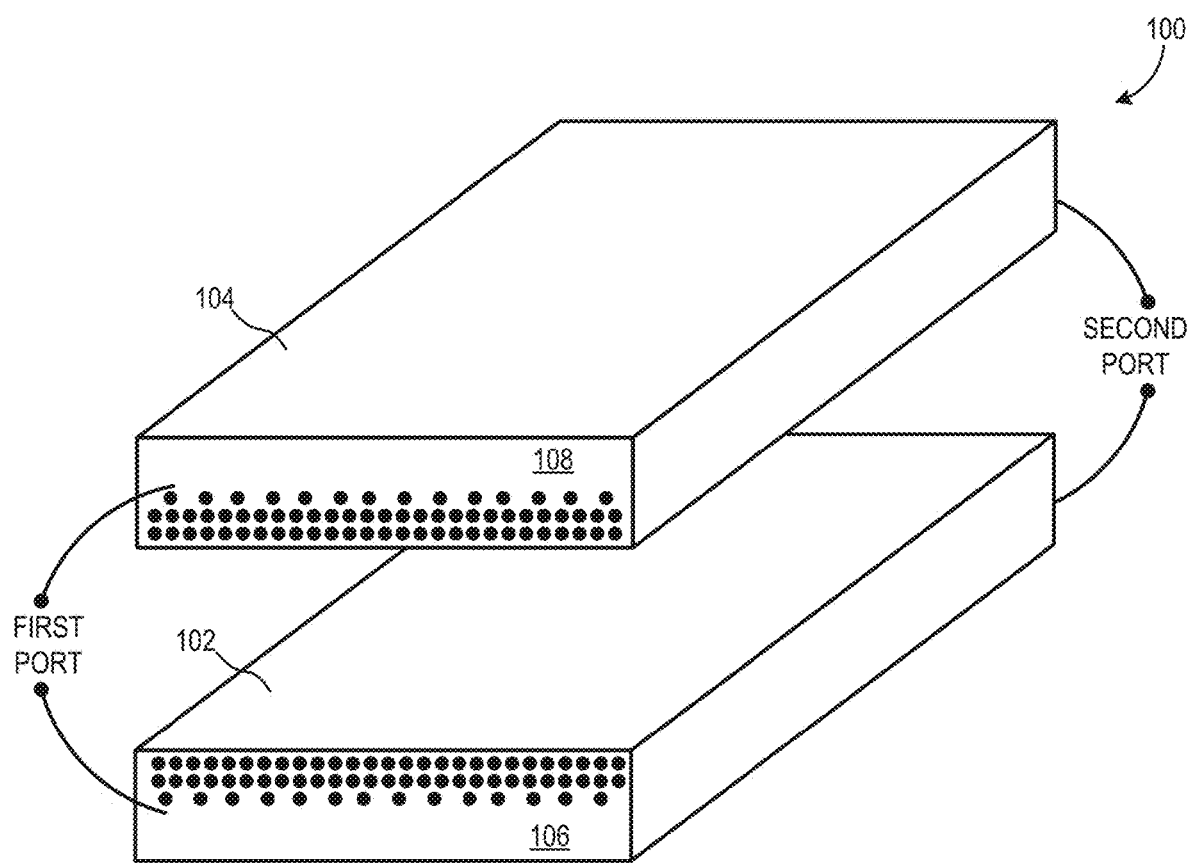
FIG. 1 illustrates a prior art transmission line including two parallel conductors.
Figure 2:
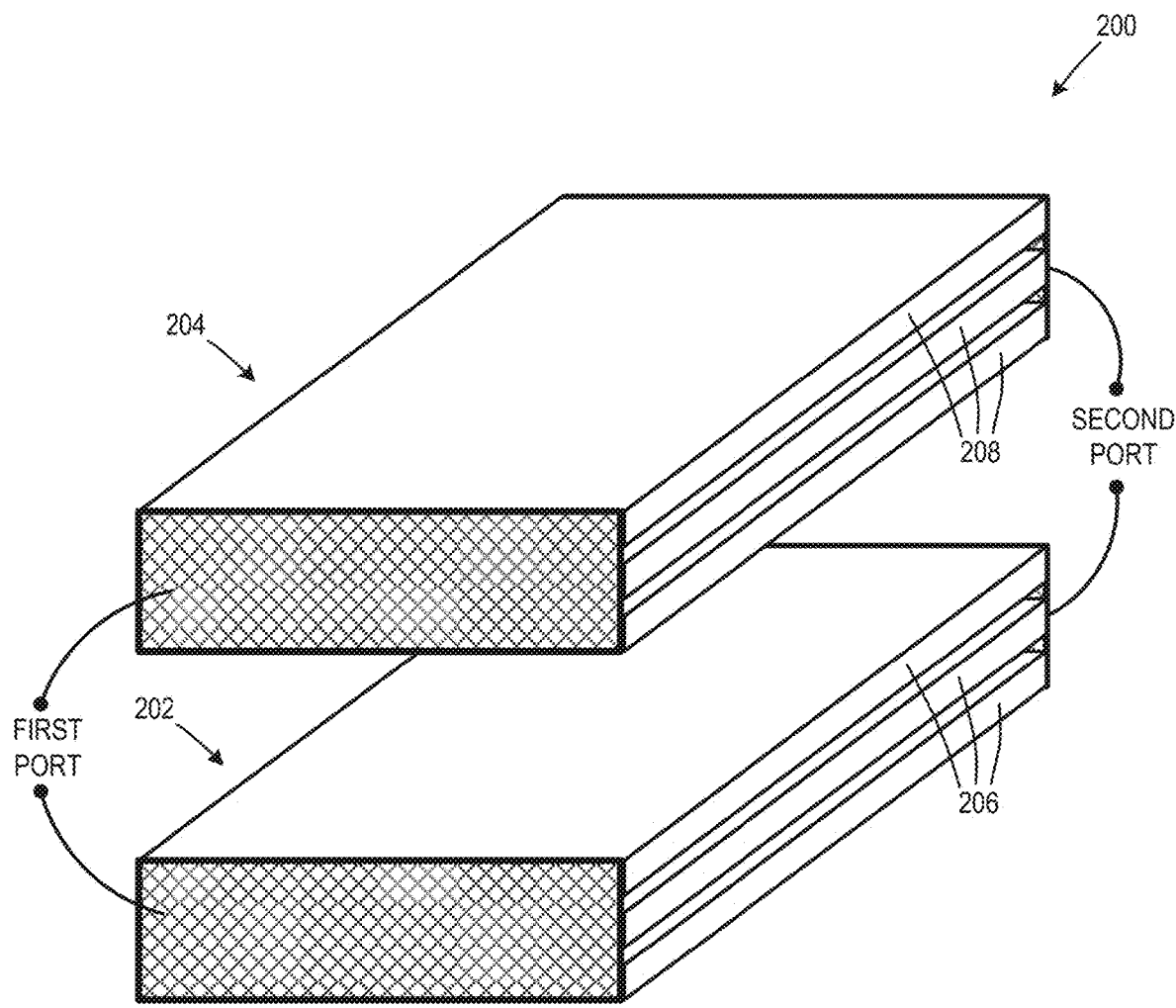
FIG. 2 illustrates a prior art transmission line including multiple conductor layers electrically coupled in parallel.
Figure 3:
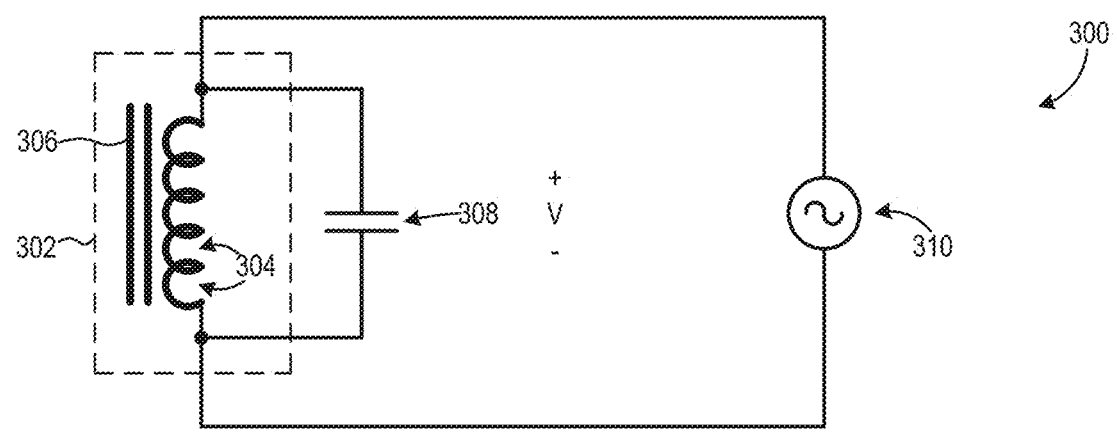
FIG. 3 schematically illustrates a prior art system for generating a high frequency magnetic field.

As shown in EQN. 15, current I is inversely proportional to number of sections 4806. Voltage V, however, is not significantly dependent on number of sections 4806, as shown in EQN. 14. Accordingly, it is possible to achieve both low voltage and low current in coil 4802, by suitable selection of M and N. For example, if M is large and N is small, both voltage and current will be relatively small. In conventional systems, in contrast, it is typically impractical to operate at low current levels because doing so would cause voltage to be unacceptably high, as discussed above with respect to FIG. 3.

The ability to operate coil 4802 at low current levels without excessive high voltage potentially allows system 4800 to experience significantly smaller losses than systems including conventional induction coils. Specifically, resistive losses are proportional to the square of current magnitude. A sizeable reduction in current magnitude therefore causes losses in connections between system components, such as between winding turns and capacitors, to dramatically decrease. A large decrease in connection losses, in turn, eases cooling requirements. In fact, Applicants believe that the ability to practically operate coil 4802 at relatively low current magnitudes may allow system 4800 to operate without liquid cooling in magnetic hyperthermia applications. Additionally, a large decrease in losses decreases AC power source requirements. Accordingly, use of resonant induction coil 4802, instead of a conventional resonant induction coil, may enable AC electric power source 4804 to be significantly smaller, lighter, and/or cheaper than would otherwise be feasible in typical magnetic hyperthermia applications.

Figure 49:
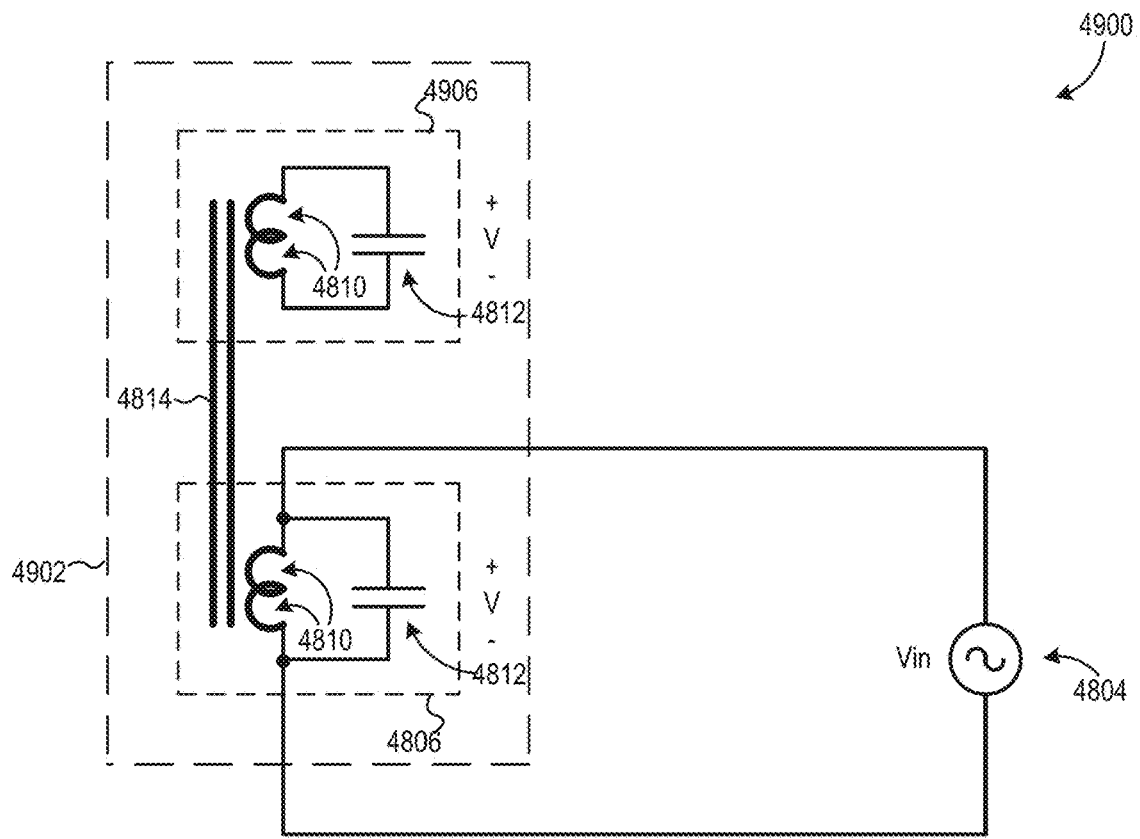
FIG. 49 schematically illustrates a system for generating a high frequency magnetic field similar to that of FIG. 48, but with one winding section driven solely via magnetic coupling, according to an embodiment.

In some alternate embodiments, one or more sections 4806 are not electrically coupled to AC electric power source 4806, and these sections are instead driven solely from magnetic coupling of winding turns 4810. For example, FIG. 49 schematically illustrates a system 4900 for generating a high frequency magnetic field. System 4900 is similar to system 4800, but includes a resonant induction coil 4902 with one winding section 4806 replaced with a winding section 4906. Section 4906 is not electrically coupled to AC electric power source 4804. Nevertheless, section 4906 is driven by AC electric power source 4804 via magnetic coupling of winding turns 4810. Impedance elements 4808 may be omitted in embodiments where only one section 4806 is electrically coupled to AC electric power source 4804, such as shown in FIG. 49.

Figure 50:
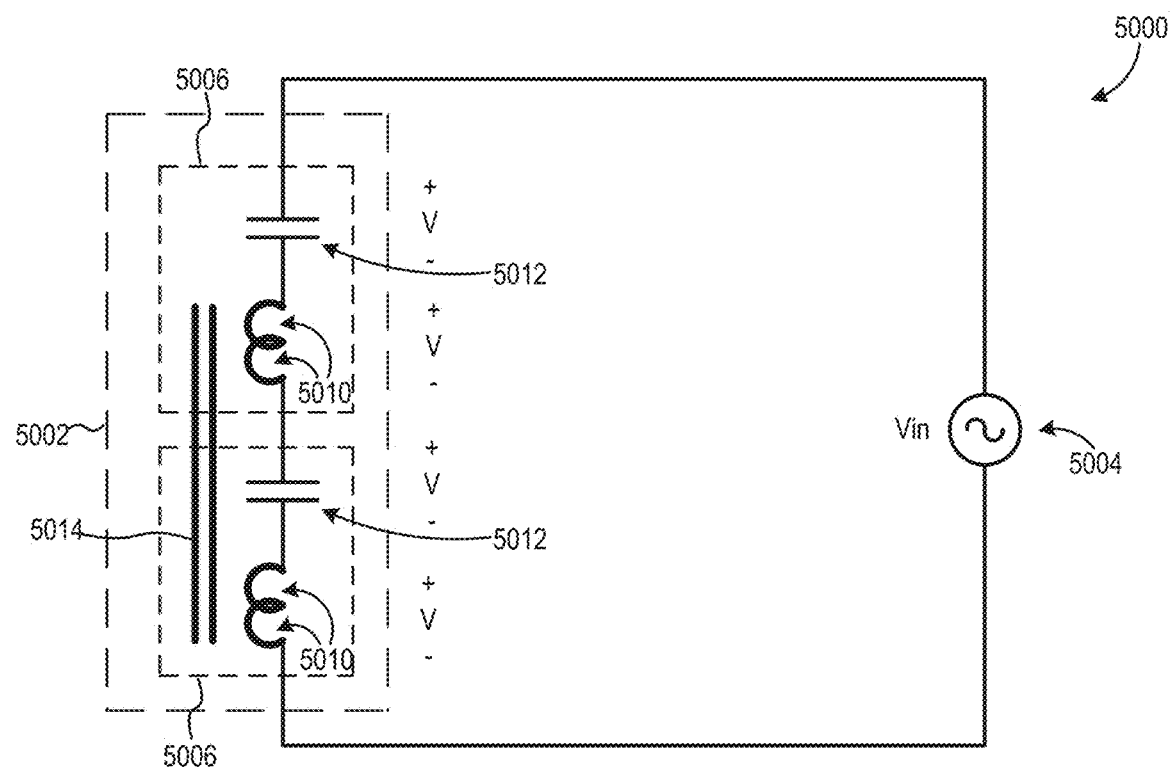
FIG. 50 schematically illustrates a system for generating a high frequency magnetic field including a multiple winding sections electrically coupled in series, where each winding section includes a respective series resonant capacitor, according to an embodiment.

The concept of incorporating resonant capacitors in each winding turn section can be applied to topologies other than those of FIGS. 48 and 49. For example, FIG. 50 schematically illustrates a system 5000 for generating a high frequency magnetic field. System 5000 includes a resonant induction coil 5002 electrically coupled in series with an AC electric power source 5004. Induction coil 5002 includes M winding sections 5006 electrically coupled in series, where each section 5006 includes N winding turns 5010 electrically coupled in series. Although FIG. 50 shows an example where M and N are each equal to two, M could be any integer greater than one, and N could be any integer greater than zero. A respective resonant capacitor 5012 is electrically coupled in series with the winding turns 5010 of each section 5006. Coil 5002 optionally includes a magnetic core 5014. EQNS. 14 and 15 apply to resonant induction coil 5002. Thus, system 5000 may be configured to achieve both low coil current and low coil voltage with appropriate selection of M and N, in a manner similar to that discussed above with respect to FIG. 48.

Figure 51:
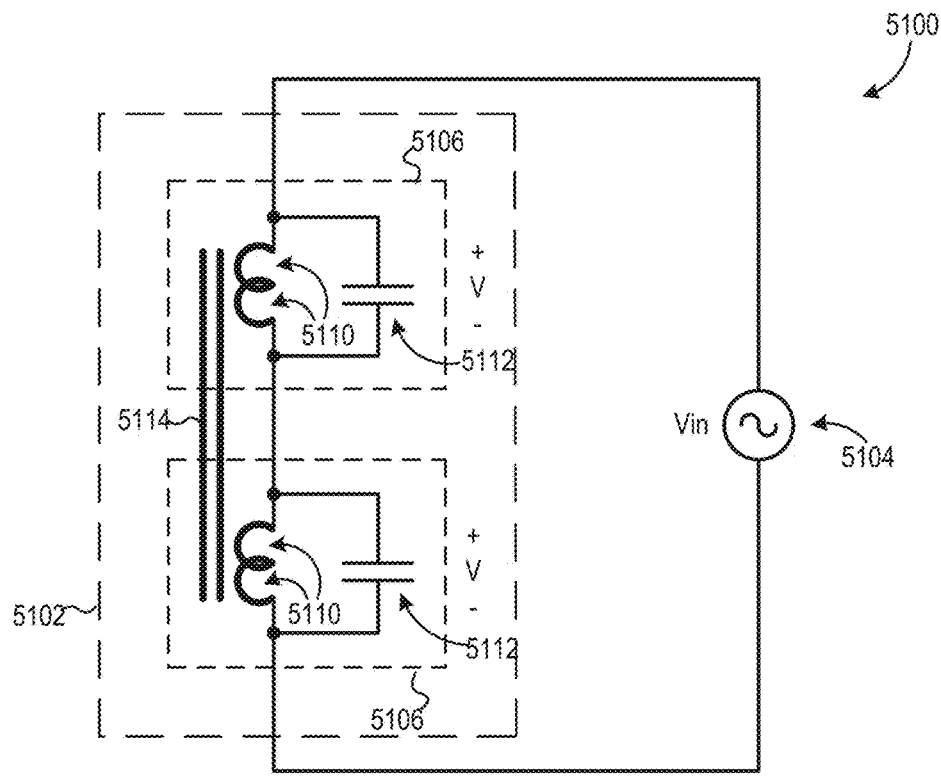
FIG. 51 schematically illustrates a system for generating a high frequency magnetic field including a multiple winding sections electrically coupled in series, where each winding section includes a respective parallel resonant capacitor, according to an embodiment.

FIG. 51 schematically illustrates a system 5100 for generating a high frequency magnetic field. System 5100 includes a resonant induction coil 5102 electrically coupled in series with an AC electric power source 5104. Induction coil 5102 includes M winding sections 5106 electrically coupled in series, where each section 5106 includes N winding turns 5110 electrically coupled in series. A respective resonant capacitor 5112 is electrically coupled in parallel with the winding turns 5110 of each section 5106. Although FIG. 51 shows an example where M and N are each equal to two, M could be any integer greater than one, and N could be any integer greater than zero. Coil 5102 optionally includes a magnetic core 5114.

EQNS. 14 and 15 apply to resonant induction coil 5102, and system 5100 may therefore be configured to achieve both low coil current and low coil voltage with appropriate selection of M and N, in a manner similar to that discussed above with respect to FIG. 48. However, input voltage Vin and maximum point-to-point voltage (MPPV) in system 5100 are proportional to M. Thus, both Vin and MPPV will be high in embodiments where M is large. In contrast, in the systems of FIGS. 48 and 49, input voltage Vin and MPPV are not significantly affected by M. In the system of FIG. 50, on the other hand, while input voltage Vin is proportional to M, input voltage is also inversely proportional to the quality factor of coil 5002. Additionally, MPPV of system 5000 is not affected by the value of M. Thus, the system of FIG. 51 will typically require a significantly higher input voltage and have a significantly higher MPPV than the systems of FIGS. 48-50, assuming all else is equal.

Figure 52:
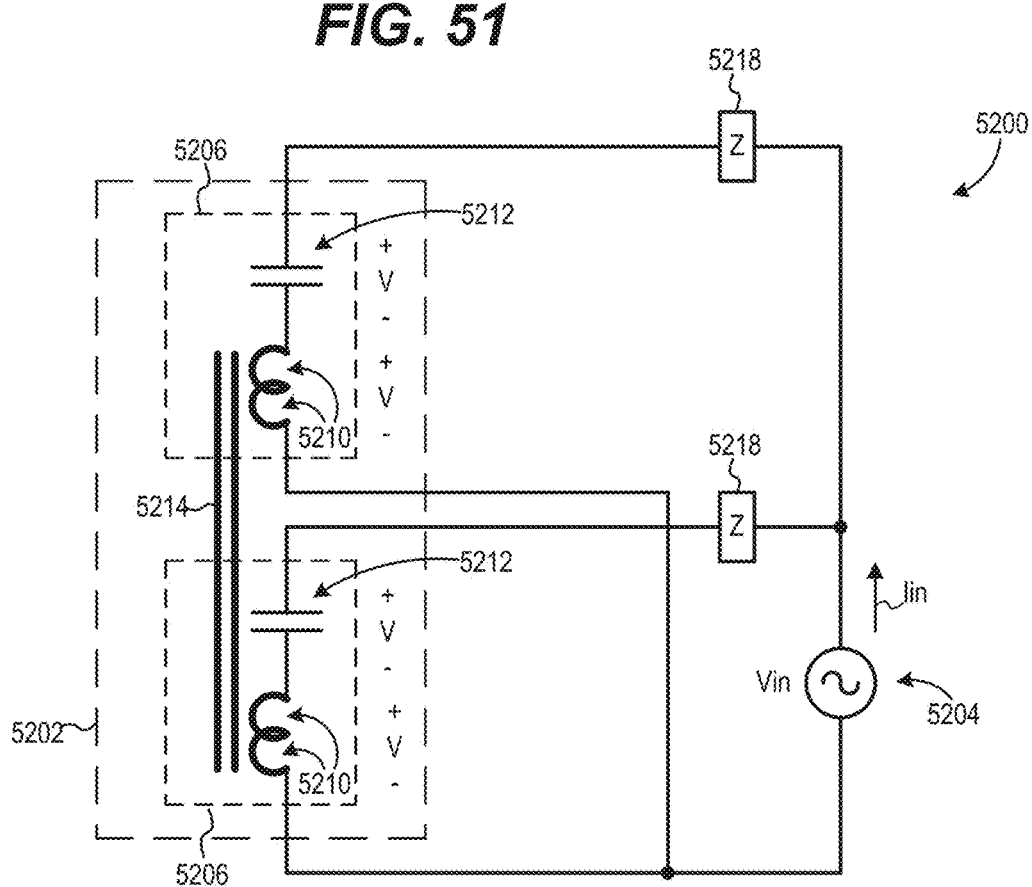
FIG. 52 schematically illustrates a system for generating a high frequency magnetic field including a multiple winding sections electrically coupled in parallel, where each winding section includes a series resonant capacitor, according to an embodiment.

FIG. 52 schematically illustrates a system 5200 for generating a high frequency magnetic field. System 5200 includes a resonant induction coil 5202 electrically coupled to an AC electric power source 5204. Induction coil 5202 includes M winding sections 5206, and each section 5206 is electrically coupled in parallel with AC electric power source 5204 via a respective impedance element 5218. Impedance elements 5218, which each include, for example, a capacitor or an inductor, promote equal current sharing among sections 5206 in a manner similar to that discussed above with respect to FIG. 48. In certain alternate embodiments, one or more sections 5206 are not electrically coupled to AC electric power source 5204, and these sections are instead driven solely by magnetic coupling of winding turns 5210, such as in a manner similar to that shown in FIG. 49.

Each section 5206 includes N winding turns 5210 electrically coupled in series. A respective resonant capacitor 5212 is electrically coupled in series with the winding turns 5210 of each section 5206. Although FIG. 52 shows an example where M and N are each equal to two, M could be any integer greater than one, and N could be any integer greater than zero. Coil 5202 optionally includes a magnetic core 5214. EQNS. 14 and 15 apply to resonant induction coil 5202, and system 5200 may therefore be configured to achieve both low coil current and low coil voltage with appropriate selection of M and N, in a manner similar to that discussed above with respect to FIG. 48. However, input current Iin from AC electric power source 5204 will typically be greater than that of the systems of FIGS. 48-51, though, assuming otherwise similar configuration and operating conditions.

Figure 53:
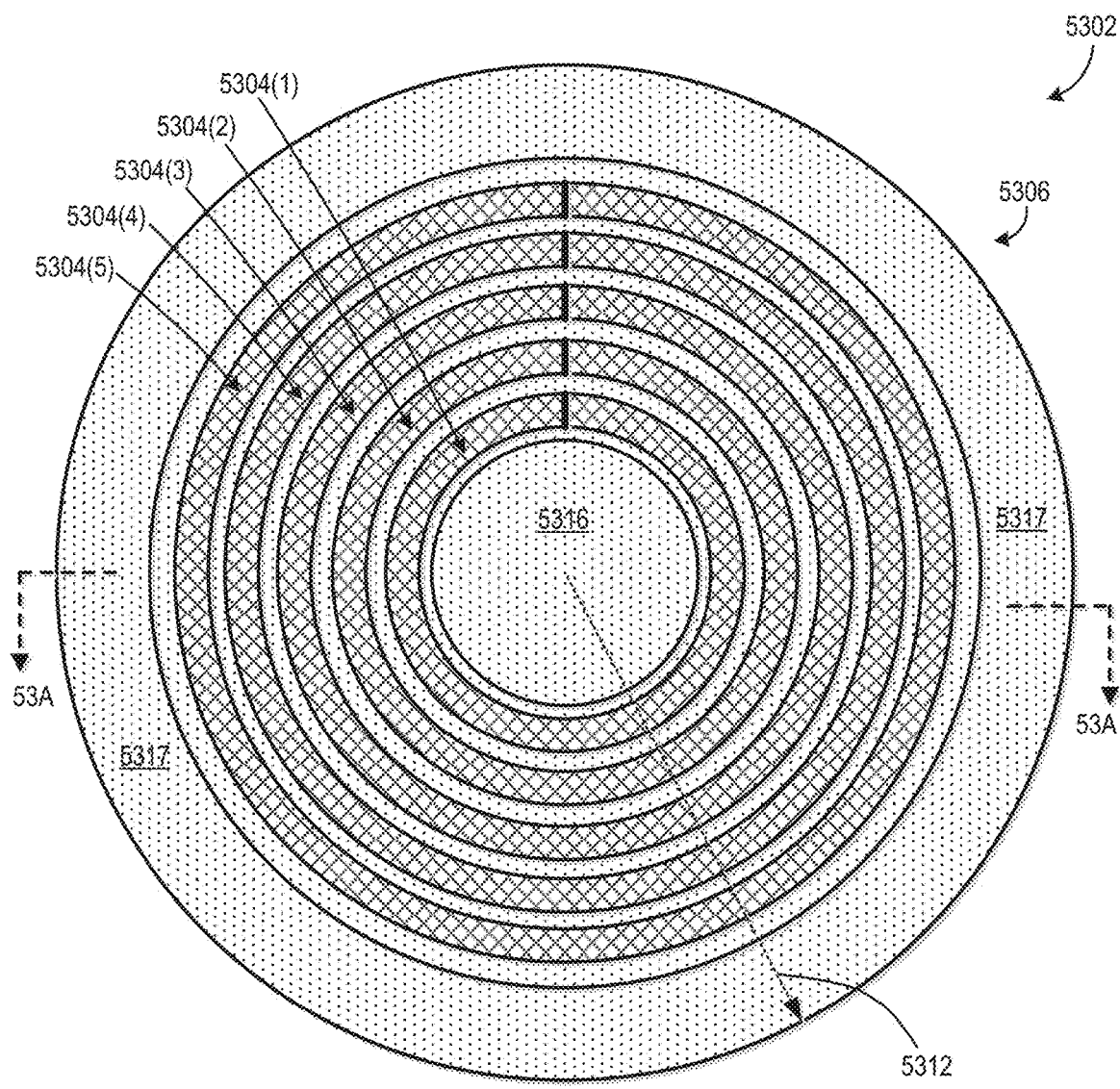
FIG. 53 is a top plan view of a resonant induction coil including multiple cooling channels, according to an embodiment.
Figure 54:
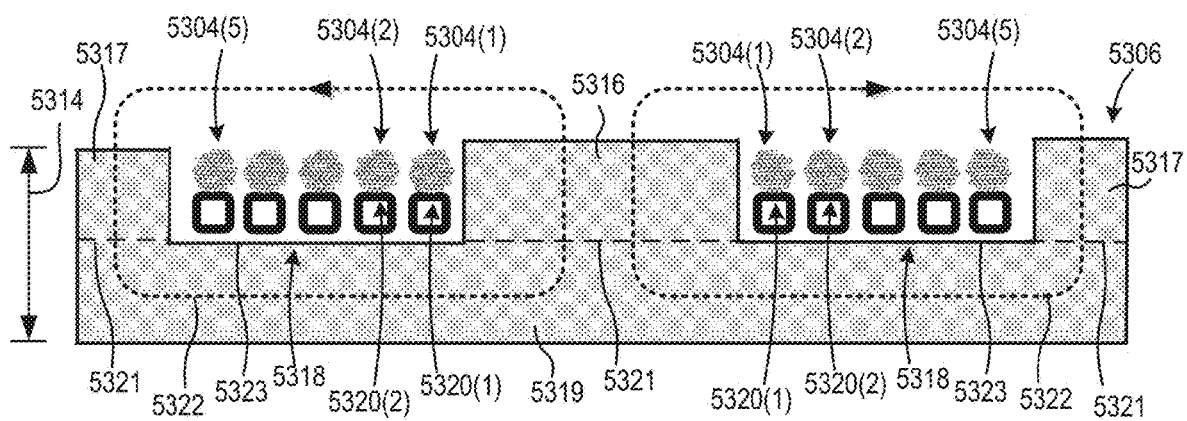
FIG. 54 is a cross-sectional view of the FIG. 53 resonant induction coil taken along line 53A-53A of FIG. 53.

Winding turns 4810, 5010, 5110, 5210 are formed of litz wire in some embodiments, to minimize the impact of the skin effect. For example, FIG. 53 shows a top plan view of a resonant induction coil 5302, and FIG. 54 shows a cross-sectional view of coil 5302 taken along line 53A-53A of FIG. 53. Resonant induction coil 5302 includes a round magnetic core 5306 having a radius 5312 and a height 5314. Magnetic core 5306 includes a center post 5316 and an outer ring 5317 disposed on a base 5319 in the height 5314 direction, to form a recess 5318 concentrically disposed around center post 5316. Although FIG. 54 includes dashed lines 5321 delineating center post 5316 and outer ring 5317 from base 5319, the lines are included solely to help the viewer distinguish the various elements of core 5306, and dashed lines 5321 do not necessarily represent discontinuities in core 5306. Recess 5318 is at least partially free from magnetic material. Base 5319 forms a bottom surface 5323 of recess 5318 such that recess 5318 extends only partially through height 5314 of core 5306. Five winding turns 5304 are concentrically wound around center post 5316 in recess 5318, and each winding turn 5304 is disposed on a respective tubular cooling channel 5320. The number of winding turns 5304 and cooling channel 5320 pairs could be varied without departing from the scope hereof.

Cooling channels 5320 carry a cooling liquid, such as chilled water, for cooling winding turns 5304. In some alternate embodiments, though, cooling channels 5320 carry an alternative heat transfer medium, such as evaporating refrigerant, for cooling winding turns 5304. Only some instances of winding turns 5304 and cooling channels 5320 are labeled to promote illustrative clarity.

Each winding turn 5304 is formed of litz wire including multiple parallel-connected wire strands. The individual litz wire strands are not shown in FIG. 53 and are instead collectively represented by cross-hatched shading, to promote illustrative clarity. Cooling channels 5320 also conduct electricity and supplement their respective winding turns 5304 in some embodiments. Terminating connections to winding turns 5304 are not shown. It may be particularly advantageous to electrically couple winding turns 5304 in series because doing so allows the voltage on each cooling channel 5320 to follow the voltage on its respective winding turn 5304, thereby minimizing potential difference between channels 5320 and their respective winding turns 5304. However, coil 5302 could alternately be configured with parallel connected winding turns 5304 without departing from the scope hereof.

It is anticipated that winding turns 5304 will typically be grouped into two or more sections with a respective resonant capacitor (not shown) per section, such as in a manner similar to that of one of FIGS. 48-52, to achieve both low coil voltage and low coil current. However, if low coil voltage and/or low coil current are not required, all winding turns 5304 could alternately share a single resonant capacitor.

Dashed lines 5322 symbolically illustrate the approximate flow of magnetic flux when current flows through winding turns 5304 in the counter-clockwise direction. Base 5319, center post 5316, and outer ring 5317 provide a low reluctance path for magnetic flux around channel 5318. Thus, the magnetic field in the vicinity of cooling channels 5320 is relatively small, which helps minimize eddy current-induced losses in cooling channels 5320.

Figure 55:
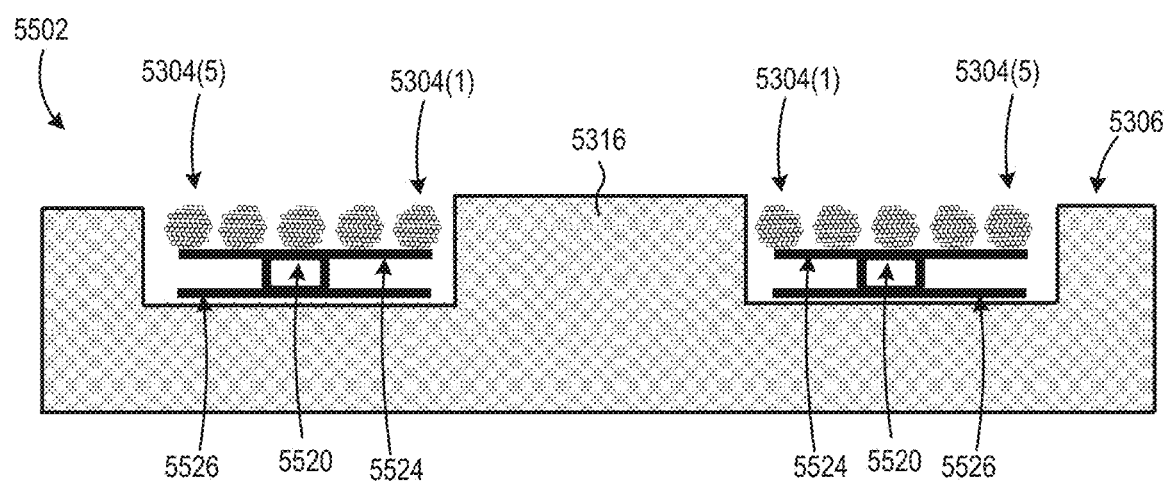
FIG. 55 is a cross-sectional view of a resonant induction coil similar to that of FIGS. 53 and 54, but including a single cooling channel, according to an embodiment.

FIG. 55 shows a cross-sectional view of a resonant induction coil 5502, which is similar to coil 5302 of FIGS. 53 and 54, but with multiple cooling channels 5320 replaced with a single cooling channel 5520 disposed between a heat sink plate 5524 and a heat sink base 5526. A cooling liquid, such as chilled water, is circulated through channel 5520. Winding turns 5304 are disposed on heat sink plate 5524, such that heat sink plate 5524 transfers heat from winding turns 5304 to fluid circulating through cooling channel 5520, thereby cooling winding turns 5304. Resonant coil 5502 may be cheaper and simpler to manufacture than coil 5302. However, in embodiments where winding turns 5304 are grouped into series-coupled winding turns, the potential difference between winding turns 5304 and heat sink plate 5524 may be large, thereby requiring significant dielectric insulation. Such dielectric insulation impedes flow of heat from winding turns 5304 to heat sink plate 5524. Additionally, the single coil channel configuration of coil 5502 requires that heat travel from winding turns 5304 through heat sink plate 5524 to reach cooling channel 5520, thereby possibly further impeding cooling.

Although embodiments formed of litz wire may achieve high performance, litz wire may be challenging to cool since it is difficult to fill air spaces between litz wire strands with high thermal conductivity material. Furthermore, the fact that litz wire includes multiple wire strands may make litz wire difficult to terminate. Such termination difficulties are amplified in embodiments including a large number of sections since each section will typically require separate terminations. Embodiments having few winding turns per section may also be difficult to terminate because such embodiments typically require a large number of litz wire strands, to handle high current levels associated with a small number of winding turns. Accordingly, some embodiments of resonant induction coils 4802 (FIG. 48), 4902 (FIG. 49), 5002 (FIG. 50), 5102 (FIG. 51), and 5202 (FIG. 52) are formed, at least in part, from a multilayer layer conductor discussed above, such as multilayer conductor 900 (FIG. 9), multilayer conductor 2201 (FIG. 25), multilayer conductor 2900 (FIG. 29), multilayer conductor 3800 (FIG. 38), or multilayer conductor 4100 (FIG. 41), thereby reducing or eliminating the need for litz wire and discrete capacitors.

Combinations of Features

Features described above as well as those claimed below may be combined in various ways without departing from the scope hereof. The following examples illustrate some possible combinations:

(A1) A multilayer conductor may include at least one separation dielectric layer and a plurality of conductor layers stacked in an alternating manner. Each of the plurality of conductor layers may include a first conductor sublayer and a second conductor sublayer separated from the first conductor sublayer by a sublayer dielectric layer. The second conductor sublayer may at least partially overlap with the first conductor sublayer in each of the plurality of conductor layers.

(A2) In the multilayer conductor denoted as (A1): (1) the plurality of conductor layers may be electrically coupled in parallel; (2) the multilayer conductor may have thickness; (3) the at least one separation dielectric layer and the plurality of conductor layers may be stacked in the alternating manner in the thickness direction; and (4) in each of the plurality of conductor layers, the second conductor sublayer may at least partially overlap with the first conductor sublayer, as seen when viewed cross-sectionally in the thickness direction.

(A3) In the multilayer conductor denoted as (A2): each of the plurality of conductor layers may have a respective area of overlap of the first and second conductor sublayers of the conductor layer, as seen when viewed cross-sectionally in the thickness direction; and (b) at least two of the plurality of conductor layers may have respective areas of overlap of different sizes.

(A4) In multilayer conductor denoted as (A1), the at least one separation dielectric layer and the plurality of conductor layers may be concentrically stacked in an alternating manner around a common axis.

(A5) In the multilayer conductor denoted as (A4), the common axis may form a loop around a center axis of the multilayer conductor, and the multilayer conductor may have a toroidal shape.

(A6) In the multilayer conductor denoted as (A5): (1) each first conductor sublayer may form a first discontinuity along the common axis, such that the first conductor sublayer does not completely encircle the center axis; (2) each second conductor sublayer may form a second discontinuity along the common axis, such that the second conductor sublayer does not completely encircle the center axis; and (3) each first discontinuity may be angularly displaced from each second discontinuity around the center axis.

(A7) In the multilayer conductor denoted as (A5): (1) each first conductor sublayer may form a first discontinuity, such that the first conductor sublayer does not completely encircle the common axis; (2) each second conductor sublayer may form a second discontinuity, such that the second conductor sublayer does not completely encircle the common axis; and (3) each first discontinuity may be angularly displaced from each second discontinuity around the common axis.

(A8) In the multilayer conductor denoted as (A4): (1) each first conductor sublayer may form a first discontinuity, such that the first conductor sublayer does not completely encircle the common axis; (2) each second conductor sublayer may form a second discontinuity, such that the second conductor sublayer does not completely encircle the common axis; and (3) each first discontinuity may be angularly displaced from each second discontinuity around the common axis.

(A9) In the multilayer conductor denoted as (A8), the multilayer conductor may have a cylindrical shape.

(A10) In the multilayer conductor denoted as (A1): (1) the at least one separation dielectric layer and the plurality of conductor layers may be stacked in an alternating manner in a thickness direction; and (2) each first and second conductor sublayer may be wound around a center axis, the center axis extending in the thickness direction.

(A11) In the multilayer conductor denoted as (A10): (1) each first conductor sublayer may be a foil conductor having a C-shape, as seen when viewed cross-sectionally in the thickness direction; and (2) each second conductor sublayer may be a foil conductor having an inverted C-shaped, as seen when viewed cross-sectionally in the thickness direction.

(A12) In either of multilayer conductors denoted as (A10) or (A11): (1) each first conductor sublayer may form a first notch; (2) each second conductor sublayer may form a second notch; and (3) each first notch may be angularly displaced from each second notch around the center axis.

(A13) In any of the multilayer conductors denoted as (A10) through (A12), at least two adjacent conductor layers of the plurality of conductor layers may be angularly offset from each other around the center axis.

(A14) In any of the multilayer conductors denoted as (A10) through (A13), in each of the plurality of conductor layers, the first conductor sublayer, the second conductor sublayer, and the sublayer dielectric layer may be stacked in the thickness direction.

(A15) In any of the multilayer conductors denoted as (A1) through (A14), the at least one separation dielectric layer and each sublayer dielectric layer may include at least one plastic, paper, glass, oil, adhesive, ceramic material, and air.

(B1) A transmission line having thickness may include first and second multilayer conductors. Each of the multilayer conductors may include at least one separation dielectric layer and a plurality of conductor layers stacked in an alternating manner in the thickness direction. The plurality of conductor layers may be electrically coupled in parallel. Each of the plurality of conductor layers may include (1) a first conductor sublayer and (2) a second conductor sublayer separated from the first conductor sublayer by a sublayer dielectric layer in the thickness direction. The second conductor sublayer may at least partially overlap with the first conductor sublayer, as seen when viewed cross-sectionally in the thickness direction. The first multilayer conductor may mirror the second multilayer conductor across a center axis of the transmission line, where the center axis extends in a lengthwise direction that is orthogonal to the thickness direction.

(B2) In the transmission line denoted as (B1), in each of the multilayer conductors: (1) each of the plurality of conductor layers may have a respective area of overlap of the first and second conductor sublayers of the conductor layer, as seen when viewed cross-sectionally in the thickness direction; and (2) at least two of the plurality of conductor layers may have respective areas of overlap of different sizes.

(B3) In either of the transmission lines denoted as (B1) or (B2), in each of the multilayer conductors: (1) the plurality of conductor layers may include M conductor layers, where M is an integer greater than one; (2) a first conductor layer of the M conductor layers may have a capacitive reactance of $X_1$; (3) a second conductor layer of the M conductor layers may have a capacitive reactance of $X_2$; (4) the first conductor layer may be a closest conductor layer of the M conductor layers to the center axis of the transmission line; (5) the second conductor layer may be a second closest conductor layer of the M conductor layers to the center axis of the transmission line; and (6) the expression $X_2=X_1-(M-2+1)X_{LH}$ may hold true, where $X_{LH}$ is an incremental inductive reactance of each of the M conductor layers.

(C1) An assembly may include a multilayer conductor and a magnetic core adjacent to at least part of the multilayer conductor. The multilayer conductor may include least one separation dielectric layer and a plurality of conductor layers stacked in an alternating manner. Each of the plurality of conductor layers may include (1) a first conductor sublayer, and (2) a second conductor sublayer separated from the first conductor sublayer by a sublayer dielectric layer. The second conductor sublayer may at least partially overlap with the first conductor sublayer in each of the plurality of conductor layers.

(C2) In the assembly denoted as (C1): (1) the at least one separation dielectric layer and the plurality of conductor layers may be concentrically stacked in an alternating manner around a common axis; (2) the magnetic core may include a center post; and (3) the common axis may form a loop around the center post and around a center axis of the multilayer conductor.

(C3) In the assembly denoted as (C2), the multilayer conductor may have a toroidal shape.

(C4) In the assembly denoted as (C3): (1) each first conductor sublayer may form a first discontinuity along the common axis, such that the first conductor sublayer does not completely encircle the center axis; (2) each second conductor sublayer may form a second discontinuity along the common axis, such that the second conductor sublayer does not completely encircle the center axis; and (3) each first discontinuity may be angularly displaced from each second discontinuity around the center axis.

(C5) In the assembly denoted as (C1): (1) the at least one separation dielectric layer and the plurality of conductor layers may be concentrically stacked in an alternating manner around a center axis; (2) each first conductor sublayer may form a first discontinuity, such that the first conductor sublayer does not completely encircle the center axis; (3) each second conductor sublayer may form a second discontinuity, such that the second conductor sublayer does not completely encircle the center axis; (4) each first discontinuity may be angularly displaced from each second discontinuity around the center axis; and (5) the magnetic core may include (i) first and second end magnetic elements separated in a lengthwise direction parallel to the center axis, and (ii) an outer ring disposed around the center axis, the outer ring joining the first and second end magnetic elements in the lengthwise direction. The multilayer conductor may be disposed within the outer ring and between the first and second end magnetic elements.

(C6) In the assembly denoted as (C5), the multilayer conductor may have a cylindrical shape.

(C7) Either of the assemblies denoted as (C5) or (C6) may further include a magnetic center post disposed along the center axis and joining the first and second end magnetic elements in the lengthwise direction.

(C8) In the assembly denoted as (C7), the first and second end magnetic elements may be formed of a magnetic material having a first permeability, and the magnetic center post may be formed of a magnetic material having a second permeability, the first permeability being larger than the second permeability.

(C9) In the assembly denoted as (C7), the magnetic center post may include a plurality of discrete magnetic elements separated from each other in the lengthwise direction.

(C10) In the assembly denoted as (C1): (1) the magnetic core may include an outer ring and a center post within the outer ring, where the center post extends along a center axis, and the center axis extends in a thickness direction; (2) the at least one separation dielectric layer and the plurality of conductor layers may be stacked in an alternating manner in the thickness direction; (3) the first and second conductor sublayers may be concentrically disposed around the center post; and (4) the multilayer conductor may be disposed within the outer ring.

(C11) In the assembly denoted as (C10): (1) each first conductor sublayer may be a foil conductor having a C-shape, as seen when viewed cross-sectionally in the thickness direction; and (2) each second conductor sublayer may be a foil conductor having an inverted C-shape, as seen when viewed cross-sectionally in the thickness direction.

(C12) In either of the assemblies denoted as (C10) or (C11): (1) each first conductor sublayer may form a first notch; (2) each second conductor sublayer may form a second notch; and (3) each first notch may be angularly displaced from each second notch around the center axis.

(C13) In any of the assemblies denoted as (C10) through (C12), at least two adjacent conductor layers of the plurality of conductor layers may be angularly offset from each other around the center axis.

(C14) In any of the assemblies denoted as (C10) through (C13): (1) the magnetic core may further include a base; (2) the center post and the outer ring may be disposed on the base in the thickness direction, to form a recess in the magnetic core; (3) the recess may be disposed around the common axis; and (4) the multilayer conductor may be disposed in the recess.

(C15) The assembly denoted as (14) may further include one or more cooling channels disposed in the recess between the plurality of conductor layers and a bottom surface of the recess, the bottom surface of the recess being formed by the base of the magnetic core, the one or more cooling channels adapted to carry a cooling liquid.

(C16) The assembly denoted as (C15) may further include a heat sink plate disposed between the plurality of conductor layers and the bottom surface of the recess, in the thickness direction.

(C17) In any of the assemblies denoted as (C10) through (C13), the magnetic core may further including a base ring and a top ring opposing each other in the thickness direction, where each of the outer ring and the center post join the base ring and the top ring.

(C18) In any of the assemblies denoted as (C10) through (C17), in each of the plurality of conductor layers, the first conductor sublayer, the second conductor sublayer, and the sublayer dielectric layer may be stacked in the thickness direction.

(C19) Any of the assemblies denoted as (C1) through (C18) may further include an alternating current electric power source electrically coupled to at least one of the conductor sublayers.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A multilayer conductor, comprising:
   at least one separation dielectric layer and a plurality of conductor layers stacked in an alternating manner, each of the plurality of conductor layers including:
   a first conductor sublayer, and
   a second conductor sublayer separated from the first conductor sublayer by a sublayer dielectric layer, the second conductor sublayer at least partially overlapping with the first conductor sublayer;
   the at least one separation dielectric layer and the plurality of conductor layers being concentrically stacked in an alternating manner around a common axis, and
   the common axis forming a loop around a center axis of the multilayer conductor, and the multilayer conductor having a toroidal shape.

2. The multilayer conductor of claim 1, wherein:
   the plurality of conductor layers are electrically coupled in parallel; and
   in each of the plurality of conductor layers, the second conductor sublayer at least partially overlaps with the first conductor sublayer, as seen when viewed cross-sectionally along the common axis.

3. The multilayer conductor of claim 2, wherein:
   each of the plurality of conductor layers has a respective area of overlap of the first and second conductor sublayers of the conductor layer, as seen when viewed cross-sectionally along the common axis; and
   at least two of the plurality of conductor layers have respective areas of overlap of different sizes.

4. The multilayer conductor of claim 1, wherein:
   each first conductor sublayer forms a first discontinuity along the common axis, such that the first conductor sublayer does not completely encircle the center axis;
   each second conductor sublayer forms a second discontinuity along the common axis, such that the second conductor sublayer does not completely encircle the center axis; and
   each first discontinuity is angularly displaced from each second discontinuity around the center axis.

5. The multilayer conductor of claim 1, wherein:
   each first conductor sublayer forms a first discontinuity, such that the first conductor sublayer does not completely encircle the common axis;

each second conductor sublayer forms a second discontinuity, such that the second conductor sublayer does not completely encircle the common axis; and each first discontinuity is angularly displaced from each second discontinuity around the common axis.

6. The multilayer conductor of claim 5, the multilayer conductor having a cylindrical shape.

7. A multilayer conductor, comprising:
at least one separation dielectric layer and a plurality of conductor layers stacked in an alternating manner, each of the plurality of conductor layers including:
a first conductor sublayer, and
a second conductor sublayer separated from the first conductor sublayer by a sublayer dielectric layer, the second conductor sublayer at least partially overlapping with the first conductor sublayer;
wherein:
the at least one separation dielectric layer and the plurality of conductor layers are stacked in an alternating manner in a thickness direction,
each first and second conductor sublayer is wound around a center axis, the center axis extending in the thickness direction,
each first conductor sublayer is a foil conductor having a C-shape, as seen when viewed cross-sectionally in the thickness direction, and
each second conductor sublayer is a foil conductor having an inverted C-shaped, as seen when viewed cross-sectionally in the thickness direction.

8. The multilayer conductor of claim 7, wherein:
each first conductor sublayer forms a first notch;
each second conductor sublayer forms a second notch; and
each first notch is angularly displaced from each second notch around the center axis.

9. The multilayer conductor of claim 8, at least two adjacent conductor layers of the plurality of conductor layers being angularly offset from each other around the center axis.

10. The multilayer conductor of claim 8, wherein in each of the plurality of conductor layers, the first conductor sublayer, the second conductor sublayer, and the sublayer dielectric layer are stacked in the thickness direction.

11. The multilayer conductor of claim 7, the at least one separation dielectric layer and each sublayer dielectric layer including at least one of plastic, paper, glass, oil, adhesive, ceramic material, and air.

12. A device for generating a magnetic field, comprising:
a resonant induction coil including M sections, M being an integer greater than one, each section including:
N winding turns electrically coupled in series, N being an integer greater than zero, the N winding turns of each section of the M sections being concentric with the winding turns each other section of the M sections, such that the N winding turns of each section of the M sections are magnetically coupled to the winding turns of each other section of the M sections, and
a resonant capacitor electrically coupled to the N winding turns of the section; and
an alternating current electric power source electrically coupled to the resonant induction coil.

13. The device of claim 12, wherein in each of the M sections, the resonant capacitor of the section is electrically coupled in series with the winding turns of the section.

14. The device of claim 13, the M sections being electrically coupled in series.

15. The device of claim 13, the M sections being electrically coupled in parallel.

16. The device of claim 12, wherein in each of the M sections, the resonant capacitor of the section is electrically coupled in parallel with the winding turns of the section.

17. The device of claim 16, the M sections being electrically coupled in series.

18. The device of claim 16, the M sections being electrically coupled in parallel.

19. The device of claim 12, at least one of the M sections not being electrically coupled to the alternating current electric power source.

* * * * *